(12) United States Patent
Veazey

(10) Patent No.: US 7,007,620 B2
(45) Date of Patent: Mar. 7, 2006

(54) MODULAR SHIPS FOR TRANSPORTING AND INSTALLING PRECAST MODULAR INTERMODAL CONCRETE SHAPES

(75) Inventor: Sidney E. Veazey, King George, VA (US)

(73) Assignee: SE Ventures, Inc., King George, VA (US)

(*) Notice: Subject to any disclaimer, the term of this patent is extended or adjusted under 35 U.S.C. 154(b) by 0 days.

(21) Appl. No.: 10/731,263

(22) Filed: Dec. 8, 2003

(65) Prior Publication Data

US 2004/0244667 A1 Dec. 9, 2004

Related U.S. Application Data

(60) Continuation-in-part of application No. 10/314,099, filed on Dec. 7, 2002, now Pat. No. 6,659,686, which is a division of application No. 09/776,971, filed on Feb. 5, 2001, now Pat. No. 6,491,473.

(51) Int. Cl.
*B63B 3/08* (2006.01)

(52) U.S. Cl. .................................. 114/77 R; 114/65 A
(58) Field of Classification Search .............. 114/65 A, 114/77 R, 258, 266, 267
See application file for complete search history.

(56) References Cited

U.S. PATENT DOCUMENTS

| | | | |
|---|---|---|---|
| 1,173,879 A | 2/1916 | Shearer | |
| 1,177,381 A | 3/1916 | Case | |
| 1,229,152 A | 6/1917 | Shearer | |
| 1,247,750 A | 11/1917 | Upson | |
| 1,489,428 A | 4/1924 | Cushing | |
| 1,778,574 A | 10/1930 | Thornley | |
| 1,847,043 A | 2/1932 | Ball | |
| 2,159,685 A | 5/1939 | Buzzell | |
| 2,348,508 A | 5/1944 | Wells | |
| 2,369,615 A * | 2/1945 | Smith | 114/77 R |
| 2,370,940 A * | 3/1945 | Cueni | 114/65 A |
| 2,390,940 A * | 12/1945 | Hull et al. | 248/61 |
| 2,981,219 A * | 4/1961 | Winslow | 114/298 |
| 3,344,609 A | 10/1967 | Greiser | |
| 3,557,742 A * | 1/1971 | Gainsley | 114/248 |
| 3,640,075 A | 2/1972 | LaPeyre | |
| 3,722,222 A | 3/1973 | Rinkel | |
| 3,802,205 A | 4/1974 | Dickin'on | |
| 3,878,806 A * | 4/1975 | Garcia | 114/77 R |
| 3,957,098 A | 5/1976 | Hepworth et al. | |
| 3,969,900 A | 7/1976 | Plodowski | |

(Continued)

FOREIGN PATENT DOCUMENTS

WO WO 90/08059 * 7/1990

OTHER PUBLICATIONS

B & W photocopy of floating drydock containing docked cruise ship.

(Continued)

*Primary Examiner*—Sherman Basinger
(74) *Attorney, Agent, or Firm*—James K. Poole, Esq.

(57) ABSTRACT

Novel precast concrete boxes are disclosed which can be assembled together and/or with structural shapes disclosed in U.S. Pat. Nos. 5,697,736 and 6,491,473 to form waterfront structures such as seawalls, boathouses and the like. Novel methods of waterborne transport and installation of the boxes are disclosed, including modular vessels having bow and stern sections which can be connected directly together or mounted to a mid-section containing assemblies of concrete boxes, other structural elements or other vessels such as floating drydocks. Modular vessels can be assembled with any or all of the bow, midship and stern sections comprising honeycomb arrays of vertically-oriented hexagonal boxes.

19 Claims, 35 Drawing Sheets

U.S. PATENT DOCUMENTS

| | | |
|---|---|---|
| 4,152,875 A | 5/1979 | Soland |
| 4,165,197 A | 8/1979 | Postma |
| 4,375,928 A | 3/1983 | Crow et al. |
| 4,440,527 A | 4/1984 | Vidal |
| 4,607,985 A | 8/1986 | Matsushita |
| 4,643,618 A | 2/1987 | Hilfiker et al. |
| 4,712,944 A | 12/1987 | Rose |
| 4,820,079 A | 4/1989 | Wheeler |
| 4,911,585 A | 3/1990 | Vidal et al. |
| 4,914,876 A | 4/1990 | Forsberg |
| 4,940,364 A | 7/1990 | Dlugosz |
| 4,964,750 A | 10/1990 | House et al. |
| 5,087,150 A | 2/1992 | McCreary |
| 5,158,395 A | 10/1992 | Holmberg |
| 5,178,493 A | 1/1993 | Vidal et al. |
| 5,697,736 A | 12/1997 | Veazey et al. |
| 5,908,265 A | 6/1999 | Mostkoff |
| 6,491,473 B1 | 12/2002 | Veazey |

OTHER PUBLICATIONS

B & W photocopy of supply boat which could be fitted to carry precast concrete boxes on after cargo deck.

B & W photocopy of tug pushing barge.

Color photoprint showing (1) apparent floating breakwater; (2) loaded container ship; (3) MSC cargo ship offloading container to barge by crane; and (4) container on ship deck with ISO fitting on corner.

* cited by examiner

1=10
VARIABLE SIZE MODULAR STACKING IN FRACTIONAL
INCREMENTS ON SHIP
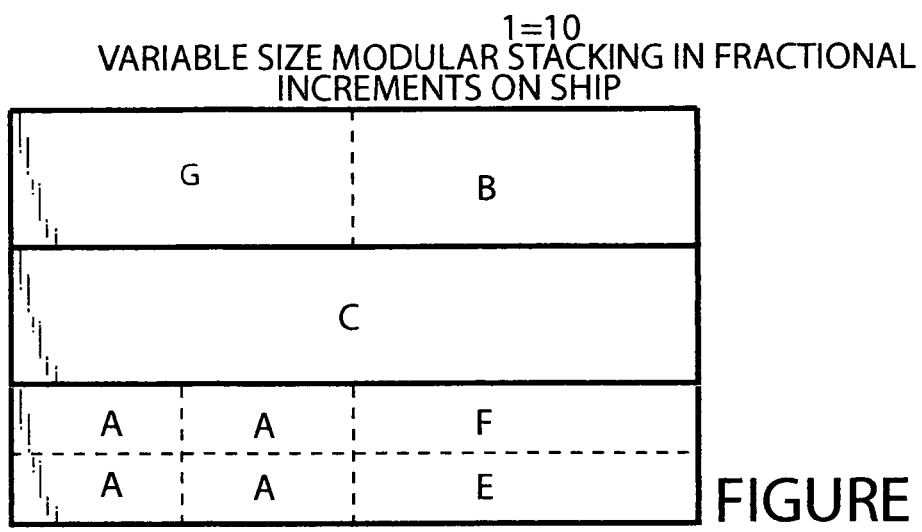
FIGURE 13A
FIGURE 13B
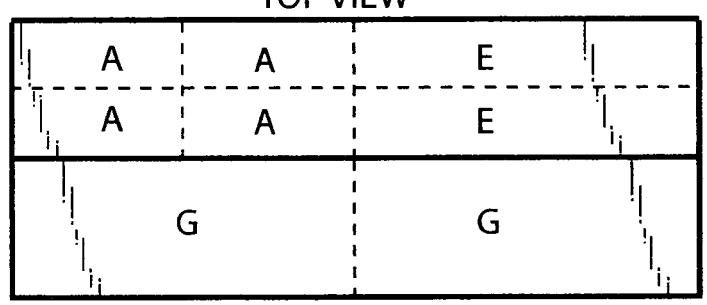
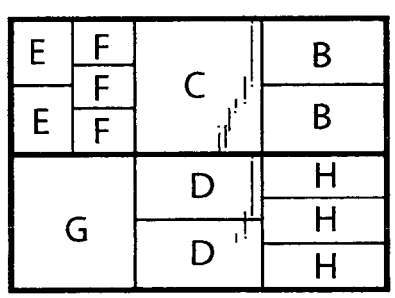
FIGURE 13C
LEGEND
| BOX | WIDTH | HEIGHT | LENGTH |
|-----|-------|--------|--------|
| A | 4' | 4' | 10' |
| B | 8' | 4' | 20' |
| C | 8' | 8' | 40' |
| D | 8' | 4' | 40' |
| E | 4' | 4' | 20' |
| F | 4' | 2'8" | 20' |
| G | 8' | 8' | 20' |
| H | 8' | 2'8" | 20' |

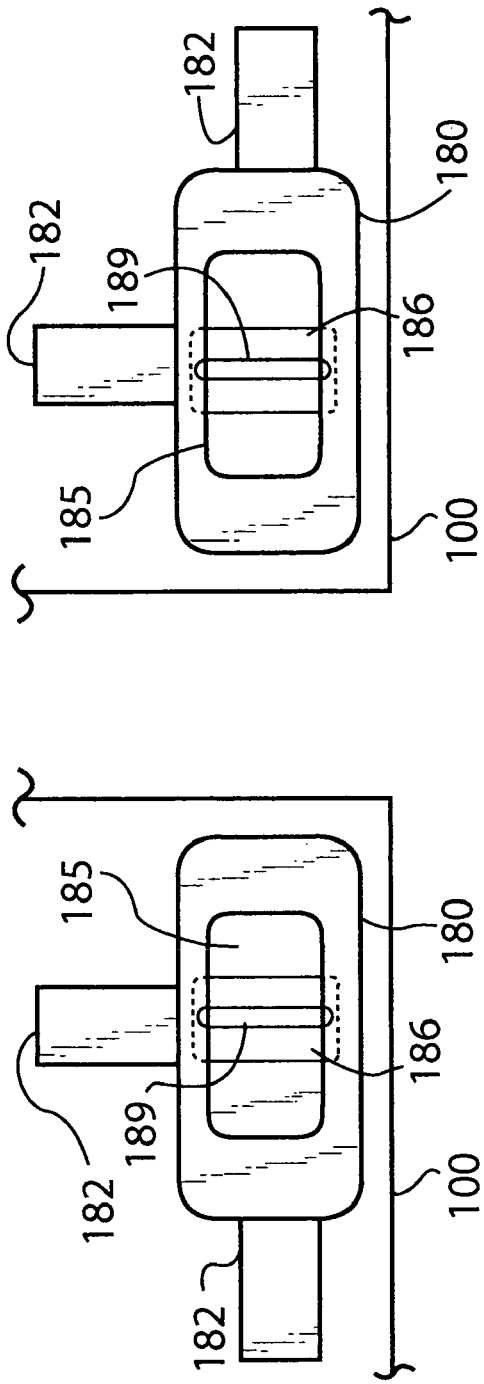
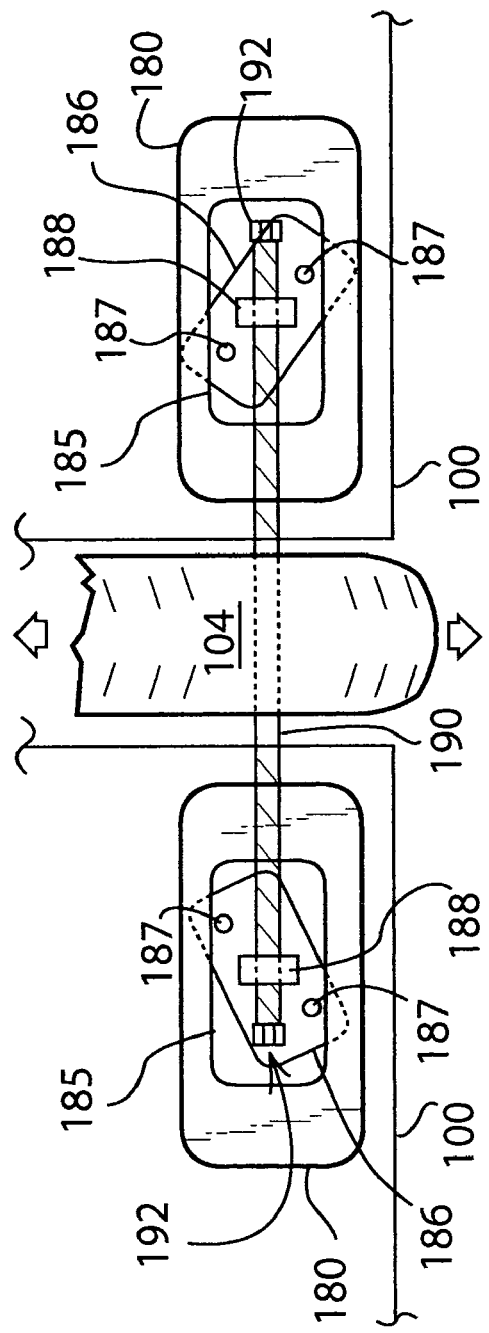

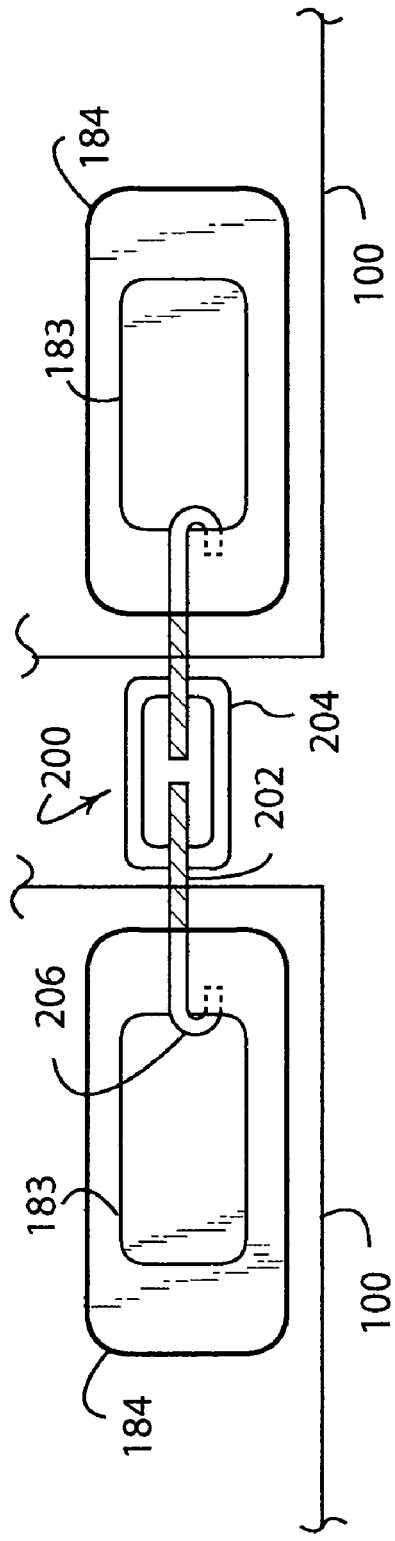
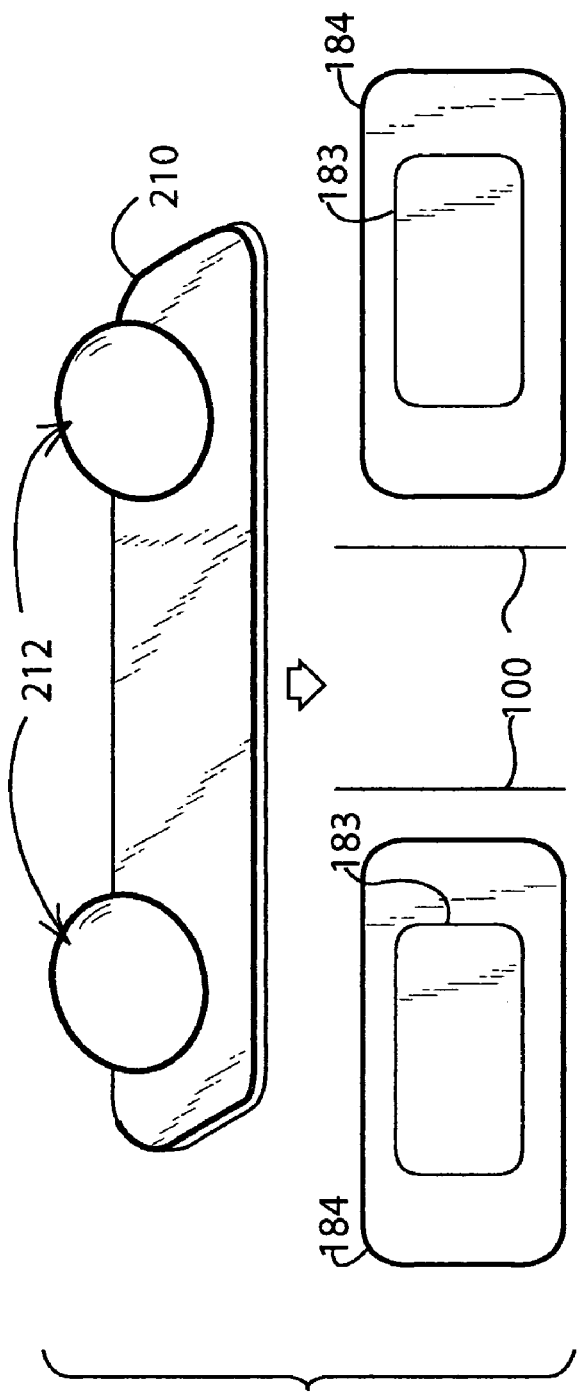

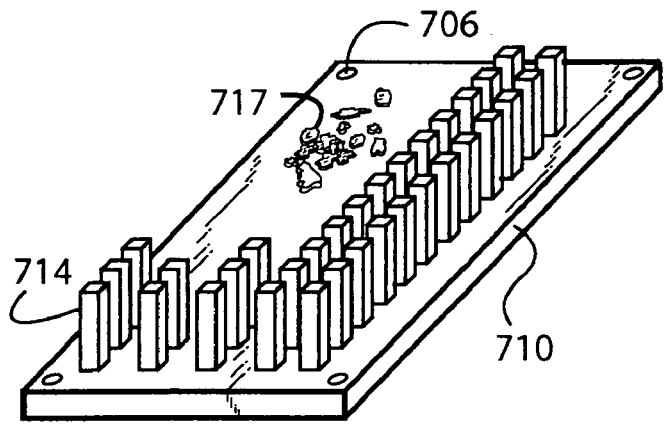
FIGURE 52
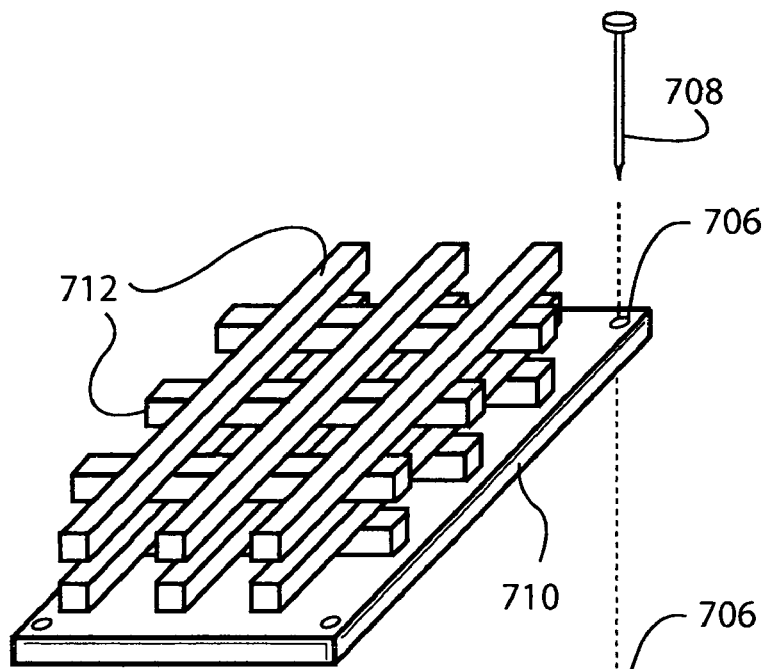
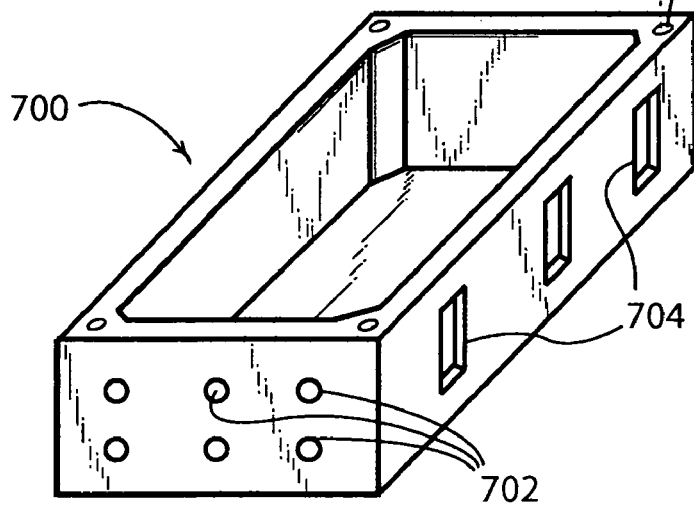
FIGURE 51

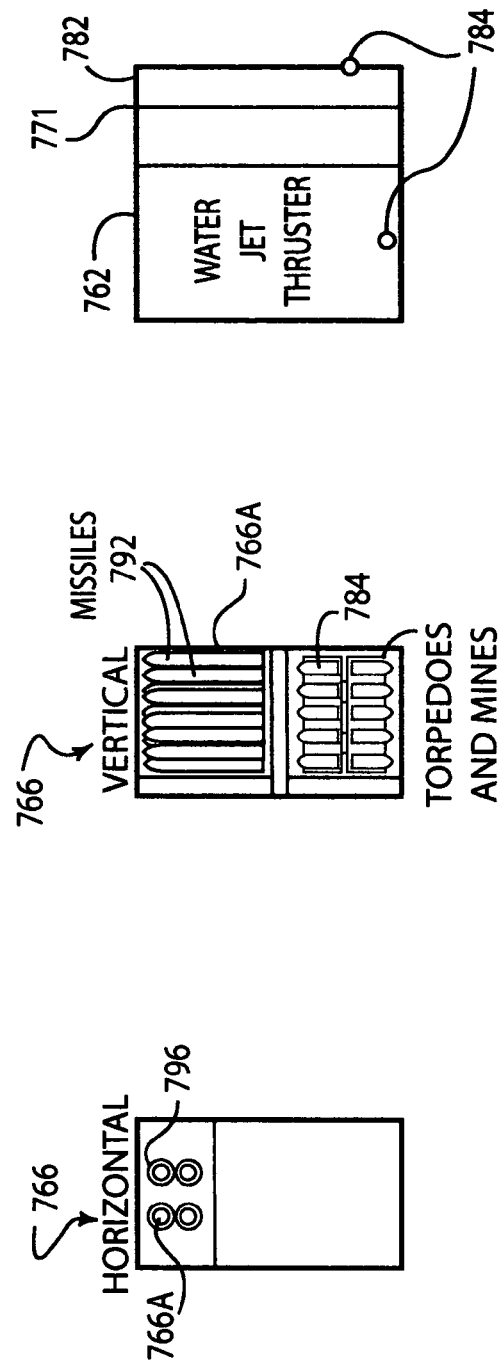
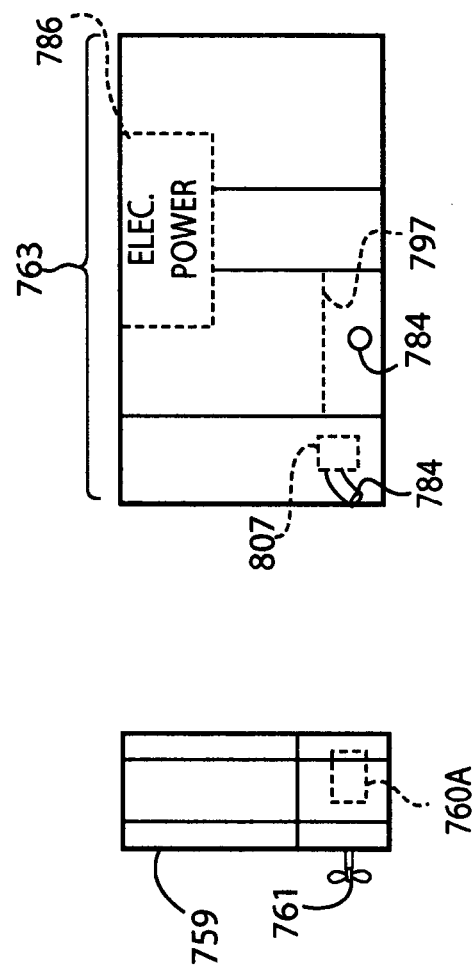
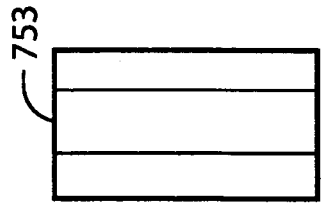
FIGURE 59A  FIGURE 59B  FIGURE 59C
FIGURE 59D  FIGURE 59E  FIGURE 59F

MODULAR SHIPS FOR TRANSPORTING AND INSTALLING PRECAST MODULAR INTERMODAL CONCRETE SHAPES

REFERENCE TO RELATED APPLICATIONS

This application is a continuation-in-part of Veazey's U.S. Ser. No. 10/314,099, filed Dec. 7, 2002 now U.S. Pat. No. 6,659,686, which is a divisional of Veazey's U.S. Ser. No. 09/776,971, filed Feb. 5, 2001 now U.S. Pat. No. 6,491,473. These patents are incorporated herein by reference. Also incorporated herein by reference is U.S. Pat. No. 5,697,736 of Veazey et al.

BACKGROUND OF THE INVENTION

Field of the Invention

This application pertains to ships and methods for transporting precast concrete structures of various sizes and shapes which are suitable for installation as integrated systems to form seawalls and various shoreline reinforcement systems for limiting shoreline erosion by rivers, lakes, oceans, sounds and other major bodies of water, as well as terrestrial structures for terracing, dams, bridges, buildings, etc. The application further relates to ships which are at least partially formed of precast concrete structures, preferably structures which have hexagonal cross sections and can be assembled into honeycomb arrays to form portions of the ship hulls which have relatively high strength-to-weight ratios.

2. The parent patents referred to above provide a summary of relevant prior art. While many techniques have been developed for reinforcing shorelines, as described in that patent and various publications of the U.S. Army Corps of Engineers, there is still considerable room for improvement. Applicant's company Seament Shoreline Systems, Inc. of Virginia and its subcontractors have completed several shoreline installations using the components and methods disclosed in the above patents. The Corps of Engineers publication "LOW COST SHORE PROTECTION . . . a Property Owner's Guide" discloses at page 154 the use of precast open concrete boxes filled with sand to form waterfront sills to retain perched beaches. U.S. Pat. No. 5,697,736 discloses in columns 8–9 the use of precast concrete boxes as alternatives to Double "T" units (discussed below) for constructing pier-groins extending seaward from a seawall and for use in forming underwater and near-shore) breakwaters. Columns 12–13 and FIGS. 20 to 25 discuss the use of such concrete boxes to form floating pier assemblies.

Catalogs of Admiral Marine Co. (Staten Island, N.Y., New Orleans, Oakland, Calif. and Chicago) and Peck & Hale (West Sayville, N.Y. and Kowloon, HONG KONG, PRC) disclose various metal fastening devices which could be employed to connect certain components of the present invention to form structures.

Normally, large stone rip-rap revetments, groins or breakwa ters have been used for such protection. However, these methods require that a large total mass of materials be transported to the site. Such rocks are difficult to handle, cannot be interconnected or floated into place and are not easily relocatable. Furthermmore, such rocks are not amenable to intermodal transport or use in a modular system.

SUMMARY OF THE INVENTION

An object of the present invention is to provide easily transportable construction components which can be used to control shoreline erosion. As another object, such components should be provided in sizes, shapes and proportions which are compatible with existing trucks, railcars and maritime transportation modes (i.e., intermodal transportation) as well as adapted to existing materials handling equipment. As a further object, the components should be transportable in segments so that they can be moved into positions for installation through crowded beachfront areas, by land, water or aircraft such as heavy lift helicopters, blimps or dirigibles.

Another object of the invention is to provide such construction components as partially-closed containers which are light in weight but can be filled with available liquid or solid materials at the installation site to substantially increase their mass at little cost. A further object of the invention is to provide construction components which can be filled with solids, gases or liquids to increase their masses when installed as part of a structure, simultaneously serving as sealed storage containers for such materials for later use.

An additional object of the invention is to provide construction components which have the largest masses practicable when filled with ballasting material and installed to form structures. Maximizing the mass of such components is desirable to equip the structures to resist the large forces generated by storm waves, currents, floods, mudslides, earthquakes and other natural disasters. Such maximizing of mass can have similar applications in combat engineering, where enemy artillery, bombardment and demolitions may be encountered.

Still another object of the invention is to provide intermodal sets of precast concrete boxes which can be used as fixed or floating construction components for various civil, marine, commercial or military construction projects. Such components could be connected together to form causeways, fixed or floating bridges, dams, drilling rigs, floating or fixed airport runways or helicopter pads, temporary or permanent shipping ports, temporary military or naval facilities such as port, repair, supply or airport installations, "container ships", relocatable modular waterfront structures such as houses, and many other applications.

Still another object of the invention is to provide methods of installing precast concrete boxes in underwater positions by transporting them on floating vessels and/or floating them into approximate position and sinking them into their final installed positions or assembling them into floating structures. A related object is to provide vessels which are suitable for transporting such boxes, either as deck cargo or as a floating, removable component of the vessel itself. Another related object is to provide precast concrete components which can be interconnected to form portions of the hull structures of such vessels.

In accordance with the present invention, precast concrete boxes are provided, preferably having the form of rectangular parellepipeds, which can be transported by water and assembled to form shoreline structures. As alternatives to such precast concrete boxes, similar boxes can be formed of materials selected from the group consisting of metal, wood, plastics and polymeric composites. Boxes of such materials can be coated on at least their outer surfaces with concrete to form boxes having the properties of precast concrete boxes. Any of these boxes can be formed with cross-sections which are hexagonal or half-hexagonal (i.e., a hexagon cut in half, from edge to edge or from side to side).

The precast concrete boxes of the invention can be interconnected by mechanical fastener means to form bundles or assemblies like log booms to be towed or otherwise transported over water. Further in accordance with the invention, such interconnected groups of concrete boxes which form a large rectangular mass can be transported by a self-propelled vessel for transporting floating objects which comprises separate bow and stern sections adapted to be fastened together using mechanical means to form the vessel alone. When used for transporting such assemblies of boxes (or other interconnected groups of floating objects such as logs, containers, tanks, floating drydocks or the like), the two sections of the vessel are separated and connected to the ends of the group of boxes to form a "stretched" vessel in which the group of boxes forms a midship section. The vessel is provided with conventional propulsion systems (in at least the stern section), thruster propulsion units to aid in maneuvering, anchors and power supplies for their operation and at least one crane for unloading and emplacing the boxes or other cargo at destination.

The group or array of boxes forming the midship section for transport by such a vessel can be either boxes forming rectangular parallelepipeds of intermodal sizes and proportions, or boxes of hexagonal and half-hexagonal cross sections which are oriented vertically and interconnected to form a honeycomb array. Furthermore, such boxes of hexagonal and half-hexagonal cross sections can be interconnected in honeycomb arrays to form at least a portion of the bow and stern sections of such vessels as well as a midship section for tranporting cargo. Such honeycomb arrays can be assembled by interconnecting the boxes with mechanical connectors and installing tensioning cables to maintain the form and integrity for the various sections to form an integrated hull structure consisting essentially of precast concrete boxes having hexagonal or half-hexagonal cross sections.

Further in accordance with the invention, the precast concrete boxes of the invention can be installed in the water along a shoreline by sealing all inlets below the expected waterline of the installed boxes, placing the boxes in the water and floating them into position, then opening sufficient water inlets and air outlets to allow the boxes to sink into their assigned places. In preferred embodiments, these inlets and outlets can be opened remotely by signal means, and directional guidance can be provided to the boxes while they are being sunk into position. A group of such boxes can be interconnected and emplaced beneath the water to form a submerged breakwater or reef by positioning the connected boxes atop a flat deck of a vessel, emplacing an anchor on the bottom near the planned installation position and attaching same to a cable slidably connecting the boxes on deck, launching the boxes into the water while the vessel proceeds forward away from the anchor, then maneuvering the boxes into end-to-end contact and clamping the resulting string of boxes into place on the cable, placing the resulting floating string of boxes into position directly above the planned installation position, and finally, sinking the boxes while guiding them into final position by securing the forward end of the cable to a second anchor at the opposite end of the string from the first anchor and applying tension to the cable from the vessel.

The vessel used can be a barge, a vessel with a bow door and ramp [such as Navy landing ship tank, (LST) landing craft mechanized, (LCM) landing craft vehicle and personnel (LCVP) and the like] or a vessel with an after well deck affording access to the water for floating boxes directly into the water (such as a Navy landing ship dock LSD). A container ship with a flat deck and cranes to hoist the boxes from deck level to water level can also be used.

Boxes assembled and interconnected to form an array which is then connected to separate bow and stern sections of a vessel to form the midsection of such a vessel can be transported from an origin to a destination for installation to form shoreline structures by serving as part of the vessel enroute. At destination, the boxes can be removed from the vessel midsection, either individually by crane(s) or by disconnecting the midsection from the vessel, and floated into positions for installation to form shoreline and/or underwater structures as described elsewhere herein. Boxes can be disconnected from the adjacent boxes in the array, whether the midsection array is removed from or still connected to the vessel, and deposited in the water by using the crane(s). When the midsection is removed and the bow and stern sections of the vessel reconnected to form a more compact vessel, the vessel can be maneuvered to tow groups of boxes or to remove them from the independently floating midsection array and place them into the water by use of the crane(s). Alternatively, small tow or pusher boats can be carried on deck by the vessel and used to tow or maneuver the boxes, individually or in connected groups, into position for installation.

Additional objects and advantages of the present invention are described in, and will be apparent from, the following detailed description of preferred embodiments together with the drawings and appended claims.

BRIEF DESCRIPTION OF THE DRAWINGS

FIGS. 13A, 13B and 13C are plan, side and end views, respectively, of intermodal boxes of the invention arranged on deck for transport.

FIGS. 26–29 illustrate the employment of various connecting devices to connect such boxes.

FIGS. 51 and 52 are perspective views illustrating shellfish habitats based upon precast concrete boxes of the invention, with two types of removable concrete tops.

FIGS. 59A to 59F are side views of individual hexagonal modules of the ship of FIGS. 57 and 58.

DETAILED DESCRIPTION OF PREFERRED EMBODIMENTS

It should be understood that the following description of the presently preferred embodiments of the present invention is merely representative of many possible embodiments and thus is not intended to limit the scope of the invention. In the following description, like structures will be referred to by similar numerical designations.

Figure 1:
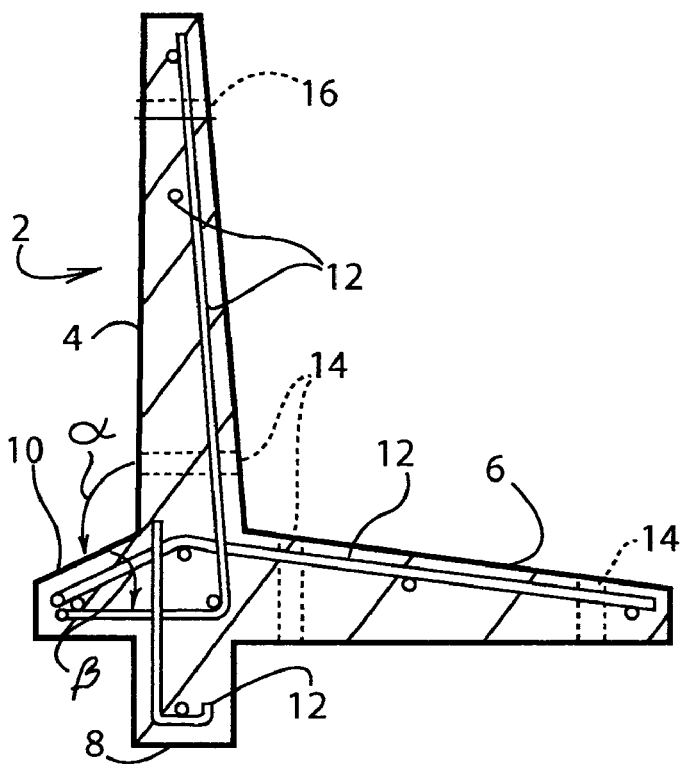
FIG. 1 is a sectional view of a prior art "L-wall" from U.S. Pat. No. 5,697,736.

Referring now the drawings, FIG. 1 is a sectional view of an L-wall as disclosed in the earlier patent. FIG. 1 illustrates an L-shaped structural member (2) of the above patent, intended for use in retaining walls, seawalls and the like. Vertical wall or stem portion (4) is substantially perpendicular to footer (6), and vertical key (8) extends below the lower surface of the footer, essentially in line with the vertical wall portion. Angular splash plate (10) protrudes from wall (4) opposite footer (6), forming an obtuse angle ($\alpha$) downward from the wall and forming an acute angle ($\beta$) with the plane of the footer base. The thicknesses of the vertical wall and footer portions can vary, being thickest near their intersection where stresses are greatest and tapering toward their extremities. For optimum strength, such structural members are cast with fiber or metal reinforcing bars (rebar) (12) emplaced vertically and horizontally as shown as shown to increase the strength of the member in operation. Holes (14) are preferably formed in the vertical wall and footer portions to provide drainage for liquid collecting behind the retaining wall or seawall. Holes (16) can also be placed to facilitate handling and temporary interconnection of the L-members as well as drainage.

The L-shaped members and other components disclosed herein can be precast by conventional methods known in the art, and in some cases existing commercial components can be utilized to assemble the novel shoreline reinforcement systems of the invention. When the components are to be exposed to salt water, it is preferred that all rebar be at least about 2 inches from any surface of the cast bodies. Fiber reinforcement should be included in the concrete for strength, a relatively high proportion of Portland cement should be used in the mix, and the forms should permit a smooth finish to be obtained on the finished molded objects. The forms should be subjected to vibration, using commercially available mechanisms, after the molds are filled to consolidate the concrete and minimize voids or defects. Preferably, fly ash and other recycled materials should be used in the concrete to the extent it is physically and economically beneficial.

Figure 2:
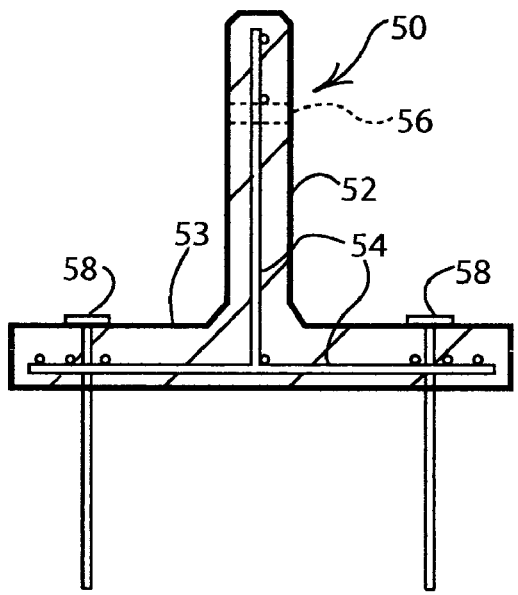
FIG. 2 is a sectional view of an inverted T-shaped unit from the same patent.

FIG. 2 is a sectional view of an inverted T-shaped unit as disclosed in U.S. Pat. No. 5,697,052 FIG. 2 illustrates a cross-sectional view of an inverted "T" wall or structural member (50) as disclosed in U.S. Pat. No. 5,697,736, having a vertical wall (52) and a symmetric base or footer (53). Such components can be cast of concrete, preferably containing rebar reinforcement (54) as illustrated above for the "L" walls, in various sizes and proportions to suit the application. For example, for shoreline reinforcement systems exposed to water, such "T" walls can range from about 2 to about 6 feet high and from 2 to about 6 feet wide, the ratio of height to width of the base ranging from about 0.6 to about 1:1. The sections can range from about 6 to about 16 feet in length. Particularly when the installed structures will be exposed to tidal flows, strong currents, surf or pack ice, the width of the base and the lowness of the center of gravity should be emphasized to minimize the risk of tipping. A plurality of holes (56) can be formed in the wall to facilitate handling, some sand and water bypass and interconnection. Similar holes in the base permit the use of pins, harpoon type anchors or stakes (58) to secure the units to the beach.

In the present systems, these inverted "T" walls are used to form groins extending seaward from a seawall or bulkhead, and may optionally be used in rows parallel with the seawall as well, as part of a system to reinforce the shoreline, form a "perched beach" or the like. Such groins are typically installed substantially perpendicular to the seawall and are used in pairs or greater numbers. The spacing and length of such groins must be carefully selected to encourage sand, gravel and other material to collect on the beach. In some cases the effects of groins, seawalls and other beach reinforcement systems can be difficult to predict even after careful analysis. If necessary, the "L" walls and inverted "T" walls described above can be disconnected and relocated. Such analyses are beyond the scope of the present disclosure, but some guidelines may be found in "Low Cost Shore Protection", published by the U.S. Army Corps of Engineers.

Figure 3:
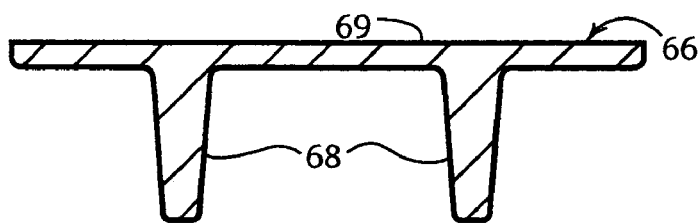
FIG. 3 is a sectional view of a conventional "double T" or pi-shaped unit from the same patent.

FIG. 3 is a sectional view of a conventional "double T" or pi-shaped unit from U.S. Pat. No. 5,697,052. FIG. 3 illustrates in cross-sectional view conventional "Double T" cast concrete structural members (66) which may be used in systems of the present invention. Such structural members are used in constructing parking garages. The lengths of such units can range from about 20 to about 60 feet, with length limited mainly by the difficulties of handling such heavy components over the road and along shorelines where they are to be installed. Because of their dimensions, the two tapered upright sections (68) joined to the flat base portion (69) give the appearance of two "T" shapes joined side-to-side. The units are also known as "pi" units because of their resemblance to the Greek letter pi.

Figure 4:
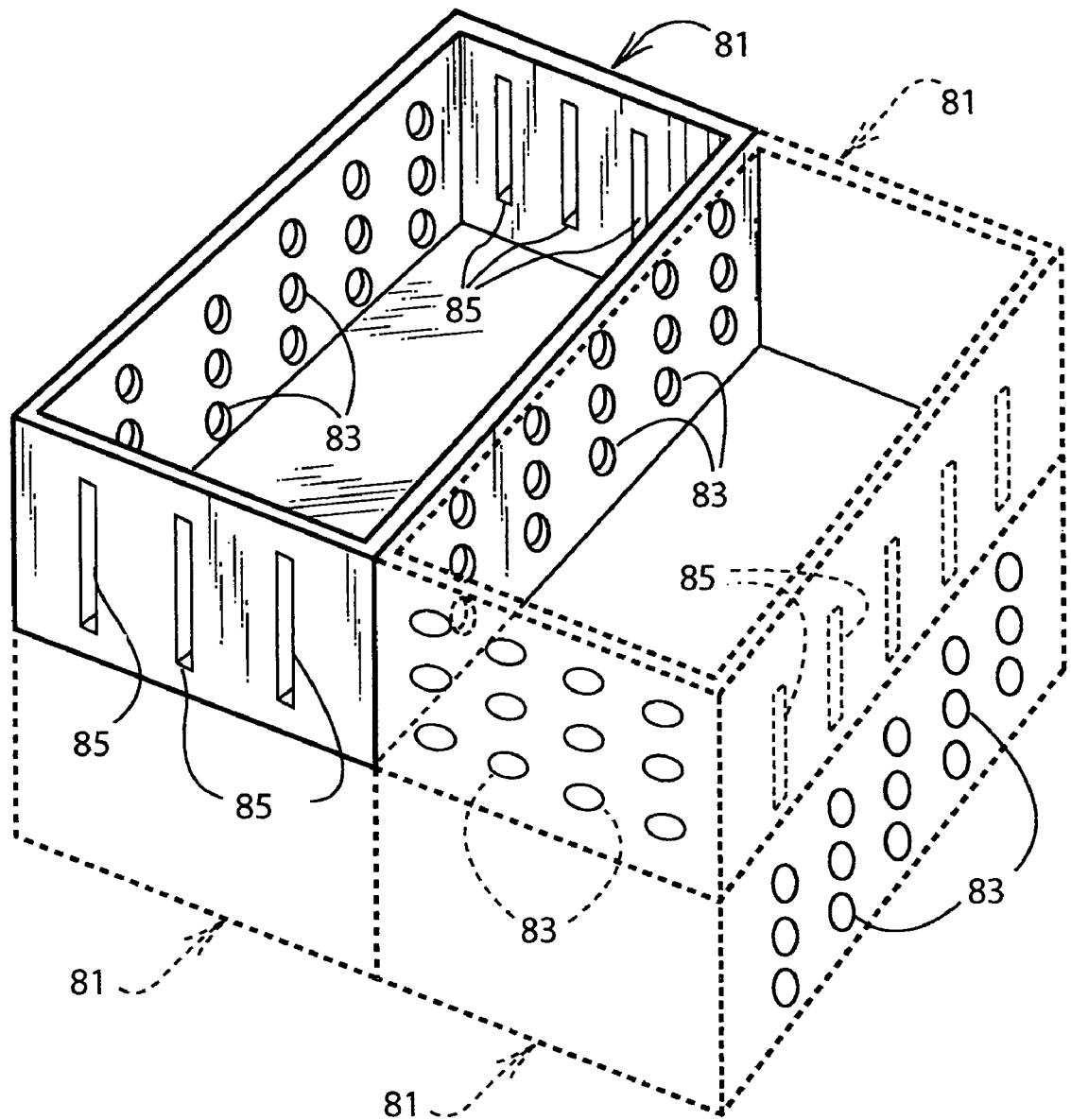
FIG. 4 is a perspective view of precast concrete boxes from the same patent.
Figure 24:
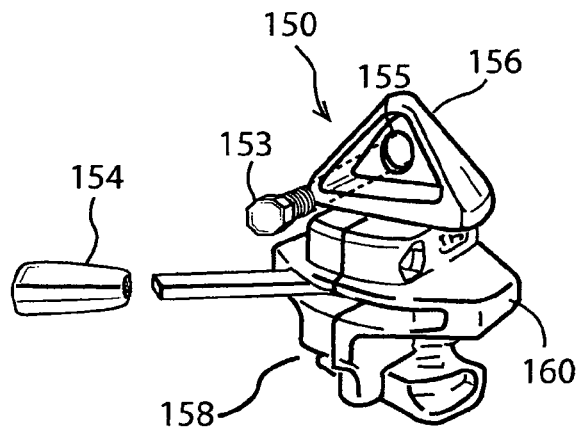
FIGS. 24 and 25 illustrate connecting devices for use with the precast concrete boxes of the invention.

FIG. 4 is a perspective view of a precast concrete box which was disclosed in the Veazey et al. patent for use in constructing breakwaters and the like. As an alternative to arrangements of inverted double "T" units to form pier groins, precast concrete boxes of various sizes can be used for various site-specific conditions. For instance, precast septic tank forms come in various sizes, e.g. approximately five feet wide by eight feet long and three feet depth, with walls four inches thick. Concrete boxes made from these existing forms can be used with modifications of openings, stronger and more waterproof concrete, reinforcements, connecting devices and the like, being sunk in position to form the base of pier-groins and the like and filled with water, rocks, sand or rubble. However, preferably they are adapted as shown in FIG. 4 and disclosed in U.S. Pat. No. 5,697,736, where the box (81) has four sides which have been perforated or slotted with circular holes (83) and/or rectangular slots (85) of a few inches diameter or width. This will make the boxes easier to sink and anchor in position. As with the inverted T units shown in FIG. 2, the boxes can have holes formed in the bottom to accommodate anchoring stakes of rebar, screw anchors such as shown in FIG. 24 of the previous patent, or other suitable anchoring means. Preferably plugs are used in the casting molds to form holes (83) or slots (85) which are sealed by thin layers of concrete. Such holes will also make it easier to sink the boxes in the water, as the thin "knockout" portions of the concrete can be punched out once the boxes have been floated into position. Once sunk, of course, it is difficult to refloat such boxes.

Such perforated and/or slotted boxes can serve an additional function beyond anchoring the foundation of a pier groin or other component. Since waves striking the surfaces of such boxes will be partially interrupted or deflected and partially absorbed by passage through at least one side of the box (i.e., the perforations or slots), their force will be at least partially dissipated. The water inside the boxes remains largely restricted or "dead" during the time periods of the waves. Thus, such boxes may be used as "wave degeneration cells" as components of the foundations of pier-groins, groins parallel or perpendicular to the shoreline, or even breakwaters. The dimensions and arrangement of the boxes as well as the dimensions and locations of their perforations and/or slots are of course selected to suit expected conditions. Additionally, these boxes with openings could also serve as protected nurseries for baby fish, crabs, oysters, etc. Such boxes, and other precast concrete boxes described below, can also be used on the sea bed to support racks, baskets or other substrates above siltation levels for shellfish to adhere and grow. Providing such elevated shellfish beds may permit the shellfish to be placed at the optimum depth of water to avoid pollution and siltation and obtain maximum benefit from currents, sunlight and nutrients. The perforations and/or slots should not extend too close to the base, where they might hinder retention and/or accumulation of anchoring material.

Such a breakwater can be built by anchoring a linear array of the precast concrete boxes so as to form a wall either, e.g., five or eight feet wide, then stacking the units as shown in FIG. 4 and lashing or otherwise fastening them together to form a breakwater of suitable height. At least the lower layer of the boxes should be at least partially filled with sand, rock or other anchoring material, but vacancies left in some of the boxes will provide shelter for marine life, thanks to the perforations and/or slots which allow easy access.

Figure 5:
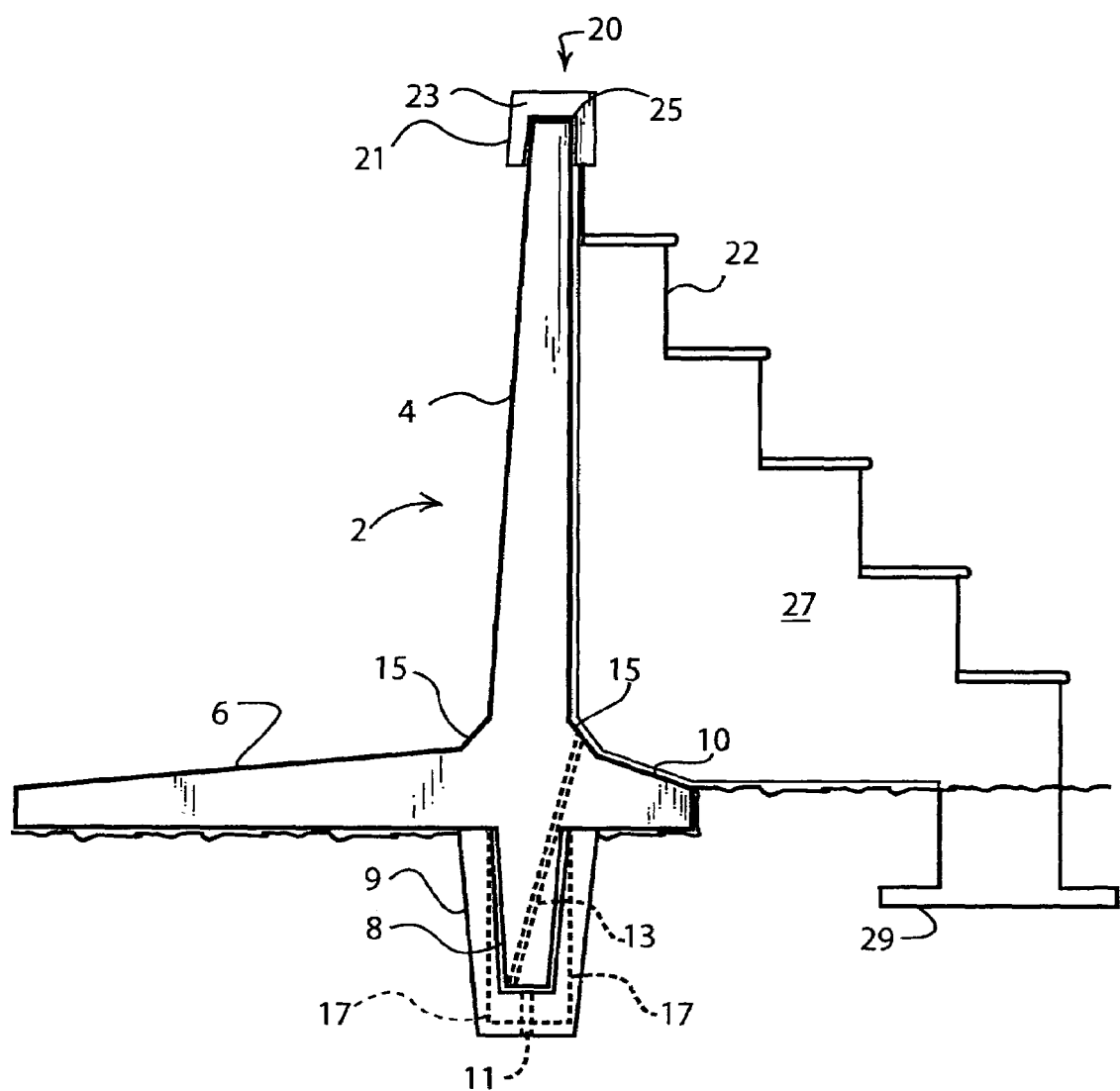
FIG. 5 is a side view of an improved "L-wall" for use in the present invention.

FIG. 5 is a side view of an improved L-wall in accordance with the present invention. Reinforcing bars, drain holes, securing holes and the like can be included as shown in FIG. 1, and are omitted here for clarity. Fillets (15) can be formed of concrete between wall (4) and footer (6)(and/or splash plate (10) to increase the strength of the unit and provide more cover for the steel reinforcing bars. L-wall (2) is shown with vertical key (8) placed in a concrete culvert or "trench" (9) of various depths which has been dug, levelled and backfilled to facilitate installation of the L-wall. Pipe (13) is cast into the portion of the L-wall between splash plate (10) and footer (6) to provide a channel for pressurized water (or water-air mixtures) to be used for "jetting" the key (8) into place in sand and/or for flushing the key trench. Only one pipe (13) is shown in this view, but a series of pipes are to be cast into the L-wall along its length to facilitate jetting the unit into the sand which has been cleared of rock and debris. Any suitable arrangement of hoses and/or manifolds can be used to introduce water and/or air through pipes (13) during "jetting in" the L-wall. Such "jetting in" procedures are described in columns 9/10 of U.S. Pat. No. 5,697,736. Another series of pipes (11) are included in trench (9), also to assist in jetting the trench (9) into the sand. Expanded metal or heavy wire mesh is bent into lengths of rectangular reinforcement (17) which are open at one end and cast inside trench (9) to form a reinforcing structure.

Improved L-wall (2) is shown here with a precast concrete tip cap (20) placed atop the vertical or stem portion (4). Tip cap (20) is formed much like a household rain gutter, with sides (21) and bottom (23) defining channel (25), and is preferably cast in appropriate lengths to cover the entire length of the L-wall, although they can also be formed in shorter units. Among other uses, such caps (20) can be placed atop a series of L-walls to hold the tops of their stems (4) in alignment. Also shown schematically with this improved L-wall (2) is a set of precast concrete steps (22)

cast with cap (20), a precast body incorporating a series of right angles which can form steps when aligned with one side of stem (4) of L-wall (2). The steps are braced on both sides by solid sidewall units (27) which are cast on each side of the step ends and contact L-wall (2) on the seaward face, respectively, of stem (4) and splash plate (10). Such a step installation can be conveniently used by persons to climb to the top of the L-wall, which may form a portion of a seawall, bulkhead or the like. Such steps could be placed near the upstream or upcurrent side of a groin, where they would be covered by more sand on the lower steps for stability.

Figure 6:
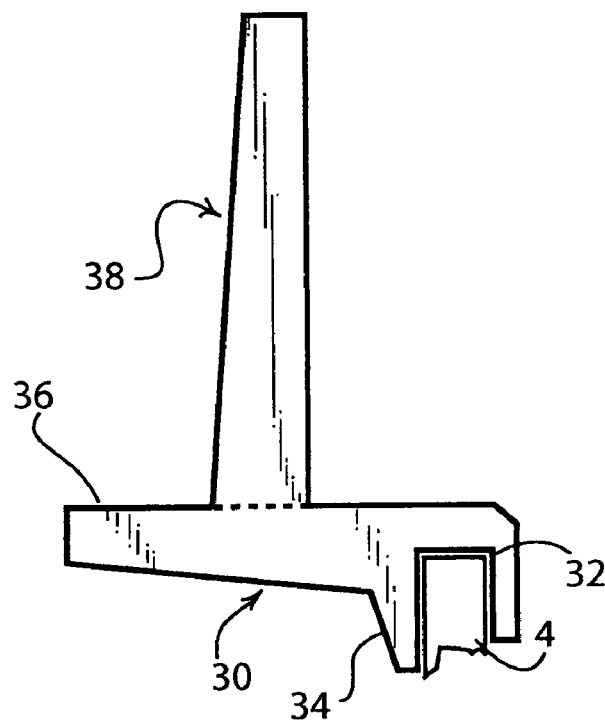
FIGS. 6 and 7 are sectional views of accessories in use with the L-walls of FIG. 5.

FIG. 6 is a side view of another accessory for L-walls (2), namely a precast concrete sidewalk cap 30 having a channel (32) formed therein to fit atop stem (4) of L-wall (2), a cantilever support (34) and a flat walking surface (36) extending to one side of the unit. When L-wall (2) is built into a seawall or the like and the landward side is filled in, such sidewalk caps (30) can be installed atop the L-walls to provide a flat surface suitable for use as a sidewalk or the like. Furthermore, precast concrete terrace retaining walls (38), having a slightly tapered rectangular cross-section, can be cast into such a sidewalk cap (30) to extend the height of the L-walls. This is also convenient for forming a low wall separating a sidewalk or walkway from the seaward side of a seawall constructed of L-walls, if not backfilled. Optionally, retaining walls (38) could be separately cast and mechanically attached to sidewalk cap 30. In addition to providing a flat surface atop a seawall or the like which can serve as a sidewalk, sidewalk cap (30) covers the area immediately behind the L-wall to prevent scour from waves or rain. Terrace retaining walls (38) can be backfilled to provide retaining walls atop sidewalk cap (30), or left freestanding as safety rails.

Figure 7:
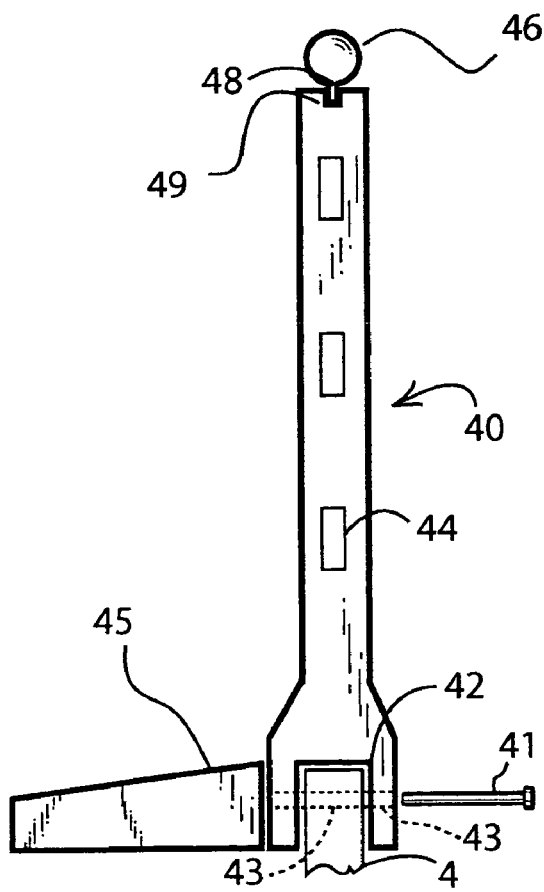

FIG. 7 shows a side view of the top of stem (4) of an L-wall (2) which has been topped with a railing cap (40). Railing cap (40) has a broadened lower end containing a channel (42) adapted to fit the top of stem (4) (as with the sidewalk cap discussed above), and is secured in place by slipping channel (42) over the top of stem (4). Cap (40) can be mechanically fastened to stem (4) by any suitable mechanical means, such as pins or bolts (41) passing through holes (43) in both the base of cap (40) and stem (4). A cantilever section (45) can be added to cap (40), either cast integral therewith or attached by any suitable mechanical means, to add strength and provide a narrow walkway landward of cap (40). As with the sidewalk caps, these railing caps can be fabricated in various lengths, and can be used to keep the tops of the stems of adjacent L-walls in alignment in addition to providing a railing or terrace wall atop an array of L-walls. Railing caps (40) can also be fabricated in much shorter lengths or as posts (i.e., a foot or so in length and width), with railings (not shown) inserted through holes (44) in adjacent units and mechanically secured in place. Optionally, for ornamental and personal comfort purposes, an ornamental railing 46 can be secured to the top of such railing caps by inserting mechanical connection strip (or pins) (48) into groove or holes (49) in the top of railing cap (40). Railings (46) can be made of materials such as wood, metal and polymeric compositions, preferably those which can be made smooth to the touch and durable when exposed to the elements.

The sidewalk, terrace and railing caps described above can be precast concrete as discussed in U.S. Pat. No. 5,697,736, and can be connected together if desired, by mechanical devices also disclosed in that patent.

Figure 8:
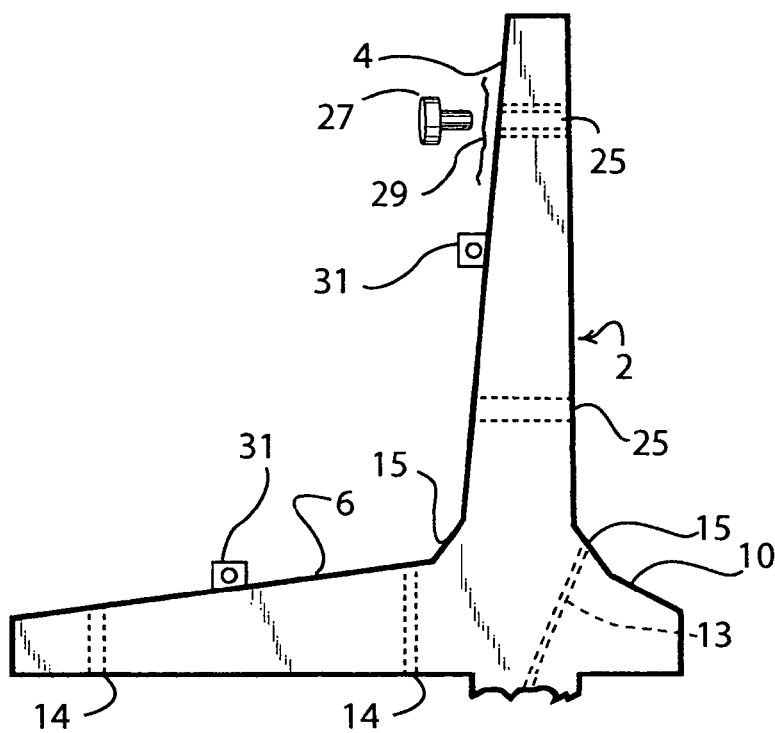
FIGS. 8 and 9 illustrate further refinements of the L-walls of FIG. 5.

FIG. 8 shows a side view of the improved L-wall of FIG. 5, with additional features. Holes (25) are included in the stem (4) of the L-wall during casting, to provide for drainage through the L-wall from the landward side to seaward. These holes can be plugged if necessary (e.g., when L-walls are used to form a dam or dike) with solid plugs (27) (formed of any durable polymer such as polyvinyl chloride), or hollow plugs retaining in place a filter cloth soil retainer (29). Filter cloth retainers (29) are used in lieu of a larger continuous piece of filter cloth or geotechnical material to cover holes (25). If such filter cloth or geotechnical fabric should deteriorate over time, additional solid or hollow plugs could be inserted from the accessible seaward side of the L-wall. Perforated metal or polymeric fittings (31) are cast into stem (4) and/or footer (6) at each end of the L-wall to provide means for interconnecting the L-walls via bolts or other suitable mechanical fasteners. Drain holes (14) can be left open or plugged with solid plugs (27) or hollow plugs with filter cloth, as described above.

The improved L-walls of the present invention can incorporate the extended angular splash plates, disclosed in column (6) of U.S. Pat. No. 5,697,736 and the figures cited, which are incorporated herein by reference.

Figure 9:
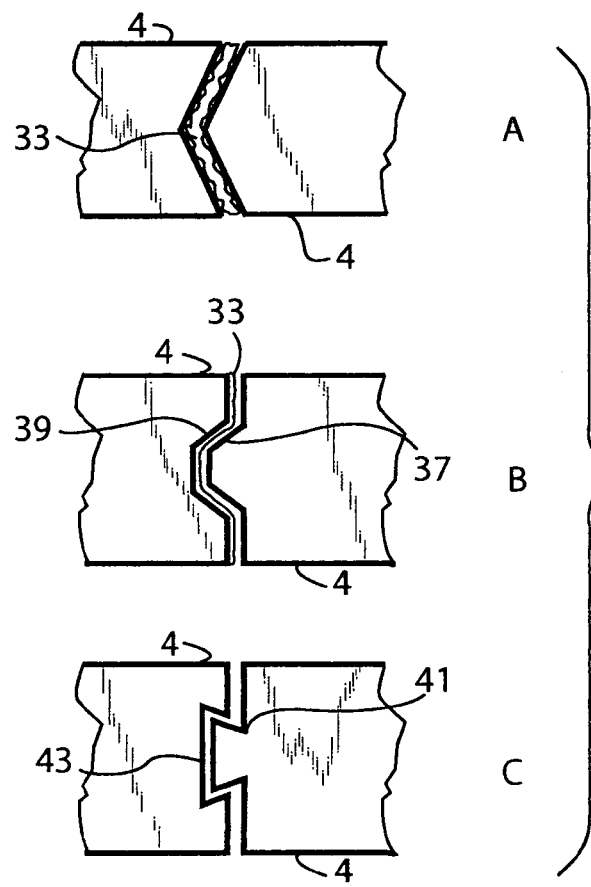

FIG. 9 provides a top view of the stems (4) of two L-walls (2) which are to be fitted together. In A, the edge of the stem (4) at the right is bevelled so as to fit into a corresponding groove in the stem (4) on the left, backed by filter cloth for drainage or filled with bead caulk (33) or other suitable material to be inserted between their surfaces to provide a good seal between the two L-walls if used as a farm pond dam or the like. The L-walls of the present invention can be cast with one end of the stem bevelled and the other grooved, as described, to facilitate such fitting together during installation. At B, the stem (4) at right has a trapezoidal projection (37) which fits into a corresponding groove (39) in the other stem (4). Caulking material (33) can be used as in A. The C version uses a dovetail method, with projection (41) and groove (43) in the two stems (4), to provide a more secure fit. One L-wall must be lifted to join the two stems in this case, and caulking is optional.

Figure 10:
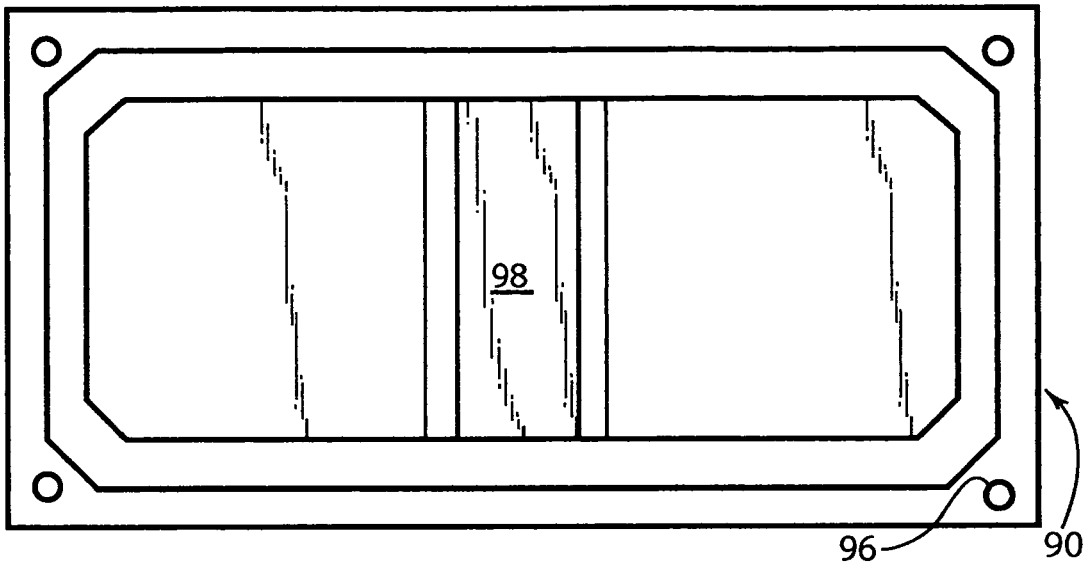
FIGS. 10–12 are plan, side and end views of improved precast concrete boxes of the present invention.
Figure 11:
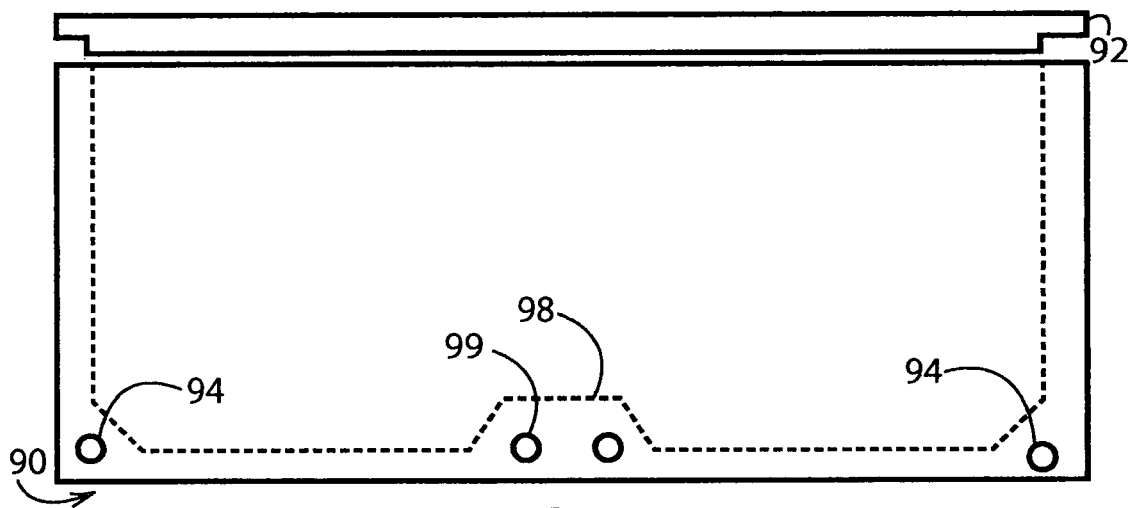
Figure 12:
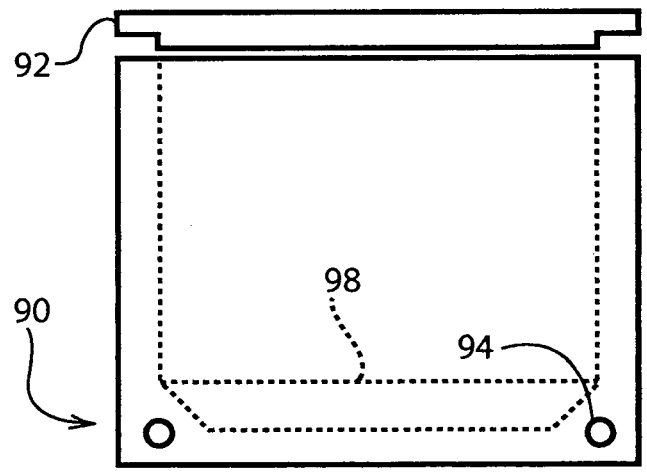

FIGS. 10 to 12 are plan, side and end views of precast concrete boxes of the invention which can be employed on shorelines, underwater and in intertidal zones. The boxes (90) take the form of a simple hollow box of rectangular parallelepiped form with sides, ends, bottom and open top, which can be optionally capped with a tight-fitting top (92), held in place by gravity or optional mechanical fasteners (not shown here). Top (92) is omitted in FIG. (10) for clarity. Holes (94) are provided in the lower corners of the sides and ends to be used for connecting cables or rods (not shown here). Vertical holes (96) are provided in each corner of the box at the top to assist in securing top (92) when used or for mechanical connecting devices when the boxes are stacked or secured to the bottom. A low sill (98) on the inside bottom divides the box into halves for connecting overlapping boxes alongside, and holes (99) extend laterally from side to side through this sill to accommodate connecting devices such as cables or rods and also handling means. The boxes shown here are intended to be fluid tight (when capped), in contrast to the boxes of FIG. 4, which are open to the water in which they are immersed. The boxes can be positioned adjacent each other (side-by-side and/or end-to-end) and fastened together using holes (94), (96) and (99) and various mechanical fasteners. When interconnected side-by-side, the boxes are preferably positioned in overlapping fashion (with the ends of two boxes positioned adjacent the center of a third box) to form a stronger structure. These boxes can also be stacked as shown in FIG. 4.

These boxes and those described below are "intermodal" shapes which can be conveniently handled and shipped by at least two modes of transportation, including trucking, railcar and surface water transportation including container ships and barges. That is, they have dimensions (length, width, height) which will permit them to conveniently fit into the allowable spaces in such transport media, either singly or in combination. For example, currently standard containers measuring eight feet square and either twenty or forty feet long can be easily transported by ship, rail and trucks. Furthermore, these boxes can be produced as sets of at least two different sizes, having proportional dimensions which facilitate their use in standard size transportation media and together to form structures such as seawalls and other shoreline reinforcing systems of various sizes.

For example, FIGS. 13A, 13B and 13C provide top, side and right end and plan views, respectively, of boxes of several dimensions positioned on deck for transport in a space forty feet long and 24 feet wide, with boxes stacked to a uniform height of eight feet. The dimensions of boxes of types A through H are indicated in the legend. Clearly, where boxes having dimensions as large as eight feet square by forty feet long can be conveniently transported, a number of boxes having at least one dimension a suitable fraction (e.g., one half) of these can be assembled to fill the same space for transport. Thus, for an intermodal set of boxes, the maximum dimensions are determined by the maximum space available on deck and/or inside a truck trailer or railcar, and smaller boxes can be designed with similar proportions but having at least one dimension which is, e.g., one half or one third of those of the largest box of the set. In other words, the smaller boxes are produced with one, two or three dimensions which are a fraction (preferably divided by a whole number) of the corresponding dimensions of the largest box of the set, which may be described as the "master" box.

Figure 14A:
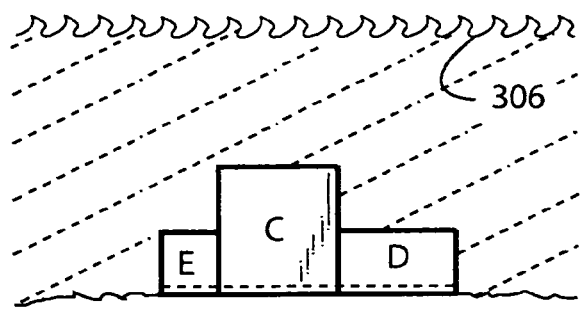
FIGS. 14A and 14B are end and plan views, respectively, of an underwater breakwater assembled of such boxes.
Figure 14B:
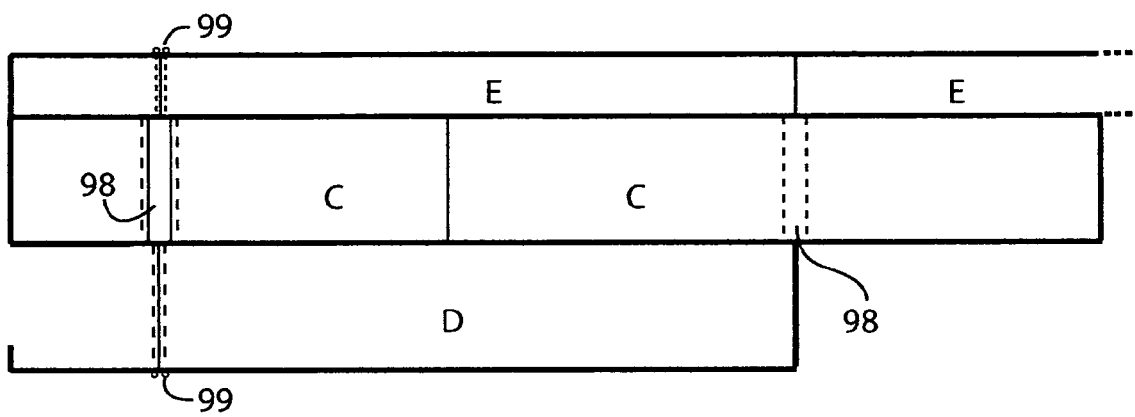

Similarly, FIGS. 14A (left end) and 14B (plan view) illustrate the use of boxes selected from those of FIGS. 13A and 13B to form a structure under the surface (306) of the water. Two "C" boxes with inner partitions (98) are positioned end-to-end, and are overlapped by box "D". Two "E" boxes are similarly placed, with their midpoints overlapping the junctions of the "C" boxes. Pairs of boxes can be interconnected by mechanical fasteners (99).

Figure 15:
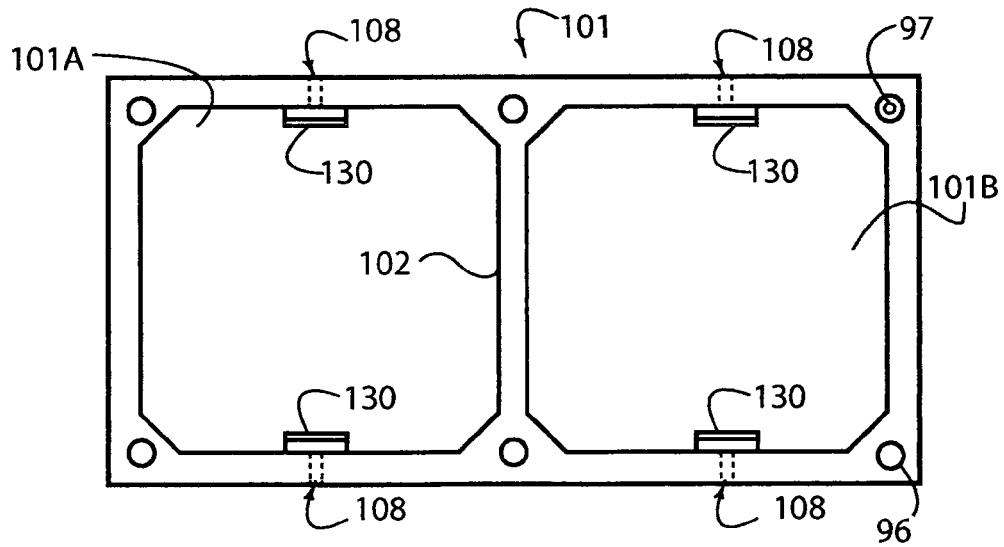
FIGS. 15–17 are plan, side and end views of such precast boxes with provisions for sinking same in water and raising them thereafter.

FIG. 15 is a top view of an improved version of the box (90) of FIGS. 10–12, with a partition wall (102) dividing the box (101) into halves 101A and 101B. The box has the general shape of a rectangular parallelepiped, with certain preferred ratios of dimensions which are discussed above. Vertical, horizontal and longitudinal sections of conduit are cast into the walls to form holes (96) in the corners and midpoints of the walls. These formed pipes can be used for reinforcement (shown as 97), lifter and stacking attachment points and post tension cables or conduits for wires or fluids when used as building modules. Slab tops (92) (not shown here, but similar to those of FIGS. 11/12) can be used to seal the boxes. Alternatively, such boxes could be cast in two halves, either top and bottom or front and back portions. Pressurized fluid (water and/or air) could support an internal expendable lightweight form to support the wet concrete being cast atop the cured bottom half to create a unitized watertight structure. Flood and drain holes (108) pass through the sides of box half 101A for flooding or draining, as discussed below, and are protected by internal grates (130).

Figure 16:
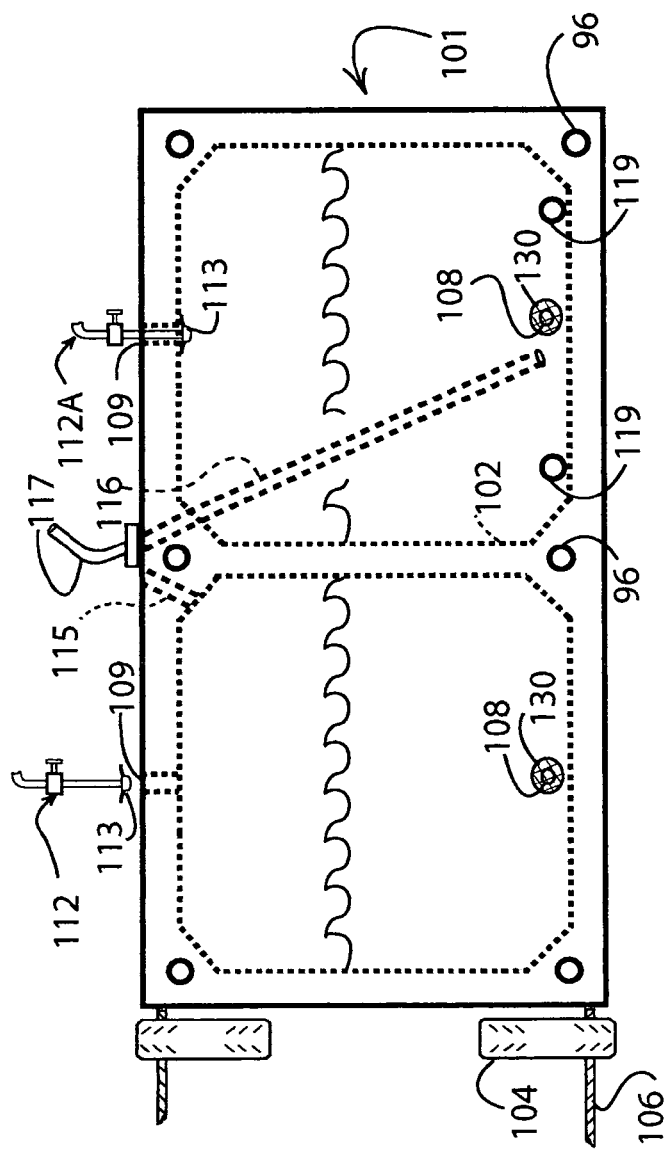
Figure 17:
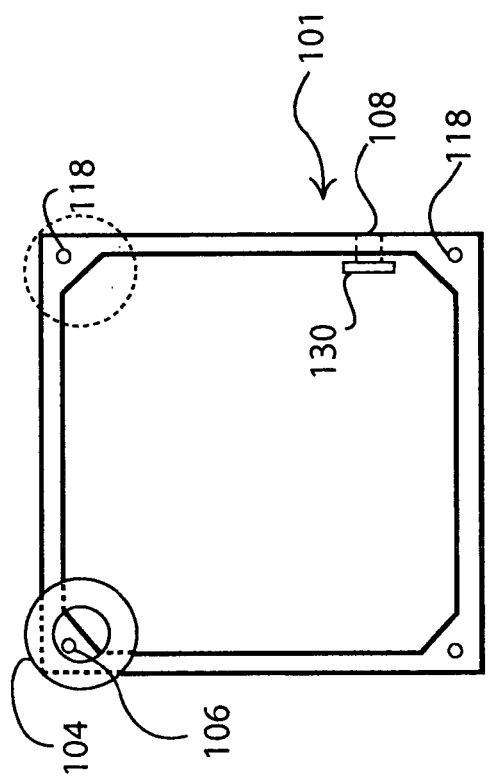

FIGS. 16 and 17 are side and end views of an improved box (101), similar to box (101) of FIG. 15, illustrating devices for flooding and blowing the box when in the water, and for fastening such boxes together to form a structure. The boxes are completely enclosed, including a solid top or top half bolted and sealed with gaskets, elastomeric sealants or other suitable sealing means. Cables (106) are connected to the left side of box 101 through holes 118 in the corners and tensioned to compress a line of boxes together, and are also connected to the adjacent box in an array thereof. Resilient cushioning materials such as used tires (104) are preferably suspended from cables (106) between the boxes to minimize impact damage where desired. Such cushioning materials should be placed at each corner between adjacent boxes.

FIG. 17 is an end view illustrating the placement of such tires, using holes (118) in the corners of the box. Flood/drain holes (108) (shown as one method for 101A) at the bottoms of the sides of the box half 101A are penetrated by knocking out a thinner casting of concrete should the box need to be flooded and sunk or later blown and surfaced. These holes are protected by inner grates (130) to keep out gravel, etc. Valve assembly (112) with an expandable washer which seals inside against air pressure, an example of which is shown inserted as (112A), is held in place in blow and vent hole (109), and sealed by a flexible "bayonet" anchor washer (113). An expandable and threaded quick connect blow fitting (shown in FIG. 30) is an alternative. Holes (115) penetrate the reinforced section adjacent to partition wall (102), and can be unplugged and fitted with pipe snap-in connections (116). To flood the box, hose (117) can be attached to the discharge of a pump or inserted into the sea and used as a siphon with hole (108) open, or alternatively inserted in valve (112A) open as a vent. To deballast water, this is used if the flood/drain holes (108) are intact and are covered by accreted sand. Also, these holes (115) can be interconnected to equalize pressures between the two sections of the boxes to float level. One end only could be deballasted to raise that end and break the bottom suction forces to surface the box. Alternative flood/drain holes (119) can be included in the bottoms of the boxes, with external plugs which could be uncovered and removed to permit deballasting. The box can be made to float unevenly if needed by partially flooding the portion at the end to be deeper.

Figure 18:
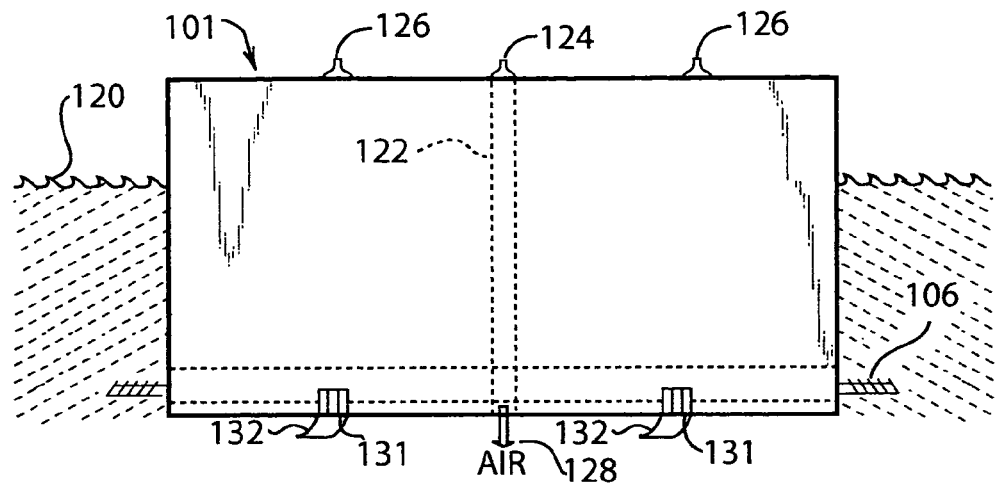
FIG. 18 is a side view of a precast concrete box of the present invention floating near the surface of a body of water.
Figure 19:
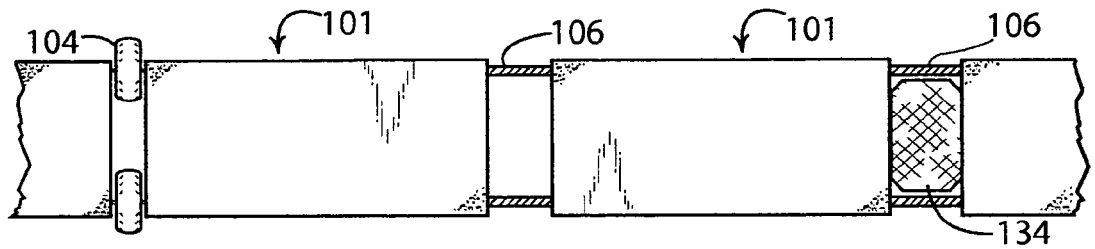
FIG. 19 is a top view of a series of precast concrete boxes connected together to form a structure.
Figure 20:
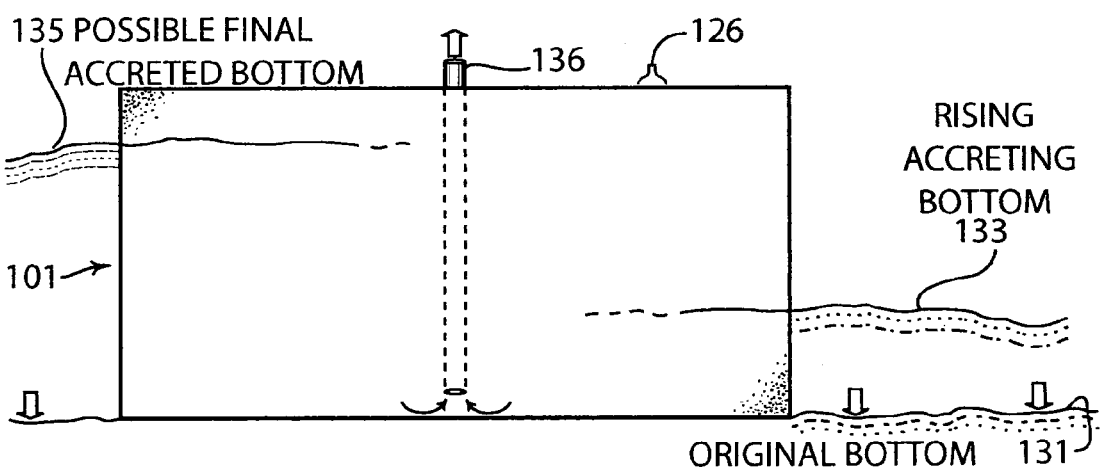
FIG. 20 is a side view of a precast concrete box of the invention which has been sunk to the bottom in a body of water.

FIGS. 18 to 20 illustrate a method of floating single compartment boxes into position and sinking them in place for installation. FIG. 18 is a side view of a box (101) floating near the surface of a body of water (120). Box (101) can be attached to a similar box via cables (106) attached at the corners or passing through holes (118) at the corners (only partially shown for clarity). High pressure blow/vent valves (126) (similar to valve 112 in FIG. 16) are fitted to the top of box (101). As an addition, a septum with an air pipe or simply an air pipe (122) with valve (124) can be used to break suction, and air can be ejected through the bottom at (128). Grated flood/drain check valves (131) are fitted with rubber flapper covers (132) which close after the box has sunk to the bottom to prevent sand entry, but open when air pressure forces water out of the box for deballasting.

Figure 46:
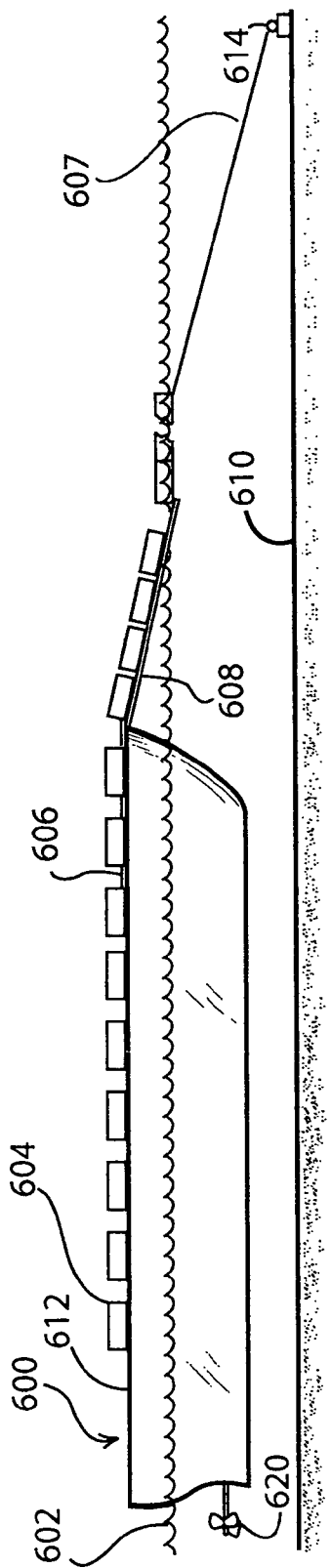
FIGS. 46–48 are side views illustrating the launching of floating precast concrete boxes of the invention from a ship or barge and the sinking thereof to form an underwater structure.
Figure 47:
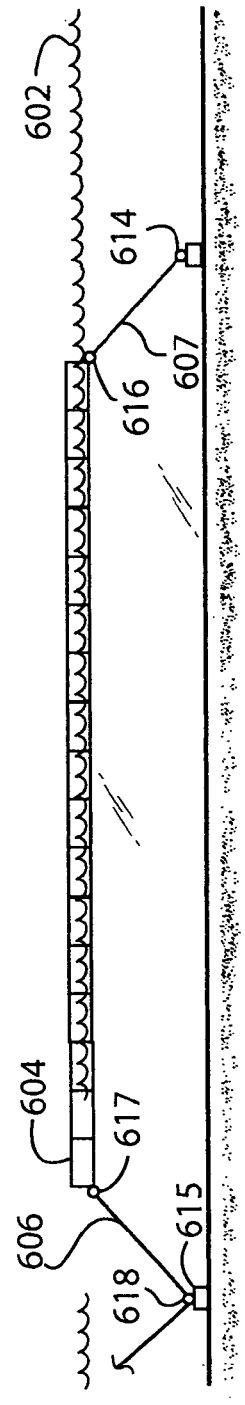
Figure 48:
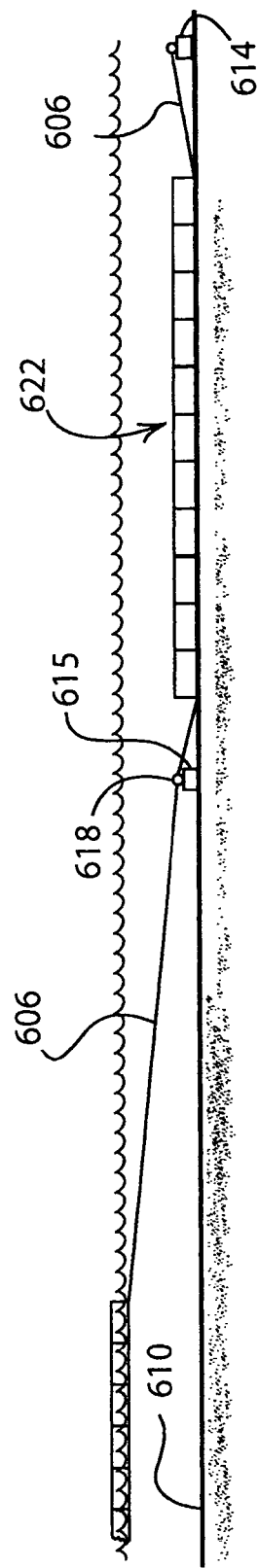

As shown in FIG. 19, several boxes (101) can be interconnected to form an array, with cables (106) and tires (104) between adjacent boxes. Alternatively, larger cushioning materials (134), such as an inflatable fender, rope fender or the like, can be employed. In operation, a single box (101) or an array thereof (FIG. 19) is placed in the body of water near the proposed underwater or tidal installation and moved into position. The box or array can be pushed or towed by tugboats, small boats or any other suitable force. Once in position directly above the proposed installation site, the box or boxes are sunk in place by opening vent valves (126). Hydraulic or electrically operated valves, actuated by suitable signals conveyed by electrical, acoustic or optical (i.e., fiber optics) means, can be opened sequentially for a controlled and coordinated sinking of the boxes. The box or array will normally require some longitudinal restraint or guidance, such as anchors, to ensure that it sinks into the desired spot. Lines tended by anchored boats or divers should suffice for side-to-side alignment of the boxes. Alternatively, anchors and small craft or tugs can be used, as illustrated in FIGS. 46–48.

FIG. 20 is a side view of a box (101) which has been sunk in body of water (120) to rest upon the bottom (131). Rock, gravel, sand and other materials can be added in and around the structure to create great mass inside (if (101) is an open box) and a higher sea bottom around the box or array thereof, as indicated at (133), and with time and tide, additional sand, silt or other materials may collect around the structure to create an even higher bottom surface, as at (135). Also shown in FIG. 20 is a pipe or tube (136) extending from top to bottom of box (101), providing an alternative method of flooding and draining the box. Air can be vented through valve (126) while water is siphoned into or is pumped in through pipe (136) to initiate flooding of the box, until pipe (136) is submerged when air venting through valve (126) will suck water in through pipe (135). Suction can be applied to substantially drain the box when needed, with air admitted through a hose, or while air under pressure through valve (126) will also do the job. Pipe (136) is permanently installed or can be inserted through unplugged precast holes.

Figure 21:
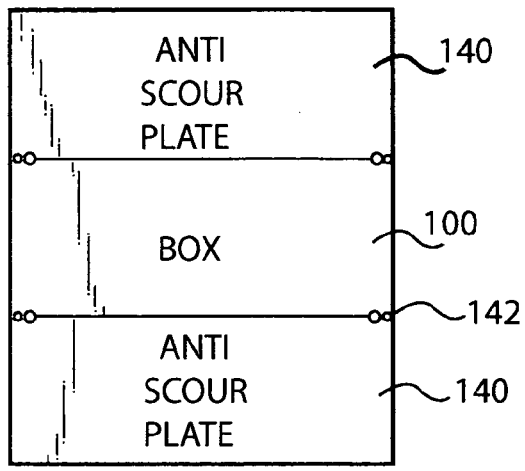
FIGS. 21–23 illustrate anti-scour plates for use with the precast concrete boxes of the invention.
Figure 23:
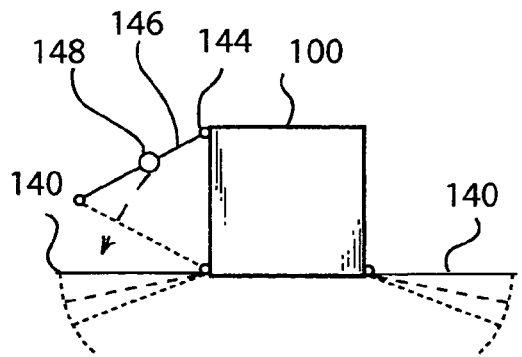
Figure 22:
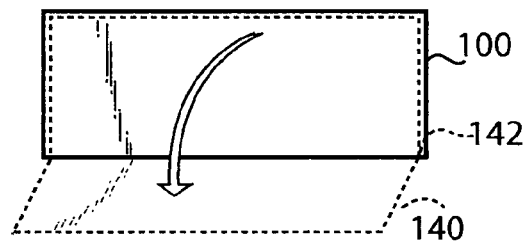

FIGS. 21, 22 and 23 illustrate the use of anti-scour plates in conjunction with the boxes of the invention. As described for the L-walls of the invention in U.S. Pat. No. 5,697,736 at columns 5/6, waterfront structures subject to waves, tidal action or storms may require devices to prevent water from "scouring" or eroding the beach material from under the seaward edge of the structure. FIG. 21 is a plan view showing anti-scour plates (140) attached to both sides of box (100) at the lower edges by mechanical means (142) such as hinges, hooks, rings, cables or the like. When both sides of a box incorporated in a waterfront structure are exposed to water, anti-scour plates on both sides may be required, as seen in FIG. 21. As shown in FIG. 22, when installing box (100), anti-scour plate (140) can be lowered into a position to contact the beach or underwater bottom surface beside the box. Prior to installation, anti-scour plate(s) (140) can be retained in place against the sides of box (100) by suitable mechanical means such as lockable lashing eyes (170) (shown in FIG. 25). As shown in FIG. 23, the anti-scour plates (140) can be raised or lowered into position by any suitable mechanical means, e.g. using cables (146) attached to attachment points (144) and winch (148) (or other hoisting means). Once lowered to contact the beach surface, such anti-scour plates may be covered by deposited sand and gravel or scoured and lowered to a position of stable equilibrium and embed themselves in the beach or underwater bottom surface to prevent water from removing beach material from under the edge of the box. Such anti-scour plates can be formed from precast concrete, corrosion-resistant metals, geotextile materials, polymer composites, or any suitable material which has the required properties of stiffness and durability. The boxes can be shipped with anti-scour plates attached, or the components can be shipped separately.

Figure 25:
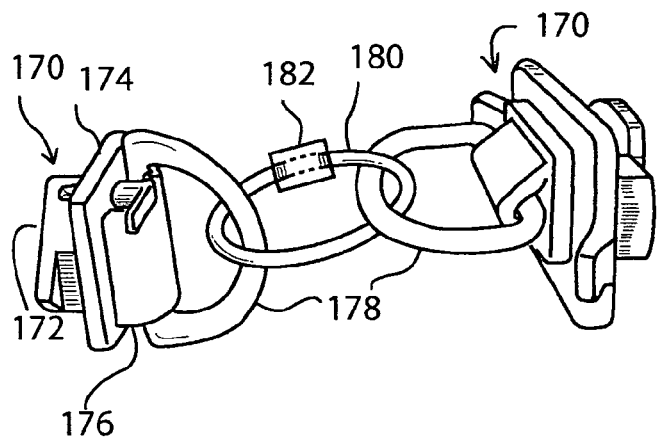

FIGS. 24 and 25 illustrate mechanical attachment means which can be used to fasten such anti-scour plates to the boxes. FIG. 24 is a perspective view of a commercially available "twistlock stacker" (150) used to interconnect containers on container ships. These units include locking plate (158), attached to body (160). Handle (154) is used to manually rotate locking plate 158. To form a hinge, a large bolt (153) can be inserted through eye (155) of one unit (on top 156) and through the eye of a similar unit. The hinge is suitable for one-time uses, as in securing anti-scour plates to boxes.

FIG. 25 is a perspective view of two D-ring lockable lashing eye units (170), having D-rings (178) attached to D-ring hinge (176), which can be attached to boxes (100) by divers, or on the ship before offloading, and linked by mechanical means including chains, U-bolts or detachable links (180), closed by nut (182), to form a hinged attachment of the anti-scour plates to the boxes. The units can include lock (172), and the D-rings (178) are attached to plate (174). Such fittings are commercially available from many marine supply houses.

FIGS. 26 to 29 illustrate methods of attaching adjacent boxes (100) and/or (101) together to form arrays. FIG. 26 is a side view of two adjacent boxes (100), each having a locking plate receptacle (180) cast into the corner of the concrete box and anchored by steel connectors such as reinforcing bars (182). Such units consist of a hollow metal box with smaller racetrack opening (185) embedded in the concrete to receive locking plate (186) of twist lock inserted through opening (185) and twisted with lashing eye (189). Chains, cables, turnbuckles or other suitable mechanical connecting means (not shown here, for clarity) can be fastened to locking plate (186) to connect the boxes. These connecting means can be used in lieu of or in addition to tensioned cables (106) (see FIGS. 16, 18, 19) for interconnecting the boxes. Such connecting means can be connected onboard the ship or barge before offloading, or by divers on the bottom.

FIG. 27 is a side view of two boxes (100) held together by a differential screw (190) and cushioned by used tire (104) or the like. Female twist-lock locking plate receptacles (180) which are welded to reinforcing bar and cast into the concrete box (same as in FIG. 26) contain an oval or oblong lip and recessed larger opening underneath. Nuts (188) are included and attached pivotally to locking plate (186) through which differential screw (190) can be threaded through a twist-lock lug (188) to fasten the boxes together. Holes (187) in locking plate (186) provide recesses for a tool to apply torque to the lock. Fittings (192) for a power-driven drill socket are provided to tighten differential screw (190) and produce the desired spacing of the boxes and screw tension.

FIG. 28 is a side view of a simpler connecting system in which boxes (100) are fastened together by a turnbuckle (200) connecting recesses (187) in bases (184). Many standard commercial turnbuckles can be used, with hooks (206) of turnbuckle screws (202) inserted into recesses (187) and tightened by rotating turnbuckle screw (204).

FIG. 29 is a side view of two boxes (100) having recesses (187) in bases (184) installed in each corner, which are to be connected by a strong metal plate (210) (or the like) and two twistlock stackers (212), shown schematically in perspective as attached to the plate. The boxes are connected simply by positioning them the correct distance apart and inserting and tightening twistlock stackers (212) (shown in detail in FIG. 24) into recesses (187) and locking them therein.

Figure 30:
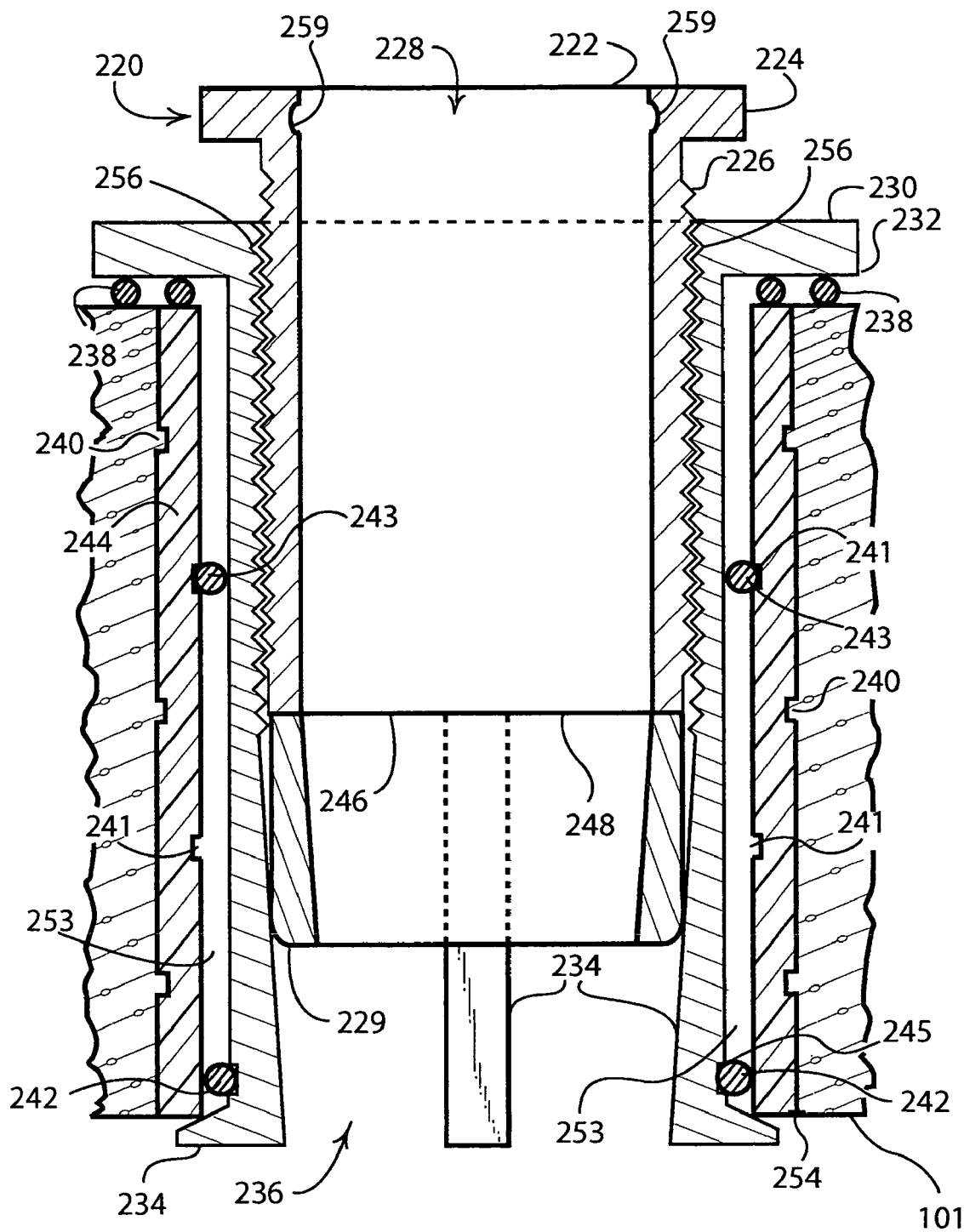
FIG. 30 is a sectional view of a quick connection for an air hose inserted into a hole in the tank which can be employed to refloat the precast concrete boxes of the invention.

FIG. 30 is a sectional view of a quick-connect fitting (220) inserted through a hole (254) in box (100) or (101) (formed by pipe (244) cast in place or placed in hole 254) for venting and blowing. A hole (254) is molded or otherwise formed in the wall, top or bottom of box (101), and is lined with or cast with a polymeric pipe insert (244) which is formed of polyvinyl chloride, another suitable polymer or other suitable material. Grooves (240) in the outer surface of insert (244) will retain part of the wet concrete and bond the insert to the concrete hole if inserted during molding. Grooves (241) on the inner surface of pipe insert (244) can be fitted with elastomeric O-rings (243) to provide a seal between pipe insert (244) and locking fitting (230). A larger tight O-ring (242) fits in groove (245) to provide a force to squeeze locking arms (234) of the locking fitting (230) inward to allow a fit into pipe insert (244). Locking fitting (230) is fitted with top flange (232) and flexible locking arms (234). Additional O-rings (238) are fitted between top flange (232) of locking fitting (230) and the concrete wall of box (101) and pipe insert (244). Locking fitting (230) is formed so that the upper portion of its inner aperture is threaded (256) and the lower portion of this aperture has a smaller diameter than the threaded upper portion. This allows unthreaded cylinder (229) to fit through locking fitting (230). Inner spreader insert (222) has a top hexagonal flange (224) and is externally threaded (226) to be screwed into threaded aperture (256) of locking fitting (230). Inner spreader insert (222) has a lower, unthreaded cylinder (229) which contacts the tapered insides of the locking arms (234) of locking fitting (230) when it is screwed in and spreads the locking arms (234) to contact pipe insert (244) with a cam action to lock and compress O-rings (238). With the quick-connect fitting secured and sealed to box (100) or (101), an air line with shutoff valve (not shown) can be inserted into hole (228) and locked into groove (259) to form a quick connect coupling to permit air to blow the water ballast out of the box or connect to vent valve to contain air to float the box or release air to permit flooding and sinking.

Figure 31:
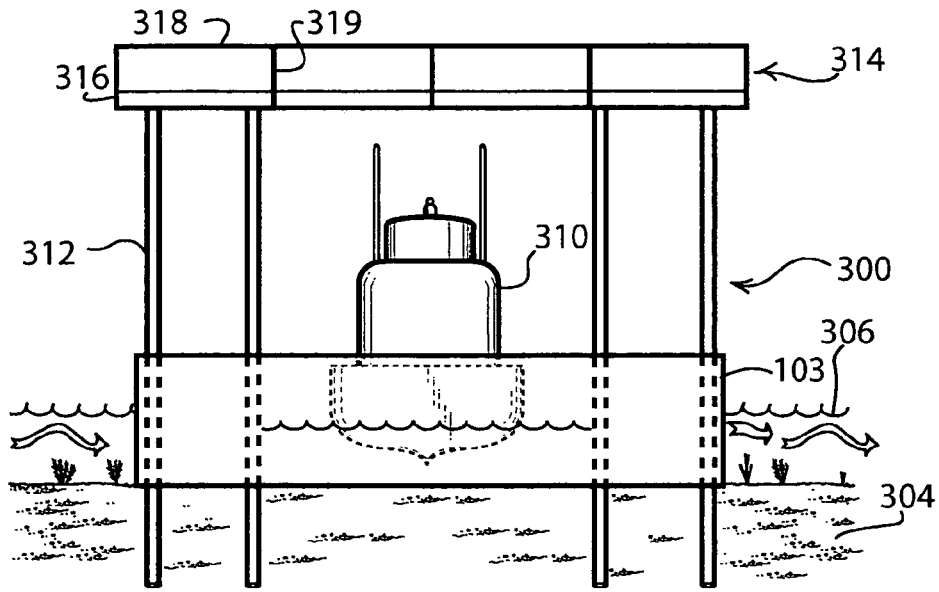
FIGS. 31–33 are end, plan and side views, respectively, of a waterfront boathouse constructed with precast concrete boxes of the present invention, resting upon the bottom.
Figure 32:
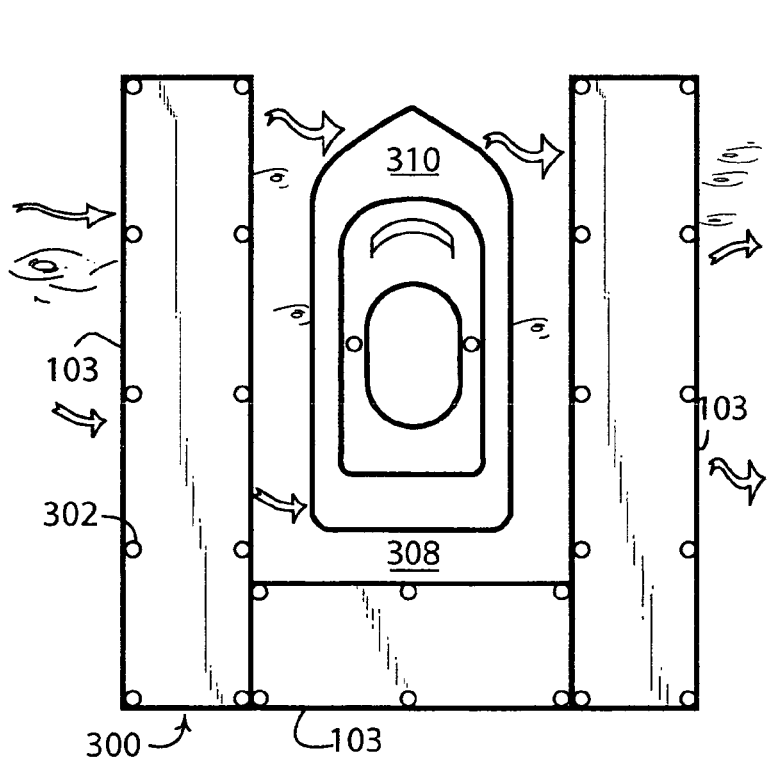
Figure 33:
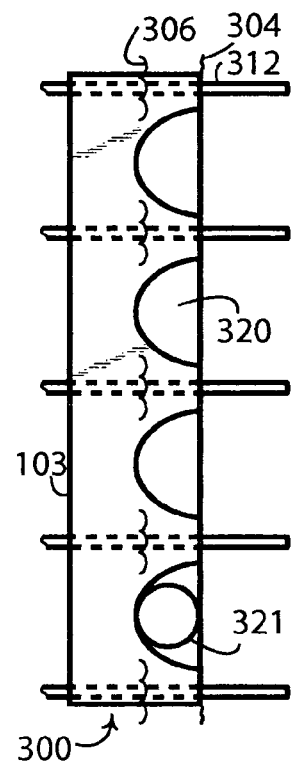

FIGS. 31 to 33 illustrate the use of such concrete boxes to construct a waterfront boathouse. Plan view FIG. 32 (without roof deck (314) for clarity) shows three or more concrete boxes (103) of suitable size and proportions assembled open side up, optionally fitted with concrete or wooden tops (e.g., as shown in FIG. 12) upon the bottom (304) of a shallow harbor or other body of water (306) in a U-shaped configuration forming a mooring area 308 to shelter a boat (310). The upper surfaces of the boxes (103) can be fitted with standard mooring fixtures and the like (not shown here), and allow passengers to easily embark and debark on or from the boat. Boats may be moored on the outer sides of the boathouse as well, if desired. As shown in end view FIG. 31, boxes (103) are higher than the depth of water (306), but for deeper water or locations where minor tides occur, boxes (103) can be stacked two or more layers deep to provide an upper surface which will lie above the highest normal water level. Holes (302) are provided in the closed bottoms and/or tops of boxes (103), or alternatively outside of the boxes, to accommodate pilings (312), which are driven into bottom (304) to retain boxes (103) in place. The boxes can also be interconnected by mechanical means, as discussed above.

The pilings are hollow tubes of metal or plastic pipe, which are filled with concrete when all boxes and pilings are in place to provide permanent structural strength. Since the main strength is provided by the concrete thus cast, the material for the pipes is not critical, but they are preferably made of durable plastic materials such as PVC so that they will not corrode. The boathouse structure here is emplaced with the closed end toward the shore (with normal walkways or the like provided for access, but not shown here) and the open end toward the water for boat access. The closed end of the boathouse is shown in FIG. 31.

Optionally, a roofdeck (314) can be provided, comprising a solid deck (316) perched atop pilings (312) and secured in place mechanically. Deck (316) can also be of precast concrete of suitable thickness such as precast sections spanning the distance between pilings (312) and any necessary supports, wood, recycled plastic "lumber" or any suitable building material. Preferably roofdeck (314) includes an open railing (318) suspended from posts (319) for safety, and is provided with access by stairs or ladders (not shown) for use by the owners. Movable or fixed side curtains or other closures such as fixed walls (not shown) can be provided for privacy and protection of boats using the structure.

Since such a structure with completely solid sides underwater could be vulnerable to scouring and forces exerted by local currents, as shown in FIG. 33, arched passages (320) and/or pipes or culverts (321) are cast or cut into the sides of boxes (103), extending approximately as high as the expected water level (306), to allow any currents to flow through as indicated by arrows in FIGS. 31 and 32. These boxes are preferably cast with a solid surface extending along arch (320) to provide a bottom of the box to hold sand which can be added for ballast. A flat bottom can also be included to spread the weight of the structure over a larger area, and the structure can also be mechanically attached to piles (312) for support to prevent settling.

Figure 34:
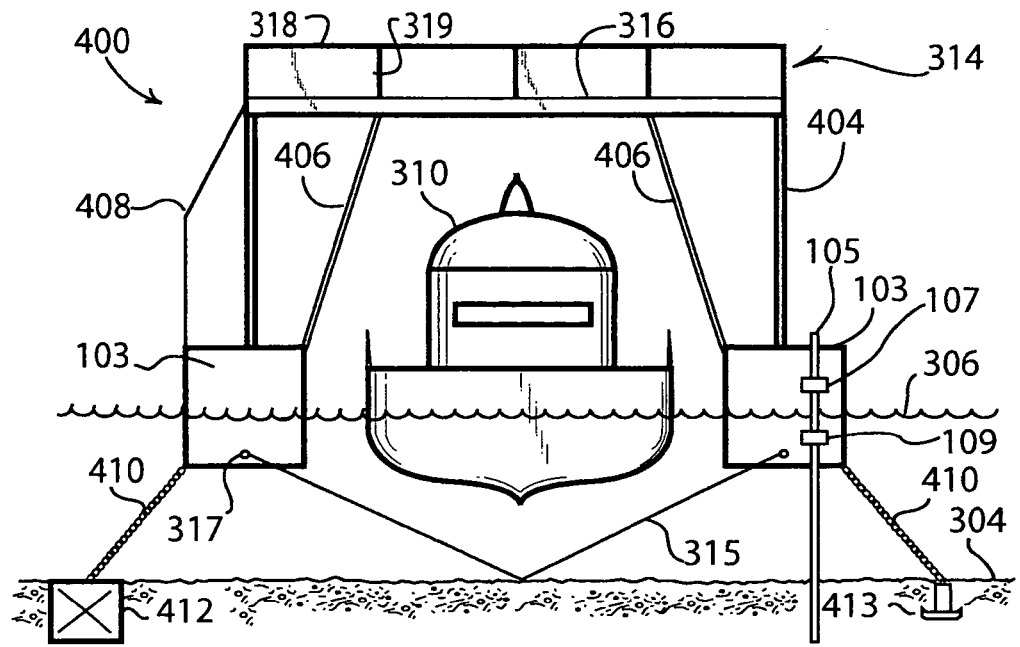
FIGS. 34 and 35 are end and plan views of a larger floating boathouse constructed using three large precast concrete boxes of the invention.
Figure 35:
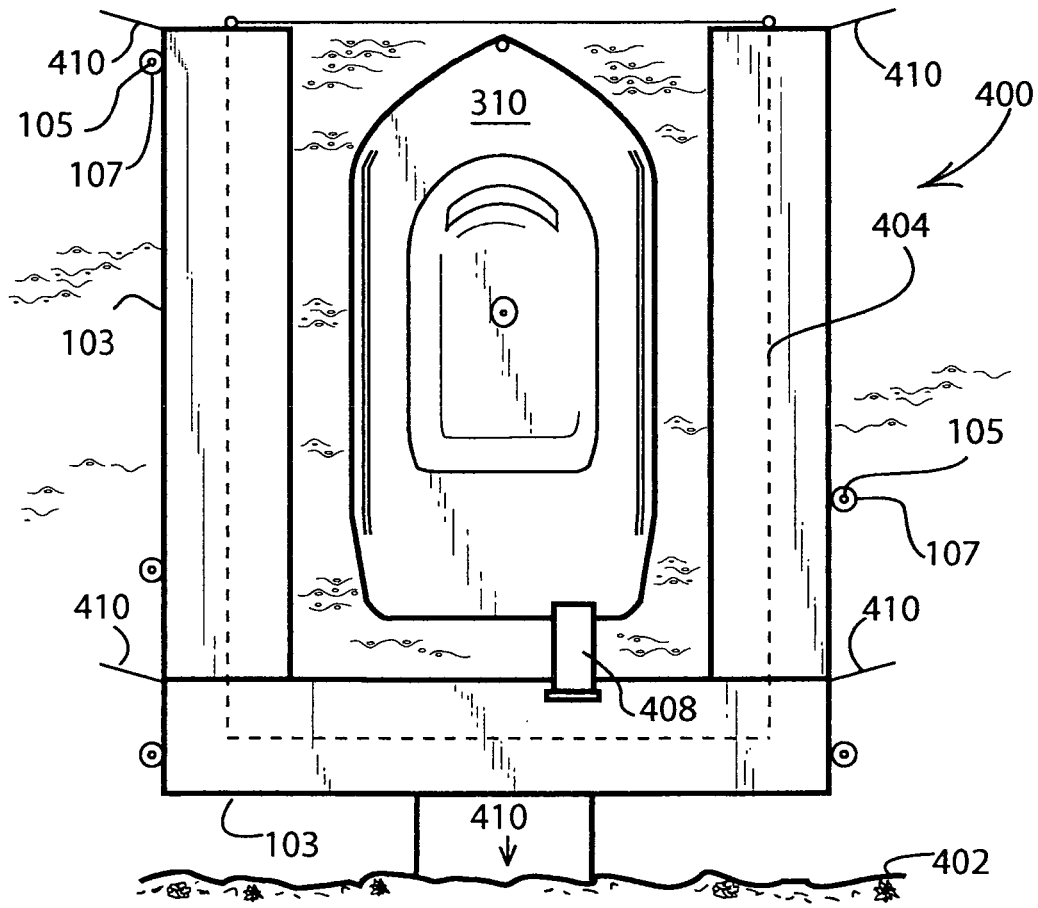

FIGS. 34 and 35 are open end and plan views of a floating boathouse (400) employing enclosed boxes (103) of the invention. Boxes (103) are again assembled to form a U-shaped structure to accommodate a boat (310) therein. The boxes are interconnected by suitable cables or connectors as shown in FIGS. 26, 27 and 28. Boxes (103) float in water (306) adjacent to shoreline (402). The boxes can be completely precast or enclosed by adding precast concrete covers as described in FIGS. 11/12 or decks of wood, recycled plastic lumber or the like. To help the boxes to float, they can be sealed to retain air, can be compartmented as shown in FIG. 15 and/or filled with foam, ping-pong balls, styrofoam packing materials or other buoyant materials. Intermodal-sized boxes which measure eight feet square by forty feet long can conveniently be used. Boathouse walls (404) are erected upon the upper decks of boxes 103 to form a boathouse structure thereon. Walls (404) are preferably strong weight-bearing solid walls (using suitable construction materials discussed above) to support an optional deck (314) as descibed above, but can be cut out to form windows, doors, etc. Roof deck (316) supports rails (318) supported by posts (319). Beams (406) extend from the inner upper edges of boxes (103) to the lower surface of roof deck (316) to increase strength and rigidity. The top decks of boxes (103) can be fitted with appropriate mooring fixtures for boat (310) (not shown here), allowing mooring both inside and outside the walls. The boathouse itself can be secured to bottom (304) by standard mooring systems such as a four point moor, chains (410) to clump anchor (412), or screw anchors (413). The boathouse can also be retained in place by a number of piles (105) passing through rings or brackets (107) which are attached to the sides of boxes (103). Ramp (408) or other suitable means can be used to provide access from the deck of box (103) to boat (310). Similarly, optional pier or walkway (410) connects the floating boathouse to land (402). Two or more rigid spacing bars (315) are provided between the arrays of boxes and mechanically attached at (317) to keep them in alignment. This boathouse design can provide a relocatable, permanent or temporary facility for pilots, marine patrols, military forces, Coast Guard, and the like.

Figure 36:
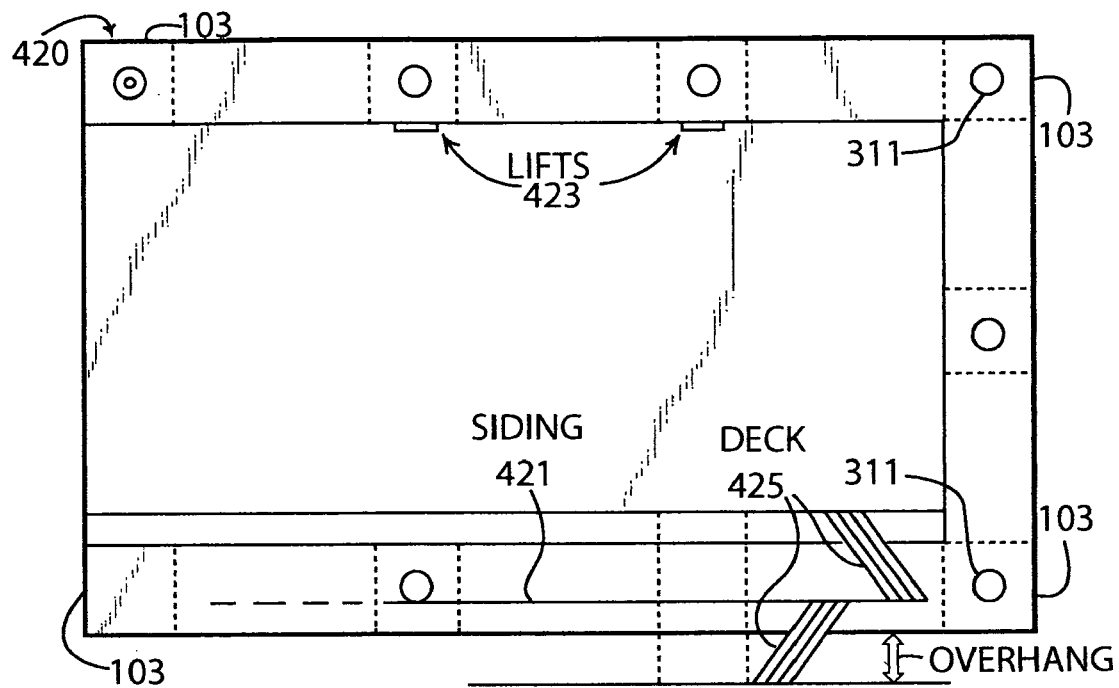
FIGS. 36 and 37 are plan and side views of a conventional fixed boathouse using piles surrounded by concrete boxes to protect the boathouse from ice.
Figure 37:
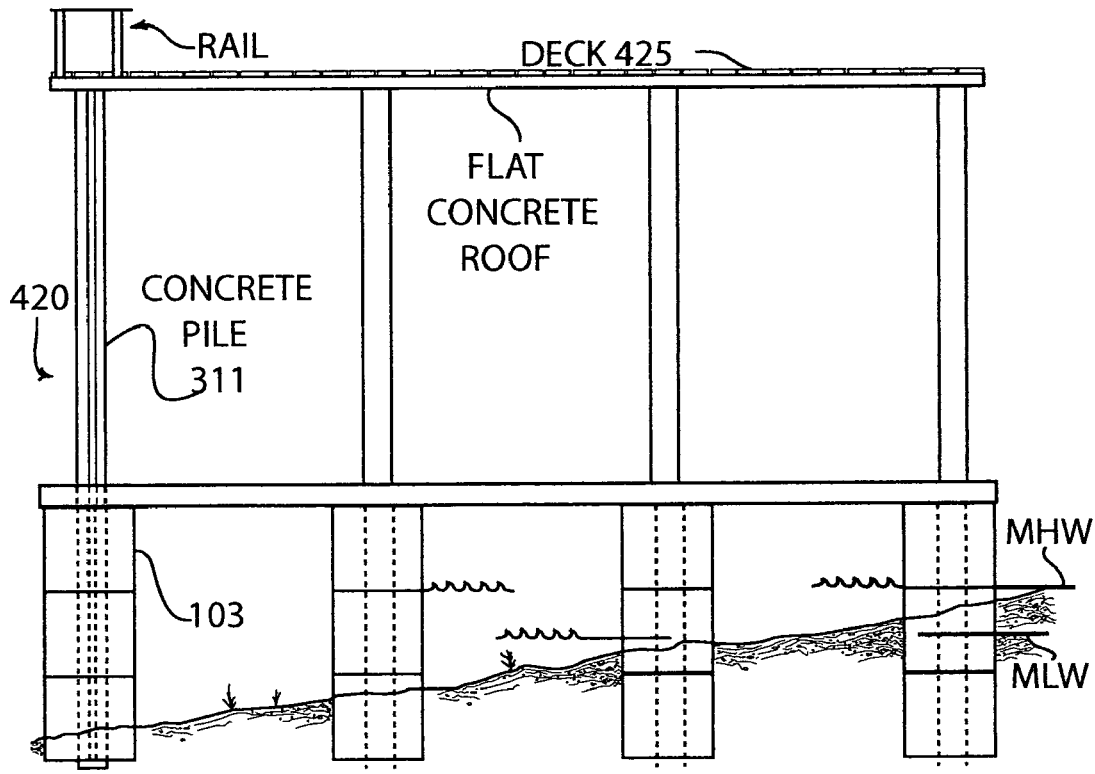

FIGS. 36 and 37 (plan and side views) illustrate a standard fixed boathouse design (420) with a series of concrete boxes (103) added around the supporting piles (311) to protect them from ice and storms by adding mass to the structure and deflecting floating objects. The piles can be any conventional type of wood, metal or concrete, or pipe filled with concrete as discussed in FIGS. 31–33. The concrete boxes which are placed about the piles are precast concrete boxes as described above, which can have either closed or perforated sides, and are approximately square in cross-section, preferably being approximately cubical. The piles are inserted through holes placed in the bottoms (and tops, if present) of the boxes, which are stacked in the positions where the piles are to be driven. Once the piles are driven and the boxes filled with water and sand or gravel, the assemblies form a support for the boathouse (or other structure) that is almost impervious to floating ice or other debris, waves or currents. The boxes are stacked and interconnected by methods discussed above. Such precast concrete structures extending from the bottom to the waterline or higher can be employed to protect various types of waterfront structures, such as decks, mills, dam or power plant components and the like. Lifts (423) can be provided to lift boats out of the water.

Figure 38:
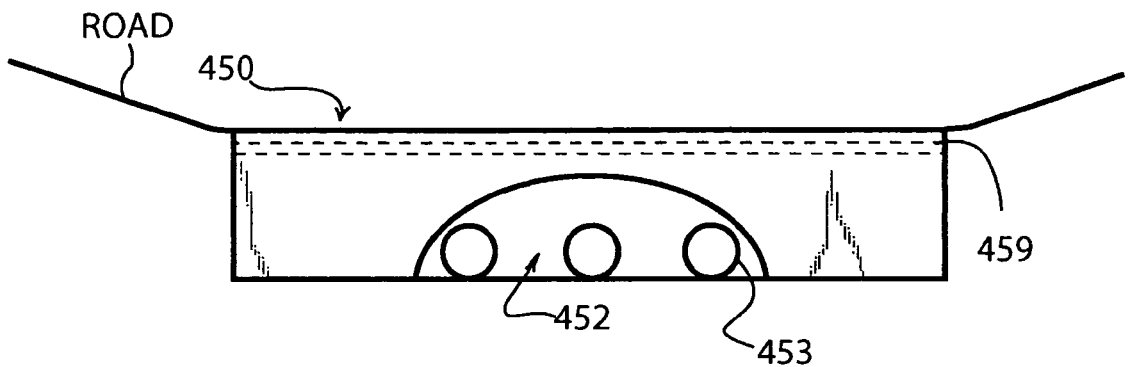
FIGS. 38–40 are side, top and end views of a modified precast concrete box of the invention which is suitable for building bridges.
Figure 39:
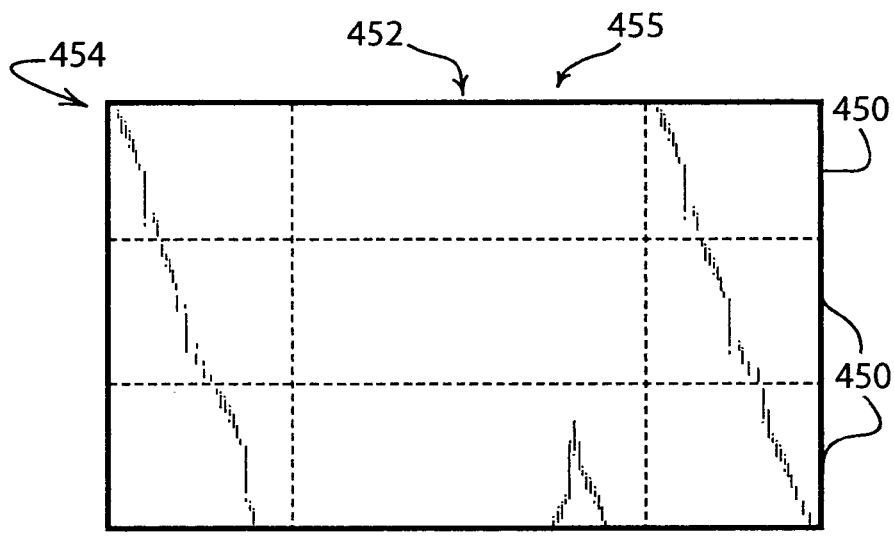
Figure 40:
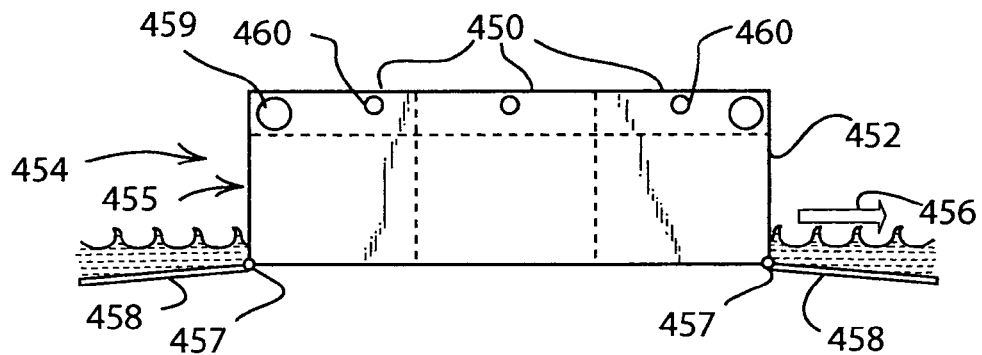

FIGS. 38 to 40 illustrate a precast concrete "bridge box" 450 which is a long, flat rectangular parallelepiped in form, including a hemispherical, round, rectangular or oval cutout portion (452) in both of the longer sides. The box can be closed on all sides except where cut out, or can be open on the bottom below cutout (452). Preferably the box is cast with a solid bottom along cutout portion (452), to retain sand which may be added via suitable inlets for ballast. Alternatively, pipes (453) of appropriate number and size can be cast into an otherwise completely enclosed bridge box. FIG. 38 is a side view of a single bridge box (450), while FIG. 39 is a top view of a bridge (454) assembled from three boxes (450) placed side by side to form a roadbed or path, cutouts (452) coinciding to form a culvert (455) for a stream or other running water to pass under.

FIG. 40 is an end view of the bridge (454) of FIG. 39, showing a water flow (456) through the culvert. Preferably concrete anti-scour plates (458) are fitted by hinges (457) on both sides of boxes (450) to protect the lower edges where water flows through the culvert. Additionally, large or small pipes (459) and (460) cast into the boxes as conduits provide ready-made and protected means for installing utility lines. Such bridges or structures can be incorporated into shoreline reinforcement systems constructed in accordance with the invention. They can also be used to construct structures requiring bases which will accommodate water flow, such as the boathouse illustrated in FIGS. 31–33. This bridge box structure and method could provide for much cheaper and faster construction of bridges, addition of traffic lanes, or replacement of old bridges over small streams and rivers. They could also be post tensioned over a wider stream or marsh. This design could also be used as a box penetration for storm water to pass from beachfront roads through "boardwalk" boxes and berm boxes to allow storm water to flow to the sea.

Figure 41:
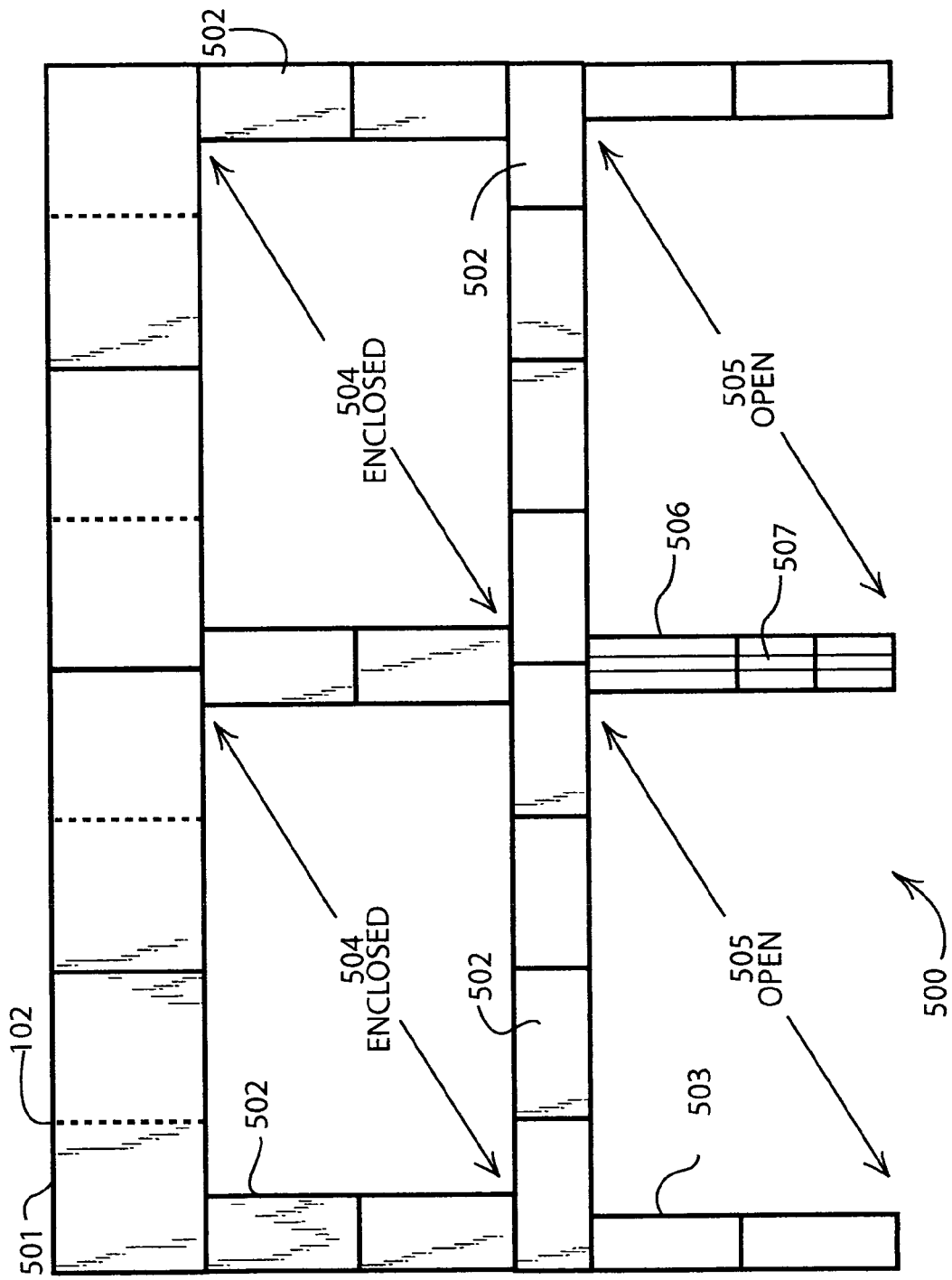
FIG. 41 is a top view of a shoreline reinforcement system assembled from precast concrete boxes of the present invention.
Figure 42:
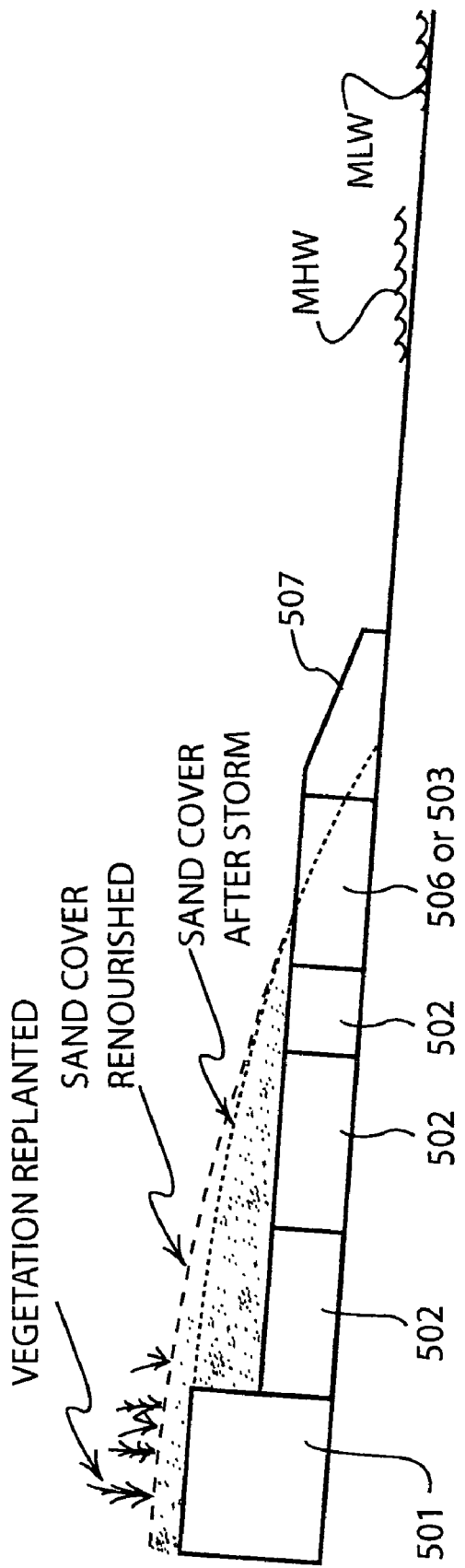
FIG. 42 is a side sectional view of the shoreline system of FIG. 41.

FIGS. 41 and 42 illustrate a shoreline reinforcement system constructed primarily of precast concrete boxes in accordance with the invention. In form and effect, this system resembles the systems disclosed in U.S. Pat. No. 5,697,736 in columns 11/12 and FIGS. 18/19. FIG. 41, the plan view, shows an array of boxes of various sizes assembled along the shoreline to form a seawall and a "backbone" structure for a berm or sand dune seaward of the seawall. These boxes, in suitable sizes and proportions and numbered (501), (502) and (503), will generally be installed by heavy equipment such as cranes or tracked excavators, either from seaward or shoreward, and are filled with sand to provide permanent ballast. They can then be topped with permanent precast concrete covers if desired to form a walkway atop the seawall and prevent scour of the fill inside the box. These boxes can be described as "boardwalk boxes" (501) and are described in detail and illustrated in FIGS. 10–12. The boxes can take the form of rectangular parallelepipeds, typically about eight to twelve feet wide by twenty to forty feet long by eight feet high, or can be nearly cubical units half that long. The large boxes (501) shown are segmented (with partitions 102) and can be about eight feet square by forty feet long. Using boxes in at least two lengths facilitates their installation in lengths suitable for the construction site and local conditions. Also, as described above, it is convenient for shipping to use intermodal units having lengths of ten, twenty or forty feet.

Extending laterally down the beach from the seawall are at least two arrays of "berm boxes" (502), which can be about four feet high by eight feet wide by twenty feet long, to provide berm groins and closed berm cells (504) much like those employed in the systems in the patent cited. Smaller box groins (503) form open groin cells (505). These may be open boxes which are filled with sand and then fitted with tops, or if local tidal conditions permit, can be floatable boxes which are floated into position and then sunk in place, as described above. Another lateral row of berm boxes (502) is installed perpendicular to the berm groins and approximately parallel to the seawall, filled with sand and left open or covered. The beach spaces between the berm groins and lateral rows of boxes are partially filled with sand and preferably covered with filter cloth and articulated concrete mats as disclosed in the patent cited, in columns 10/11 and FIGS. 16/17, then covered with more sand.

Alternatively, the spaces can simply be partially filled with gravel, rip-rap and/or sand, and local winds, tides and waves allowed to deposit additional sand, etc. with time. The result will be a stable structure that prevents erosion of the shoreline and actually tends to build up sand and gravel to form additional beach under most conditions. Storm protection is also provided for the boardwalk (or seawall) boxes and the landward buildings and other structures.

Additional smaller groins (503) can be added to seaward of the lower lateral row of boxes described above. Such groins (503) can be formed of arrays of at least one "beach box" (503) (which can be about four feet wide by four feet or 2' 8' high and ten or twenty feet long) at the right and left sides, as described above for the berm boxes, and filled with sand or gravel for ballast. Such boxes are preferably set from the land, or if intended to extend into the sea, floated into position and sunk in place for installation. In addition, or as an alternative, T-walls (506) and bevelled T-walls (507) can be used as shown in the center and described in the patent cited, in column 7 and FIGS. 8,9 and 18. Such T-walls could be used for the entire pier-groins as disclosed in the patent cited, or simply to provide the seaward components of this system (in which case the bevelled ends of the outward T-walls minimize potential damage to boats and the like which approach closely). In general, with no beach existing, it will be easier to install beach boxes where they can be floated into position, so they are preferred for most components of the systems of the present invention. With an established beach, installation from landward is preferred. The double T or "pi" units of FIG. 3 can also be used as components of such shoreline systems, arranged parallel and/or perpendicular to the shoreline.

FIG. 42 shows the system of FIG. 41 in side view, the entire structure lying above mean high water, and the level of sand expected to build up after storms and after renourishing by normal tidal action or by artificial methods. This system can be installed before renourishing an eroded beach to retain a large percentage of the new sand, which might otherwise be washed out to sea during a storm. Even if some of the sacrificial sand is lost, these massive interconnected boxes and other structures are not easily moved by storm waves. However, if necessary, the boxes can be disconnected and relocated, using suitable heavy equipment.

Figure 43:
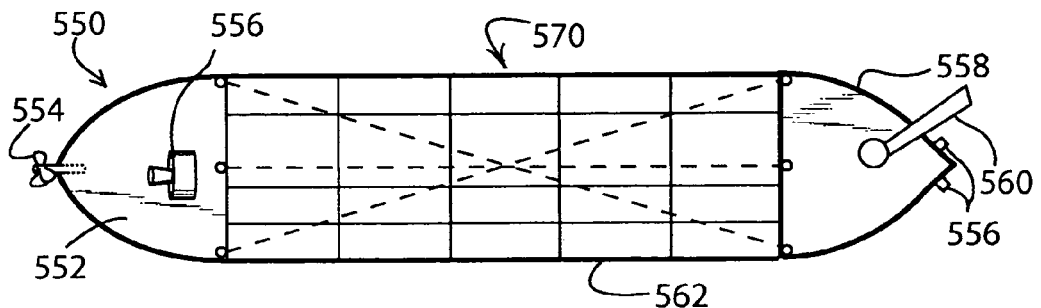
FIGS. 43–45 are side views of a ship designed to incorporate a module assembled of precast concrete boxes of the invention as the parallel midbody of the ship in order to transport same.
Figure 44:
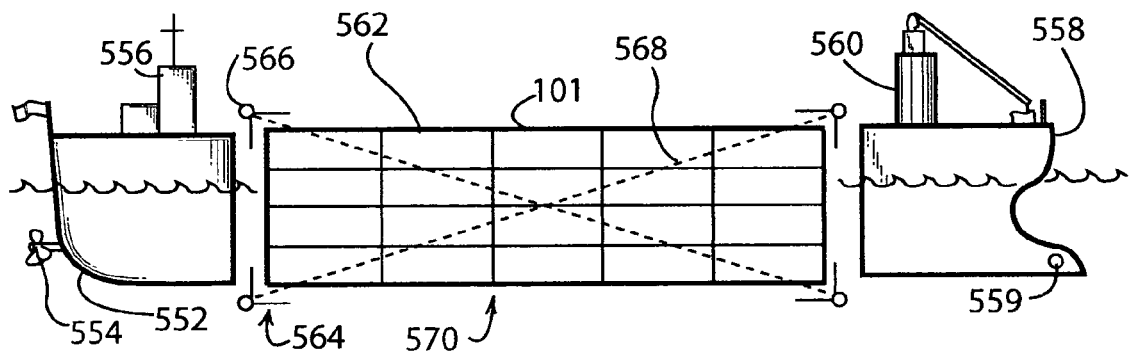
Figure 45:
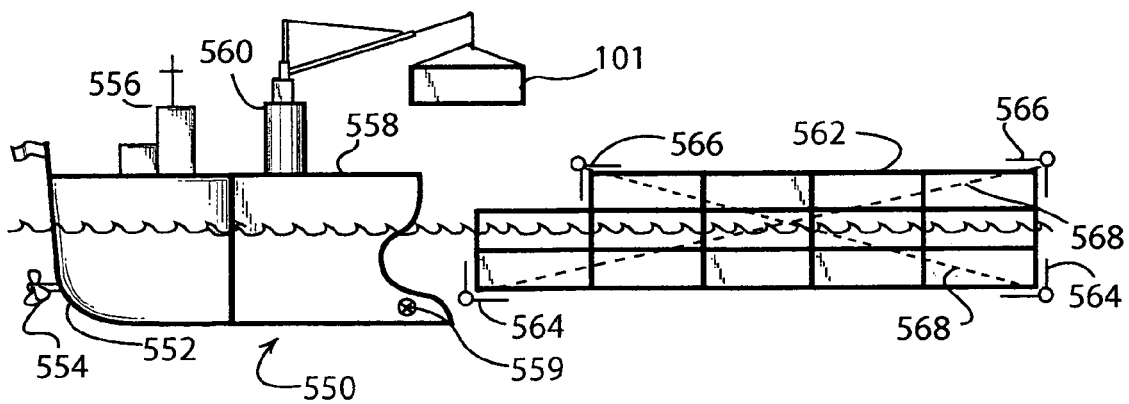

FIGS. 43 to 45 illustrate a novel vessel (570) and method for transporting and installing precast concrete boxes of the invention to locations for installation to form shoreline structures, breakwaters and the like. Plan view FIG. 43 and side view FIG. 44 show a vessel (570) comprising two portions, bow (558) and stern (552), fastened to midsection (562). Stern portion (552) comprises the conventional propulsion system (not shown), at least one propeller (554) and pilot house (556) with appropriate controls. "Thruster" type propulsion unit(s) (559) can also be provided to improve maneuvering. Bow (558) comprises storage spaces for supplies, at least one anchor (not shown here) and a crane unit (560). Both sections have flat vertical surfaces comprising primarily watertight bulkheads with a minimum of openings which can be secured to permit them to float independently. Bow (558) and stern (552) can be fastened together as shown in side view FIG. 45 to form vessel (550) and secured by appropriate mechanical means such as larger twistlock stackers (as shown in FIG. 28), turnbuckle locks, bolts, cam locks and the like. Thus secured, vessel (550) can travel under its own power to a port where a stacked and securely interconnected floating array of precast concrete boxes of the invention can be attached between the bow and stern sections as a midsection for the vessel for transportation.

As shown in FIG. 44, a large group of such boxes (101) can be stacked and grouped together to form a box module (562), which is fastened toegether under longitudinal and lateral tension by a tensioning system comprising, e.g., corners (564) and (566) and cables (568). Similar locking connections on the corner plates permit the array of boxes to be secured to the bow and stern sections of the vessel. Once assembled, box module (562) is moved from an onshore assembly site (e.g. on a pier, wharf or ramp) by large crane or other suitable means into the harbor waters and floated into deeper water alongside a pier or within the harbor where the vessel may freely enter. Such a module can be maneuvered around such restricted waters using mini-tugs (e.g., converted military landing craft) or other suitable small craft and suitable attachment points which are provided on the outside surfaces of the module (not shown here).

With the module held in place by such tugs, anchored or moored to buoys, vessel (550) can be brought alongside, bow section (558) detached from stern section (552) and the stern section maneuvered against the rear surface of the module (562), using propeller (554), thruster propulsion (559) or tug assistance if necessary. Contemporaneously, tugs or other craft hold bow section (558) in position until stern section (552) is attached to module (562). The vessel's anchor can be used to anchor bow section (558) during this period if desired, provided that an auxiliary power source is provided to power the anchor windlass. Then bow section (558) is maneuvered into position against the front surface of module (562) by tugs and secured in place. The same systems used to fasten the bow and stern sections of the vessel together can be used to attach the bow and stern sections to the array (562) of boxes. The result is a "stretched" vessel (570) (shown in FIGS. 43 and 44 assembled, FIG. 44 in disassembled state) which can travel under its own power to the location where the boxes are to be disassembled and/or installed.

In addition to transporting and unloading such floating arrays of concrete boxes as described above, the vessel of the invention can be used to carry a variety of other floating objects or arrays of objects, provided they are sufficiently buoyant, have appropriate proportions and can be fitted with attachment devices to attach them securely to the two hull sections of the vessel. Various types of containers and tanks, floating bridges, pontoons, caissons and other floating construction components can be incorporated in the vessel and transported. This could be of particular value when transporting and installing components to form structures in areas of military landings. Furthermore, such a vessel could be constructed to have the appropriate size, proportions and attachment fittings to transport floating drydocks, whether commercial or military. Floating drydocks are described in Fahey's *Ships and Aircraft of the U.S. Fleet*, published in annual editions by the U.S. Naval Institute of Annapolis, Md. Since floating drydocks have high freeboard and limited stability at sea, transporting them as the midship section of such a vessel could provide a faster and safer method of overseas transport for these valuable ship repair and salvage vessels.

Figure 64:
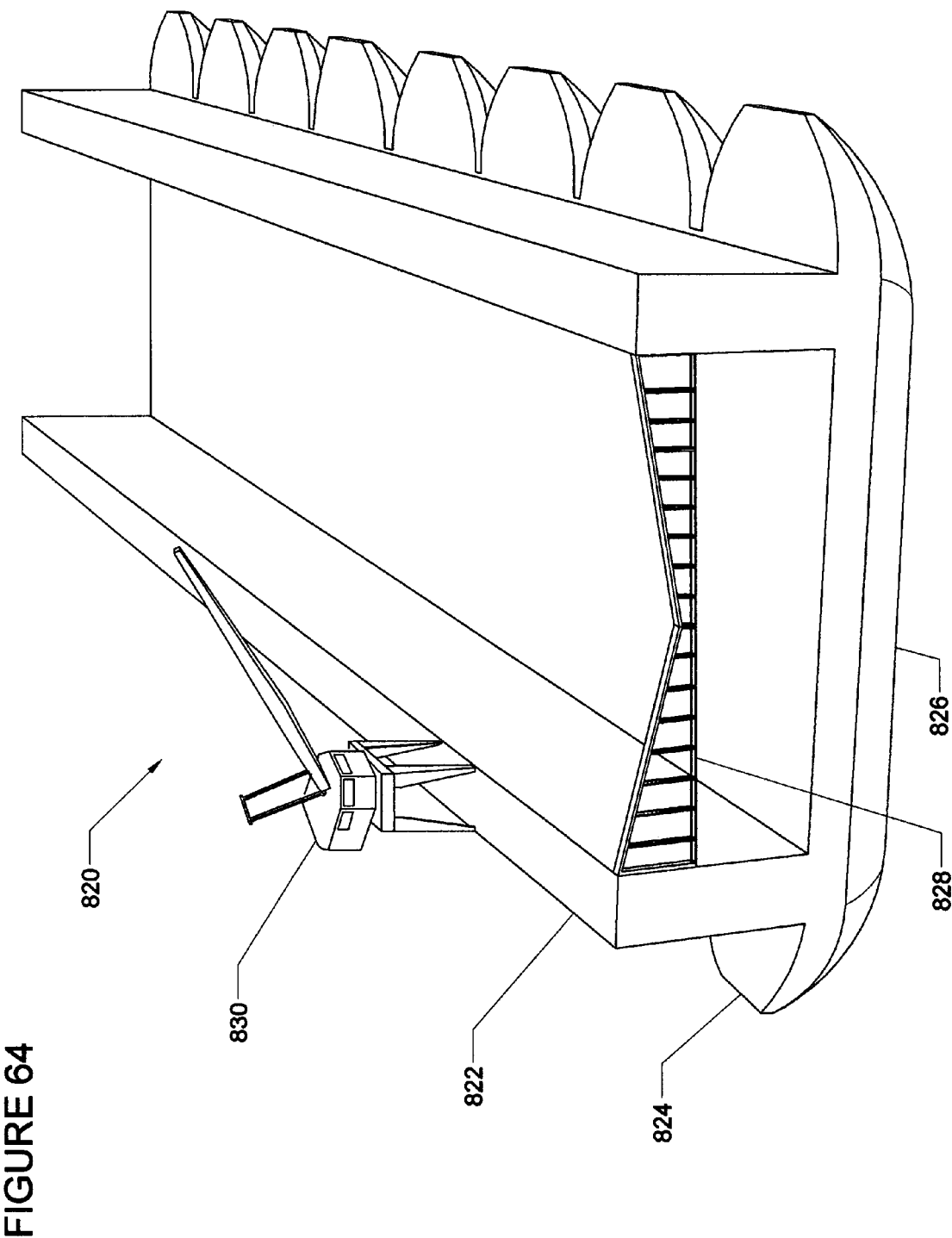
FIG. 64 is an overhead perspective view of a floating drydock.

FIG. 64 illustrates a floating dry dock 820 comprising bottom pontoons 826 with protruding portions or sponsons 824, side walls 822, gates 828 and a crane 830.

FIG. 45 is a side view showing the vessel (550) with bow section (558) and stern section (552) again connected together, box module (562) having been removed by reversing the sequence of steps described above. Thrusters or mini-tugs (not shown here) can be carried on the forward deck and/or in a forward hold and offloaded using crane (560) to facilitate this process. In FIG. 45, a portion of the module tensioning system has been loosened and crane (560) is lifting the first box (101) to be offloaded. Depending upon the depth of water near shore and the positions where the boxes are to be installed, the vessel and crane may be able to deposit the boxes in the water directly above or near the installation point, or near the installation point ashore. Alternatively, the boxes can be placed into the water near shore and maneuvered into installation position by mini-tugs or other suitable craft. Where approprite, crane (560) and/or a similar crane installed on the stern section of vessel (550) can be used to remove individual boxes (101) which have been disconnected from box module (570) before it has been disconnected from the bow and stern sections of vessel (550).

FIGS. 46 to 48 illustrate another method of transporting and installing arrays of precast boxes of the invention. FIG. 46 is a side view of a barge (600) or similar vessel floating in water (602) over bottom (610) where a breakwater is to be installed. Vessel (600) can be self-propelled, in which case propeller (620) and associated propulsion systems are provided. Precast concrete boxes (604) are connected by stainless steel cables (606) (or other suitable mechanical means) and arranged on deck (612) in position to be unloaded as an array via ramp (608). The boxes can be the special perforated and slotted "breakwater boxes" disclosed in U.S. Pat. No. 5,697,736 and illustrated herein in FIG. 4

(having thin concrete knockouts or plugs), but can also be open boxes as in FIGS. 10 to 12 or closed boxes fixed with flood/drain and blow/vent valves as illustrated in FIGS. 16/17. Ramp (608) can be held in position during operations by using suitable mechanical restraints such as cables or hydraulic rams, as well as floats.

The array of boxes can be unloaded from the barge by dropping a heavy anchor (614) which is attached to the array by extended cable (607), then backing the barge (by self-propulsion or tug, not shown here) to exert tension on cable (607), as illustrated in FIG. 47. Barge (600) will require a smooth, level deck upon which the array of boxes can be arranged, and providing rollers or lubrication before the boxes are loaded and connected would be helpful. FIG. 47 illustrates the array of boxes (604) floating on the surface (602) and interconnected by cable (606) (not seen here), with the boxes pulled closely together. One end of cable (607) is still held by anchor (614), but the array of boxes has been moved closer to that anchor by winches or boats to bring it near the point where the breakwater is to be installed. At the other end of the array, cable (606) passes through block (618) on anchor (615), which was dropped from the barge deck after the last box slid down ramp (608). Clamps or other mechanical restraints (616) and (617) position the array of boxes at preplanned portions of cables (606) and (607) after the desired amount of tension on cable (606) and the desired position of the array is attained. This is accomplished by applying force to the barge end of cable (606) via a winch (not shown) or other appropriate device.

When the array is in optimum position for installation as determined by navigational or global positioning system fixes, all boxes are sunk sequentially or simultaneously by remote control or manual means, and allowed to settle into their installed positions to form a submerged breakwater or reef (622) as shown in FIG. 48. Cable (606) can then be simply cut from the barge deck, or if desired, a diver can be employed to secure cable (606) to block (618) on anchor (615) and the excess cut, to provide extra security for the breakwater. As discussed in the patent cited, at columns 8/9, such breakwaters can be very beneficial in reducing or eliminating the presence of swells in harbors which are at least partially exposed to open water. As an alternative, the interconnected boxes can be left floating to mitigate passing wave energy.

Figure 49:
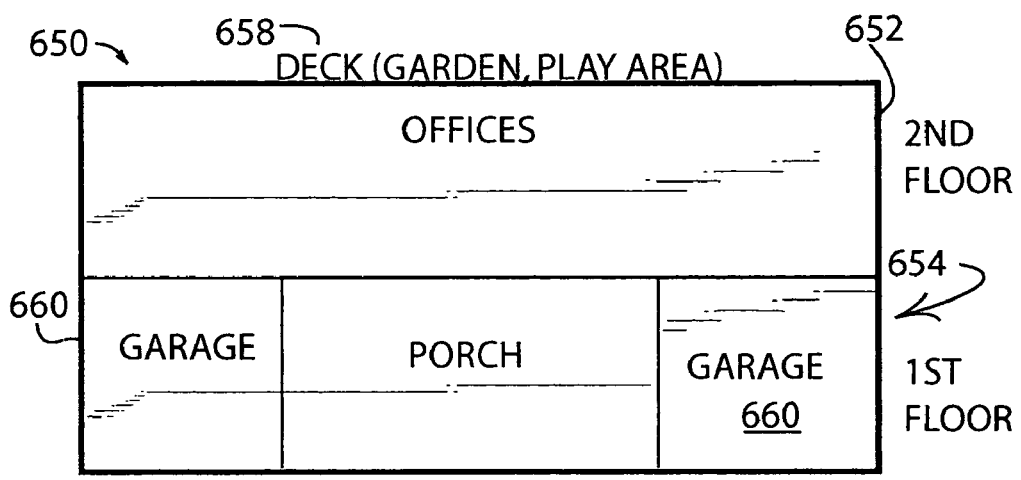
FIGS. 49 and 50 are end and plan views, respectively, of a dwelling structure assembled from precast concrete boxes.
Figure 50:
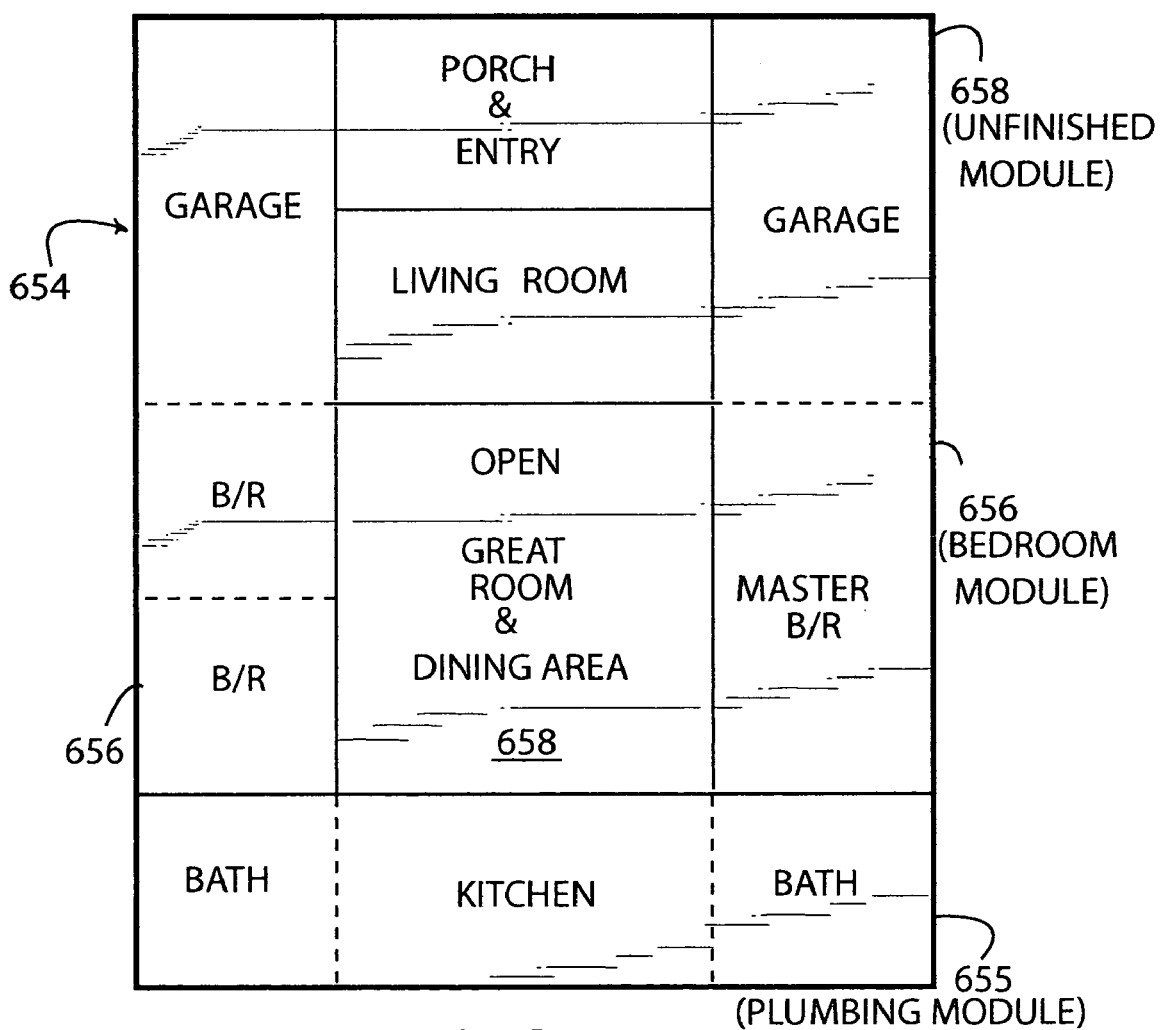

FIGS. 49 and 50 illustrate how the precast, intermodal concrete boxes can be used to construct buildings for use either above or below ground or water. Dwelling structure (650) includes first floor (654) and second floor (652), all constructed of precast concrete boxes of various standard sizes and proportions, being interconnected and stacked to form the two (or more) stories.

The concrete boxes are amenable to intermodal transportation as well as lifting and placement on the ground (or actually in water, if the bottom units are waterproof) or stacking, as illustrated in FIG. 49. Doors, windows, open walls, conduits for utilities, and the like (not shown here) can easily be included for use in these standardized boxes and/or cut during installation/assembly. The walls of the precast boxes in effect become interior and exterior walls, floors and ceilings of the various rooms or spaces contained within the structure.

Because the concrete is stong, resistant to liquids and vermin, it can be used in wet areas, acidic soils, underground, on water, under water and in other challenging environments. It is ideal for constructing strong, relocatable structures, such as for military or security areas. Such precast boxes can be ideal for constructing bunkers, fallout shelters, underground or underwater storage facilities or earth-sheltered homes. FIGS. 49 and 50 illustrate the employment of precast concrete boxes of various sizes and proportions suitable for forming various typical rooms of a combined dwelling/office structure. For example, large unfinished modules (658) can be used for garages or the like, and smaller modules (655) and (656) can be used for bathrooms and bedrooms.

Figure 54:
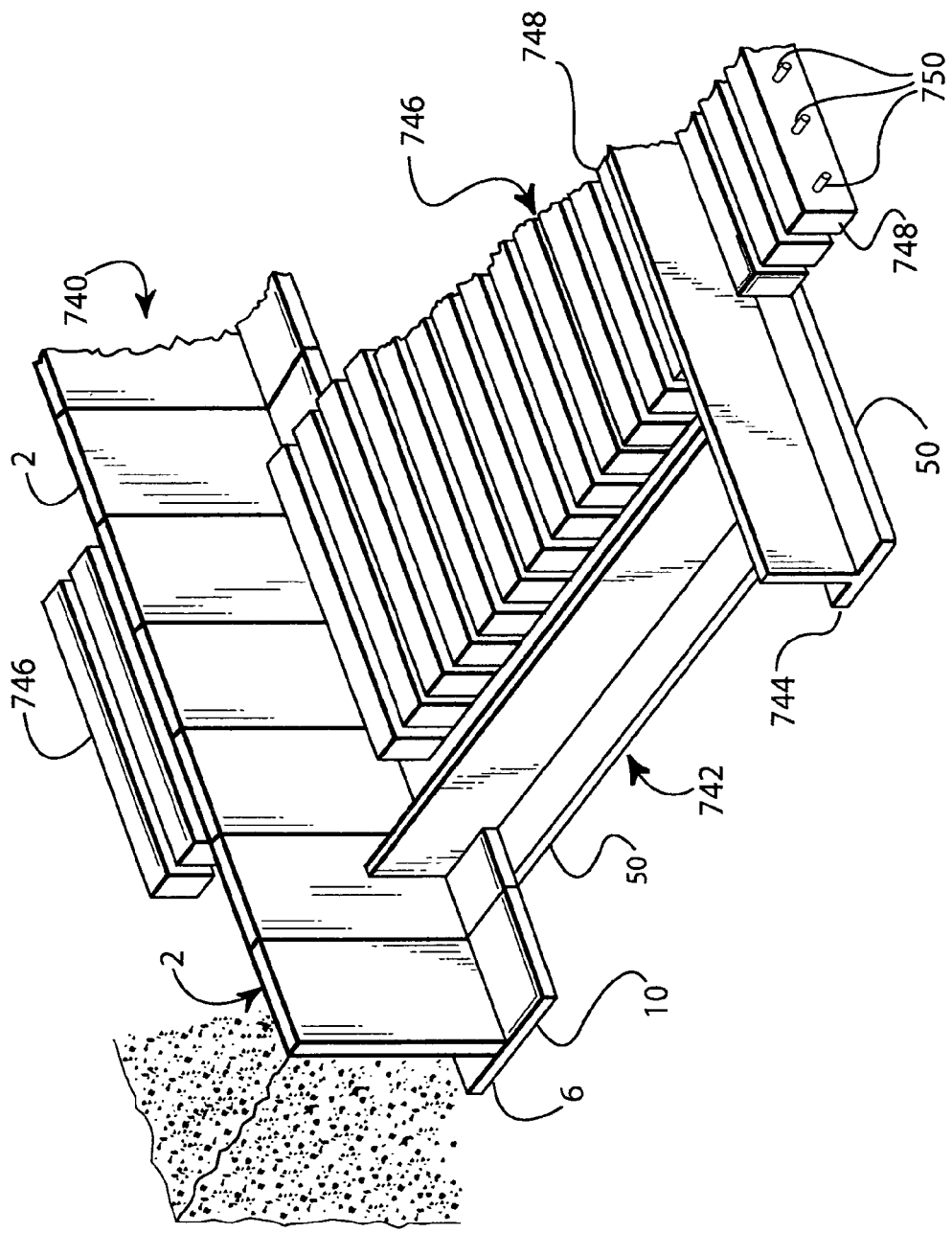
FIG. 54 illustrates a seawall and beach reinforcement system including a seawall, at least one groin built of inverted "T" structures, at least one row of inverted "T" structures parallel to the seawall, and flexible cloth-concrete cable or chain assemblies emplaced in conjunction with same.

FIG. 54 illustrates a shoreline reinforcement system installed along a shoreline having a sloping beach, a low bluff and sand dune systems shoreward of the bluff. A series of L-members of the present invention (or large T-walls) (2) are installed along the base of the low bluff to form a seawall (740), with footers (6) being covered by rubble and fill graded down from the dune systems. Splash plates (10) of the L-members protect against scouring by wave action. Preferably, small rocks under armor stone are used to cover the splash plates to further resist scour (not shown in this figure; see FIG. 4 of U.S. Pat. No. 5,697,736). Several groins (742) perpendicular to the seawall are formed by inverted T walls (50), extending down the beach and along the shoreline to protect the areas most vulnerable to erosion. Preferably the inverted T-walls are secured to the seawall, as shown in detail in FIG. 11 of U.S. Pat. No. 5,697,736, by having base sections (53) of the inverted T-walls inserted under splash plate (10) of the wall, with the stem (52) of the T passing through cut (60) in the splash plate. Additionally, at least one series (744) of inverted T-walls (50) is installed parallel to the seawall, further down the beach. This provides a stronger reinforcing structure and has the added beneficial effect of helping to form a "perched beach" or area where sand, pebbles and other desired material can accrete. Concrete reinforcing mats (746) such as Cable-Concrete or the interconnected concrete tie mats of U.S. Pat. No. 5,697,736 are installed behind the seawall and the row(s) of inverted T-walls parallel thereto to protect the beach from erosion and allow for further accretion of sand, etc.; and below the lowest line of inverted T-walls to protect against Scour Mats (746) comprise rectangular sections of concrete (748) connected together side-by-side by cables (750) or other suitable connecting means. All the concrete components are interconnected by suitable connecting means or fastening means at their points of contact.

Figure 55:
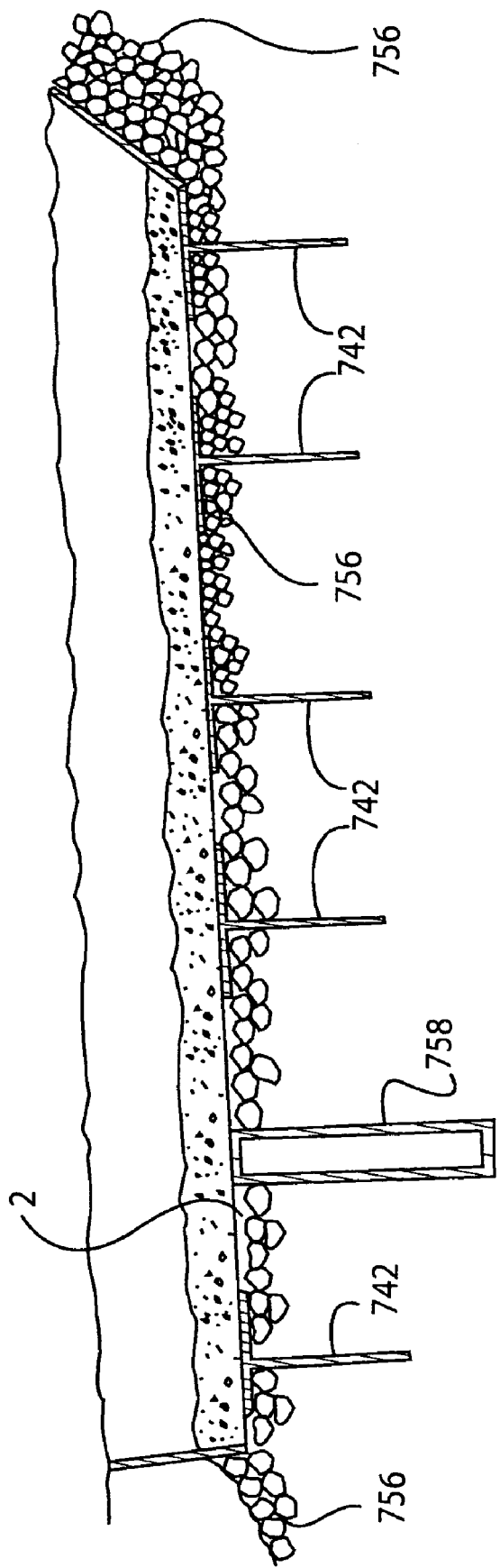
FIGS. 55 and 56 illustrate a seawall and reinforcement system designed for installation along the Potomac River shoreline in Virginia, including groins perpendicular to the seawall.
Figure 56:
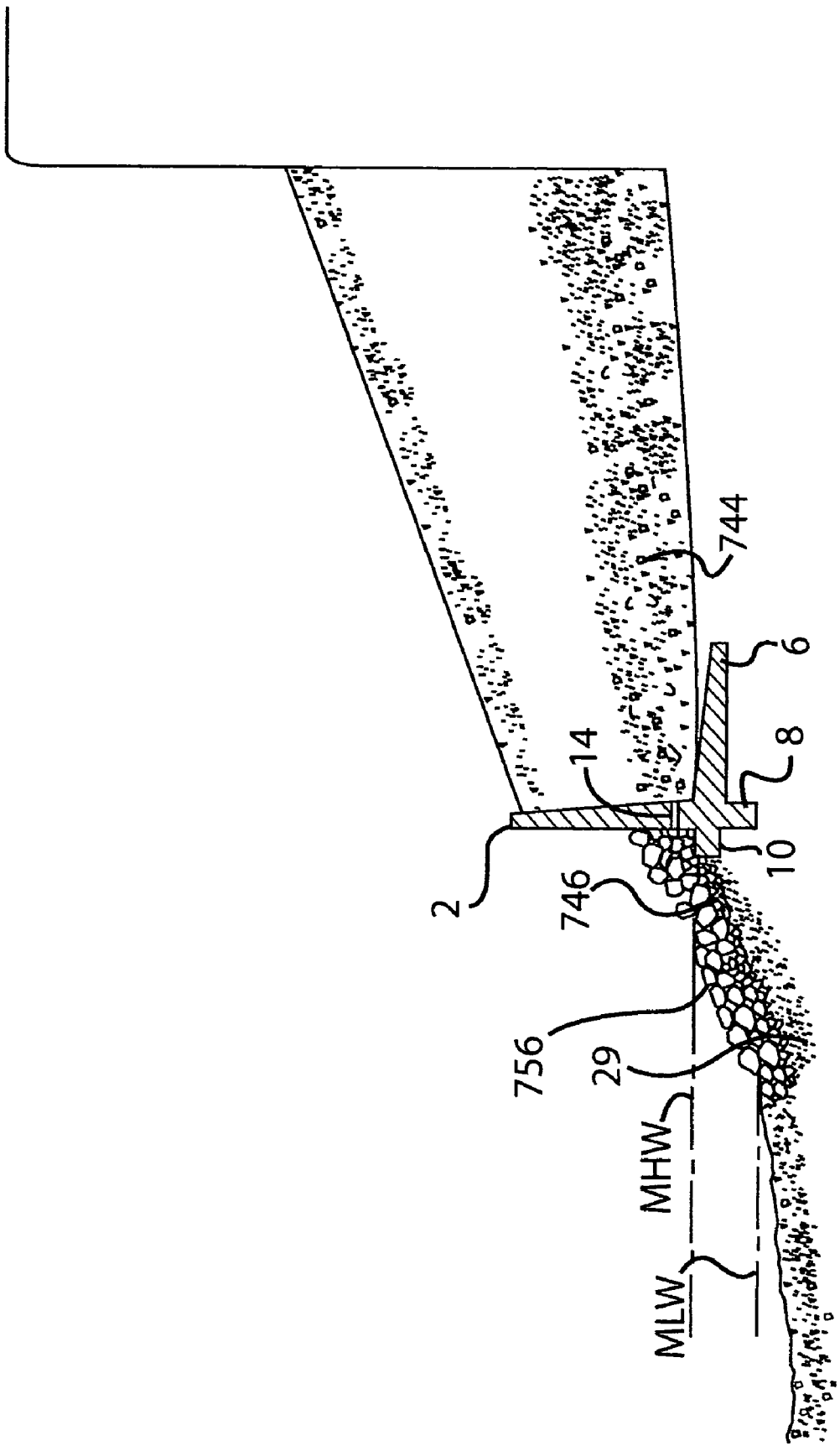

The system shown in FIGS. 55 and 56 and described in Example 3 of U.S. Pat. No. 5,697,736 was designed, built and installed for reinforcement of the Potomac River bank on residential property at Colonial Beach, Va. Starting at the right (northern, upriver portion) of FIG. 55, a portion of the bank was designed as bevelled and protected by armor stone (756) against erosion by the current. The angle of the bevelled portion was selected to help to deflect floating debris, ice and the like. Approximately 200 feet of the bank was reinforced by sections of L-walls (2) installed to form a sea wall. After entrenching the beach below the bank and positioning the L-walls with their keys (8) firmly placed and levelled, the upper bank was graded and used to fill over granular fill (744) (rocks, gravel and sand) that have been used to cover footers (6) of the L-walls. Weep holes (14) are provided in the L-walls for drainage, and the walls were joined end-to-end by bolts or other suitable connecting means. The splash plates (10) of the L-walls were covered first with core stone (746) over a layer of geotextile (29), then with armor stone (756) to protect against storm and ice damage. The southern/downstream (left) end of the wall was protected by armor stone (756).

A series of five groins (742) was installed, extending approximately 20 feet from the wall and approximately perpendicular thereto. The groins were formed of inverted T-walls approximately 3 feet high by 3 feet wide, and placed so as to nourish the present beach with sediment. A pier groin (758) also extends from the wall in a perpendicular direction, for about 300 feet. The pier groin was constructed of inverted "Double-T" units. This system was designed to protect the presently eroding river bank, encourage accretion on the present beach and enhance recreational use of the area.

Modular ships comprising hexagonal boxes.

FIGS. 57, 58 and 59A through 59F illustrate a vessel similar in form and function to that of FIGS. 45 to 48, but constructed of individual hollow modules of hexagonal cross section, assembled in vertical positions to form a honeycomb array which offers a high strength-to-weight ratio and the convenience of installing modules for a variety of functions in the same spaces. These hexagonal modules can be formed of a variety of materials including metal, wood, plastics, polymeric composites and precast concrete, the latter material being preferred in the present context. As with the modular concrete boxes disclosed above, the hexagonal concrete modules can be cast and outfitted with various openings, compartmentation apertures, fixtures and mechanical connectors. Methods for precasting reinforced concrete structures are also disclosed in U.S. Pat. No. 5,697,736. When used to form ship components or other floating structures, the hexagonal modules are preferably watertight.

Figure 57:
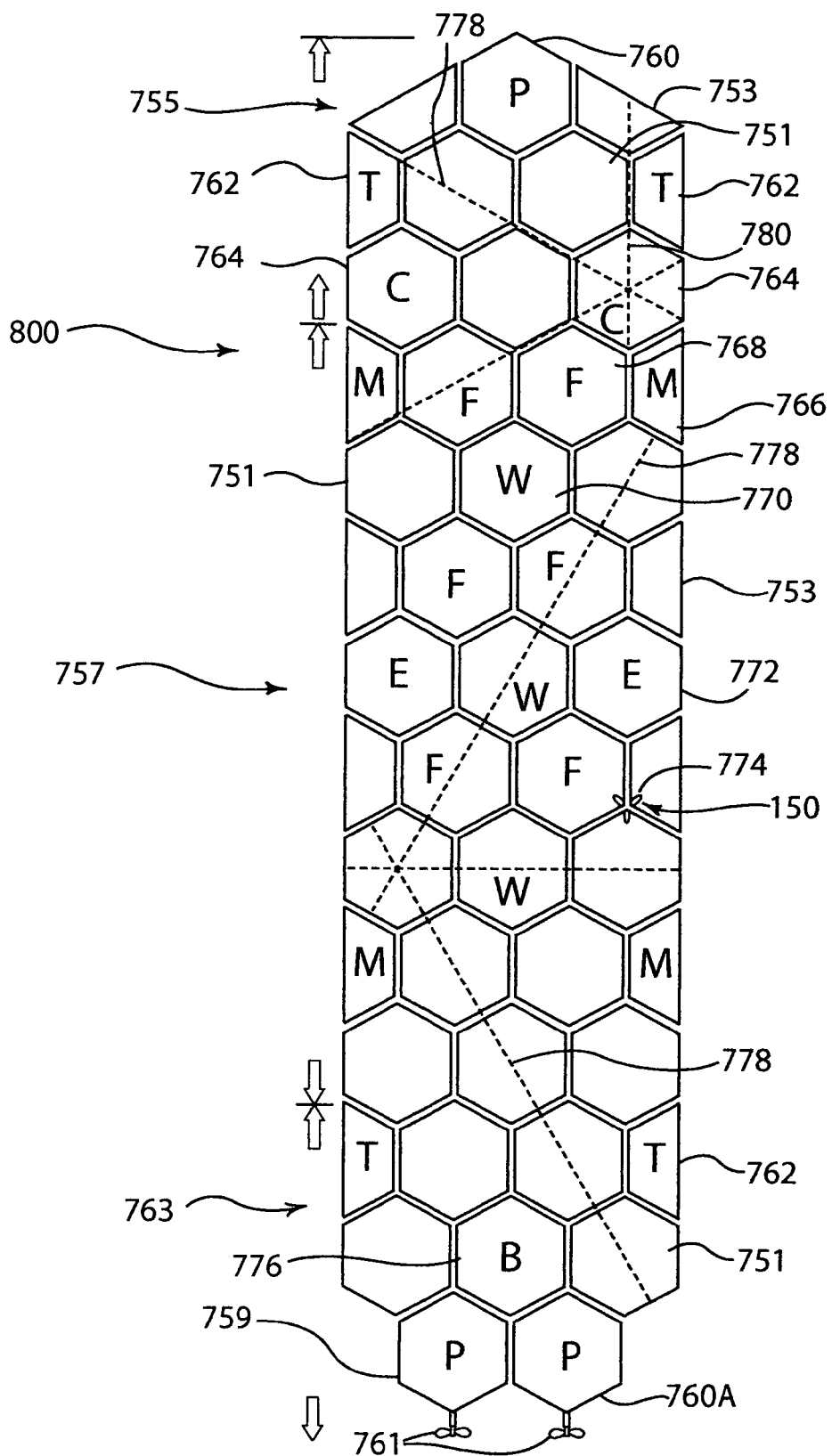
FIGS. 57 and 58 are top views of a ship constructed of preformed hollow components having a hexagonal cross section, assembled in a honeycomb array.

FIG. 57 illustrates the assembly of hexagonal modules adapted for various functions, all assembled in vertical orientations so that they combine to form a horizontally-oriented honeycomb array which forms various portions of ship (800). Plain open hexagonal modules (751) provide the basic structure of the ship, and can be left empty for buoyancy or equipped to be filled with water for ballast. For example, modules (770) can be filled with potable water or other water to be stored for use. Half modules (753) (having the cross section of a hexagon cut from edge to edge) can be used to fill in the spaces along the outer surfaces of the honeycomb arrays to provide a flush surface. Bow section (755) of ship (800) (which can be removable as with the previous vessel discussed above) is shown as including bow propulsion unit (760), two half modules (753), three open modules (751) and two crane modules (764). Operations of typical cranes and bow thruster units (762) are described above in reference to FIGS. 43–45. The hexagonal and half modules are configured so as to provide a blunt pointed bow section. Stern unit (763) (also optionally detachable) is shown as including two lateral thruster units (762), a bridge module (776), four open modules (751) and two propulsion modules (759), each fitted with propulsion motors (760A) and propellers (761). The parallel mid-body section (757) can take up variable amounts of space between the bow and stern units, and is shown as including (from forward to aft) a number of fuel modules (768) (which can contain fuel for aircraft and/or boats as well as ship propulsion), water modules (770), and half modules (753) to provide a flush outer surface on the sides of the section. Elevator modules (772) are provided to transport cargo or other items between the main deck and lower levels of the ship. The various modules are secured together with mechanical connectors (150), as described above, and reinforced with tensioning cables (778) (intermodule connections) and (780) (module internal reinforcements).

Missile modules (766), shown in more detail in FIGS. 59D and 59E, are representative of weapons modules which can be interchangeably installed to provide the ship with offensive and/or self defense capabilities against aircraft, surface-to-surface missiles, surface craft and submarines and/or torpedoes. The same types of modules, extending to the bottom of the ship, can be employed for laying mines or launching antisubmarine torpedoes.

The individual hexagonal modules are designed to be waterproof, even when provided with access hatches, apertures or other fitting. Thus, a structure such as the ship of FIG. 57 need not be sealed on the outer surfaces or in the spaces between the modules. The modules are interconnected by suitable mechanical fasteners as described herein and above, and can be disconnected and removed in case of damage or the design of certain types of modules for use apart from the original array. The modules can be produced in any desired size, depending upon the intended application (e.g., from about ten to about 100 feet in length and from about twenty to about sixty feet accross between sides), but may be limited in size to facilitate transport.

The modules can be arranged and interconnected to form honeycomb arrays by various suitable methods, ashore or afloat, much as described above for rectangular boxes. They can be prepared and outfitted in a shipyard or other facility, then moved via land or water transport to be assembled while floating in the water. Since assembly while floating could require diving services, an ideal approach is to assemble arrays or portions thereof in dry dock. Once the desired array has been formed and all modules connected, the drydock can be flooded, its gate removed and the array towed out for immediate use, further outfitting or connection with other arrays.

Figure 58:
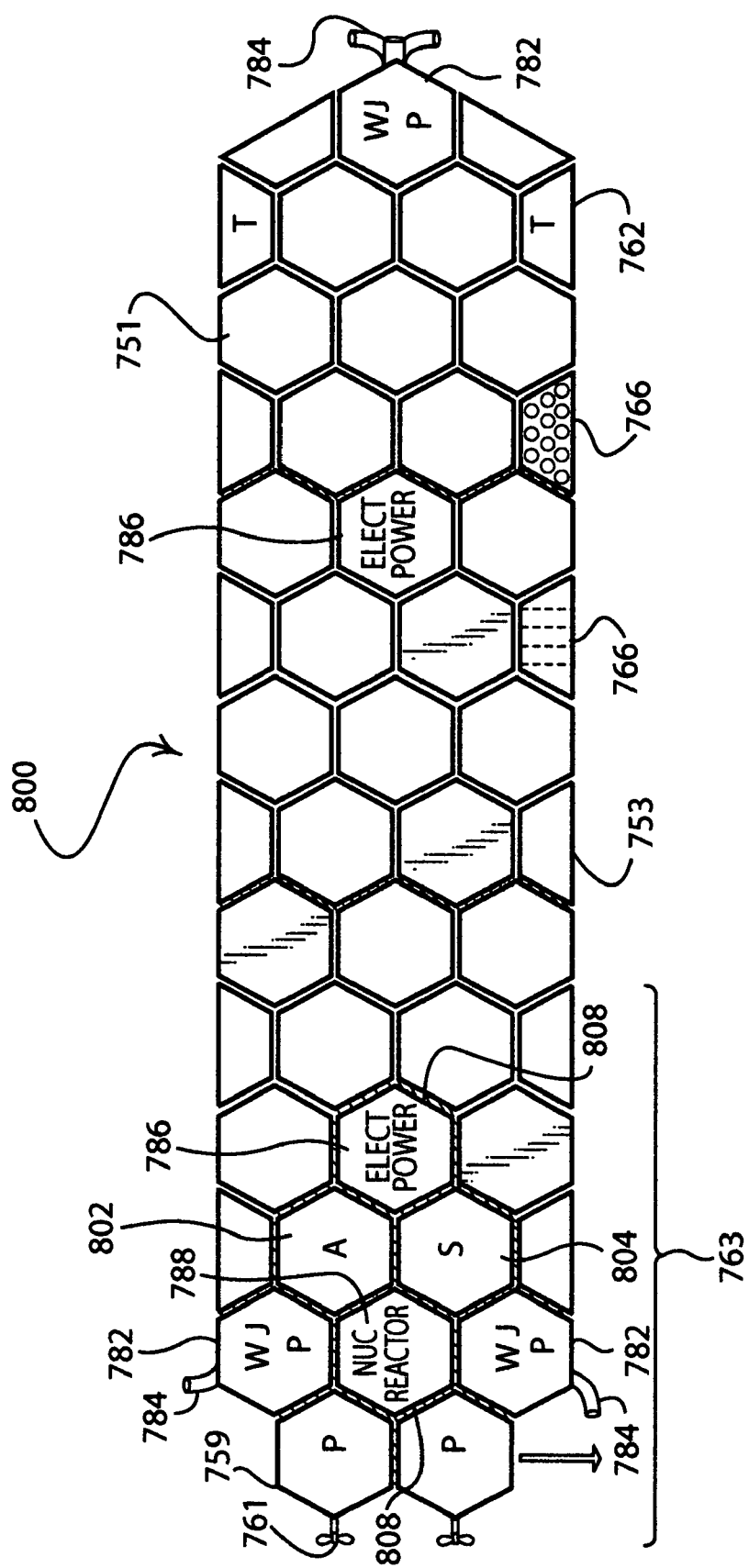

FIG. 58 illustrates variations on the modules which can be used to construct ship (800), and FIGS. 59A through 59F are side views of individual modules providing more detail. The forwardmost bow module (782) provides water jet propulsion for maneuvering, using trainable thruster nozzles (784). Missile modules (766) can provide for either vertical or horizontal launching tubes (766A) for various types of surface to air and surface to surface missiles. Electric power modules (786) provide power for the ship, and can contain a variety of power sources, including generators powered by I.C. engines, turbine-powered auxiliary power units or a variety of power units which are commercially available or in military supply inventories. As shown in FIG. 59B, these units need not extend the full depth of the modules they occupy. The stern section also includes water jet propulsion modules (782) with trainable water jets (784) on each side to facilitate maneuvering. An optional compact nuclear power module (788) can be installed to provide independence from refueling, and can be located underneath a bridge module (776) (as shown in FIG. 57) or at the top of the ship as shown here.

A substantial portion of stern section (763) can be power/propellsion "pod" or module designed for easy removal along connections or borders (808). As shown, such a module comprises electrical power module (786), nuclear reactor module (788), auxiliary power-modules (802), electro-steam generator module (804), water jet propulsion modules (782) and propulsion modules (782) and propulsion modules (759).

Figure 60:
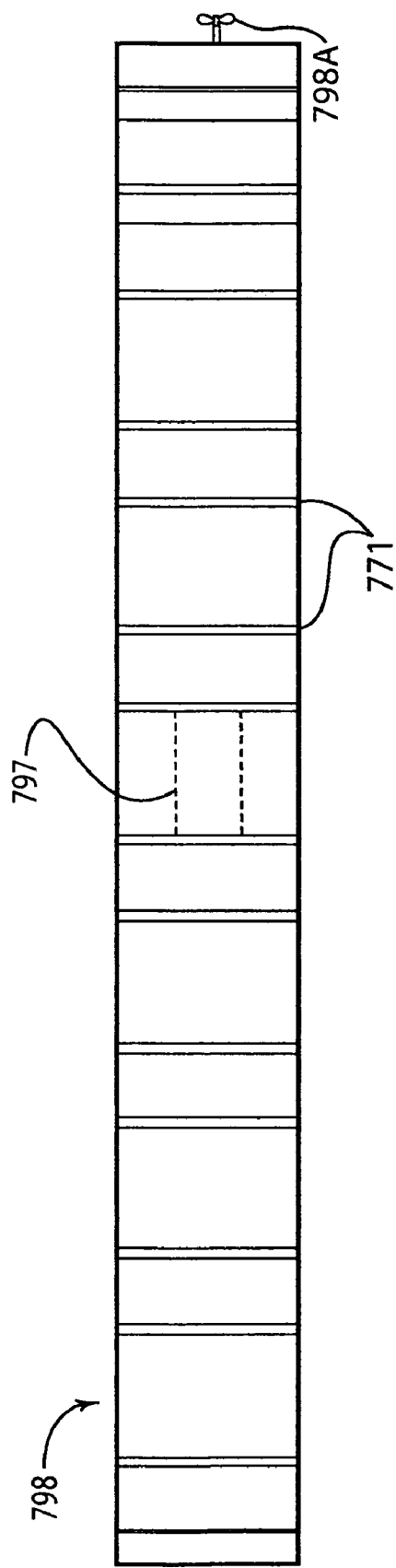
FIG. 60 is a side view of a number of hexagonal modules assembled in a single layer and honeycomb array to form a modular portion for use in a ship.

FIG. 60 is a side view of one layer (798) of hexagonal boxes interconnected to form a honeycomb array which can form one deck of a ship (800) or other floating structure. Joints (771) indicate where the vertical edges of the hexagonal boxes and half boxes are interconnected to form a flush side for the vessel (800). Bow thruster propeller (798A) indicates the bow portion of this unit. Internal decks or partitions (797) can be provided within any of the modules.

Figure 61:
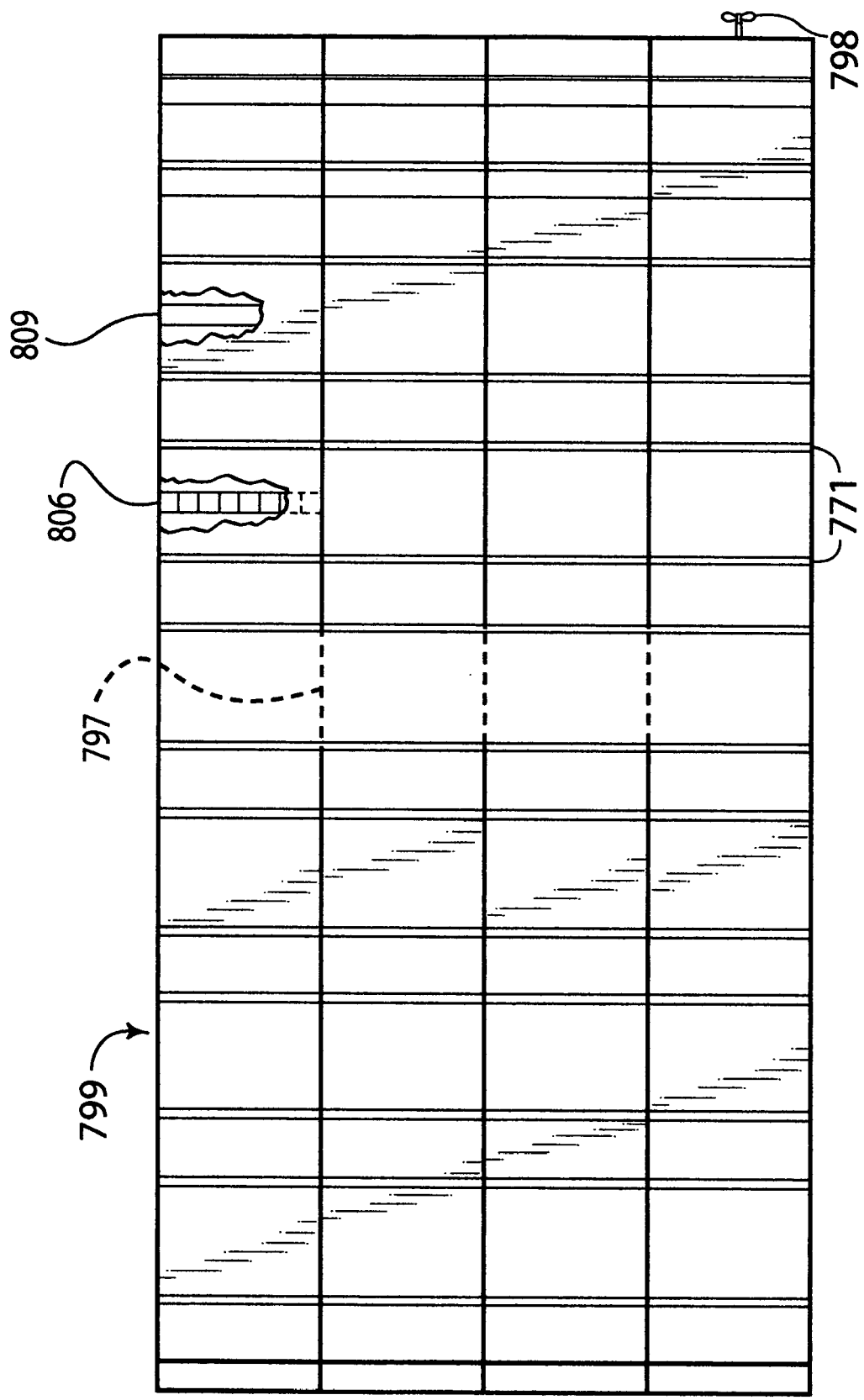
FIG. 61 is a side view of hexagonal modules assembled as in FIG. 60, but with four separate layers of honeycomb arrays superimposed, or alternatively three horizontal decks emplaced within a single deep module.

FIG. 61 is a side view of a portion (799) of a vessel (800) or other floating structure including four layers or decks of interconnected hexagonal boxes in honeycomb arrays. As with any multideck ship, the principles of naval architecture can be employed to provide for different functions on different decks, ladders, scuttles or other connections between decks, watertight integrity, etc. The hexagonal and half-hexagonal boxes meet in vertical joints (771). As an alternative to multiple layers or decks of honeycomb arrays (wherein solid horizontal lines indicate the boundaries between layers), the structure can be at least partially formed of relatively deep hexagonal boxes containing multiple decks (797) therein. Ladder (806) is exemplary of access means which can be provided within modules or between decks or module layers. Elevators (809) (shown schematically) can also be installed within modules. The lower modules or portions thereof can be designated as tankage, to improve the stability of individual modules (when afloat) of the ship or other floating structure containing such modules.

Figure 62:
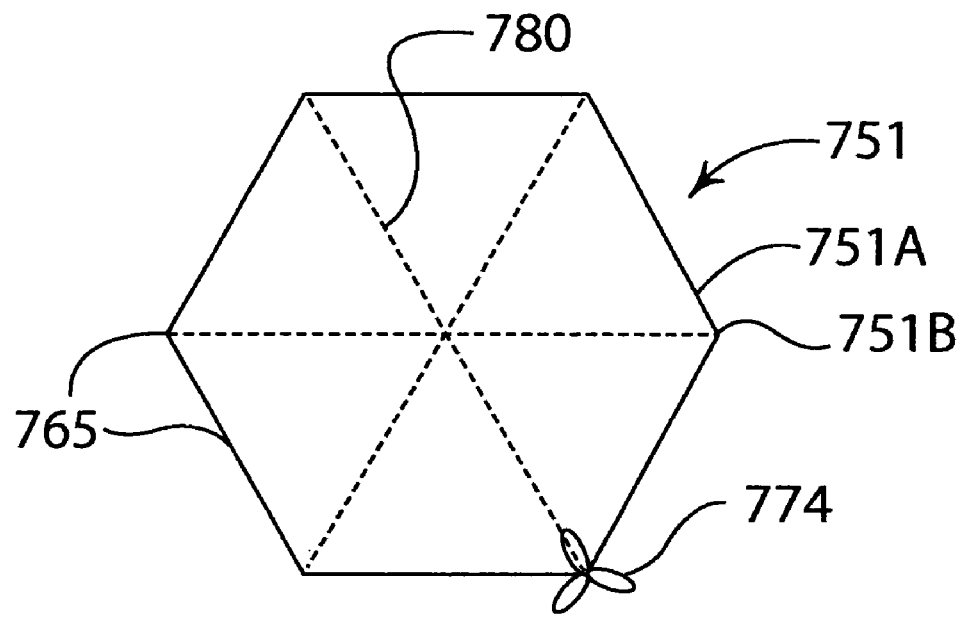
FIG. 62 is a top view of a hexagonal module suitable for use in assembling the modules illustrated above.
Figure 63:
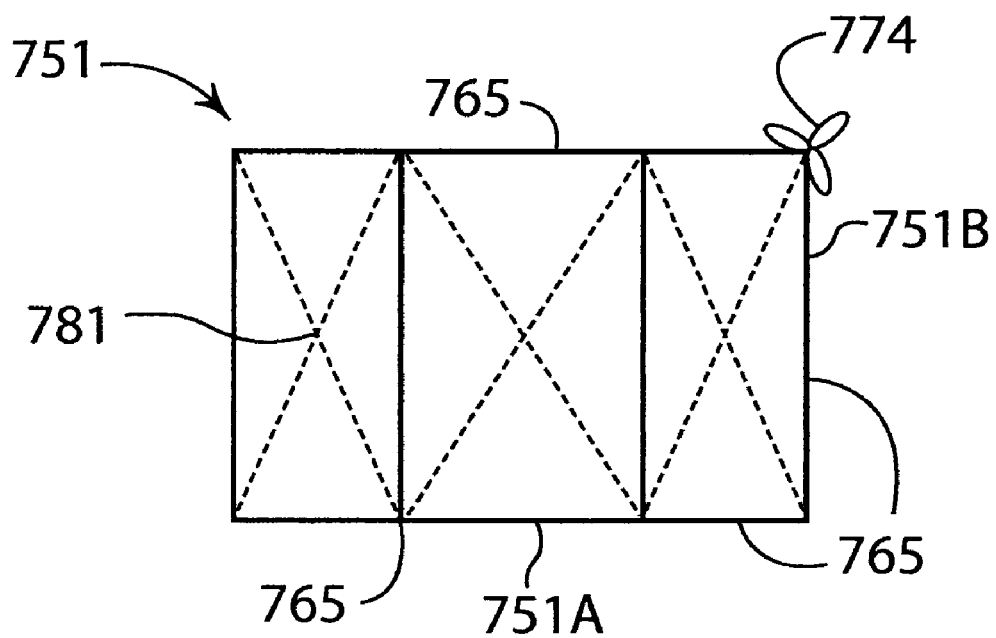
FIG. 63 is a side view of the hexagonal module of FIG. 62.

FIG. 62 is a top view and a FIG. 63 a side view of a hexagonal precast concrete box (751) as discussed for use above. Internal reinforcing materials are cast within the concrete to enhance strength. A plurality of reinforcements (780) and (781) are connected between the corners of the box, cast within the bottom, top and sides of the box. These reinforcements can be tensioning cables, rebar, metal beams of various cross sections, or other suitable materials. Supports (765) are provided along at least a portion of the horizontal and vertical edges (751A and 751B) of the boxes. These can be round or polygonal cylinders, or standard angle iron formed of metals or other suitable materials such as polymer composites, inserted in the molds so that they are cast into the concrete during fabrication. An "angle iron" signifies an elongated sheet of metal (or other suitable material) bent to include an angle of about 90 degrees. For these hexagonal boxes, the angle can be about 120 degrees (to fit the box edges), but commercially available angle iron stock can be readily used, as the majority of the support will be cast into the concrete, leaving the edge exposed to protect the box edges from damage. Optionally, angle irons comprising ferrous metals can be galvanized or otherwise treated to resist corrosion. The supports and other reinforcing materials can be interconnected by suitable mechanical fasteners to form a framework resembling a cage which will retain its shape during casting and provide resistance to damage when the concrete boxes are cured and put into use. Suitable mechanical connecting means (774), as disclosed above and in the drawings as connectors (150), are provided at the corners as required to interconnect the boxes to form a honeycomb array.

The hexagonal and half-hexagonal boxes can be cast using typical molds, with provisions for the inclusion of reinforcing rods (rebar), tensioning cables and supports for the edges thereof, using methods similar to those used for the rectangular boxes disclosed herein and in the previous U.S. Pat. Nos. 5,697,736 and 6,491,473.

While the hexagonal and half-hexagonal boxes of the invention have been described for use in fabricating modular ships or other floating structures, they can be used as well in constructing shoreline structures as disclosed above and in previous U.S. Pat. Nos. 6,491,473 and 5,697,736, which can be attached to the shore above high tide levels, on the bottom or in floating structures attached to the shoreline or sunken structures, all in honeycomb arrays to take advantage of the high strength-to-weight ratios. Floating structures incorporating honeyeomb arrays of these hexagonal modules can be transported by the vessels disclosed herein and assembled in remote locations to form complex floating structures which can serve as floating bases for a variety of aircraft, small craft and ships for various civil and military purposes. For example, such floating platforms, which can include self-propulsion and defense means, could be used to support combat or patrol operations, rescue efforts for national disasters, exploration and production of minerals or oil, maritime construction projects and the like.

Some applications of precast concrete boxes of the invention for shellfish habitat are illustrated in FIG. 51. In many areas, the cultivation of shellfish such as oysters and mussels has been adversely affected by pollution and silting of bottoms of bays and other bodies of water, which may be exacerbated by harvesting techniques which disturb bottom sediments. To permit the cultivation of shellfish above the bottom in such areas and facilitate harvesting without aggravating such problems, FIG. 51 provides a precast concrete box (700) with enclosed sides containing holes (702) and/or slots (704). As illustrated in FIG. 4 above, these openings can be at least partially filled with breakable, thin concrete sections to provide knockout areas to facilitate the sinking of the boxes. The openings in the box permit its use as shelter by small fish, crabs, crustaceans and shellfish. Although the box could be raised by filling it with ping-pong balls, styrofoam particles, inflatable balloons or the like, because of its weight this embodiment is more suitable for use as a permanent seed bed to remain on the bottom.

The boxes are provided with removable concrete tops (710) which can be held in place with pins (708) passing through holes (706) in both covers and the corners of the boxes. Shellfish are to be cultivated on the covers of the boxes when sunk into place, thus elevating the shellfish at least the height of the box (perhaps 4 to 8 feet) above the bottom where they are removed from silt and pollutants and exposed to currents carrying more nutrients and oxygen. The boxes preferably have dimensions and proportions which permit intermodal transport and the covers are provided with various types of projections or roughened surfaces to promote adhesion by shellfish spat. This working surface of the covers is turned inward for convenience in transport, then is reversed and secured in place before sinking and installation of the boxes. In FIG. 51, cover (710) is covered with at least one layer of projections (712) (here, three layers) having the form of rectangular parallepipeds, which can be laid down horizontally in criss-cross patterns as shown. In addition to producing boxes and covers of concrete comprising crushed bivalve shells, preferably oyster shells, the projections (712) can be cast or otherwise produced of similar materials. The objective is to provide rough, porous surfaces which are hospitable to shellfish spat, with projections which are spaced appropriately to foster rapid and productive growth of the shellfish to harvestable size. As an alternative or addition to such projections, the covers can be cast to contain large fragments of broken bivalve shells, as shown in FIG. 52 as (717) on concrete cover (710). This in itself could provide an ideal oyster bed, but oyster shells and comparable materials are in short supply and must be conserved. Also shown in FIG. 52 are rectangular projections (714) which are cast or attached perpendicular to cover (710).

Figure 53A:
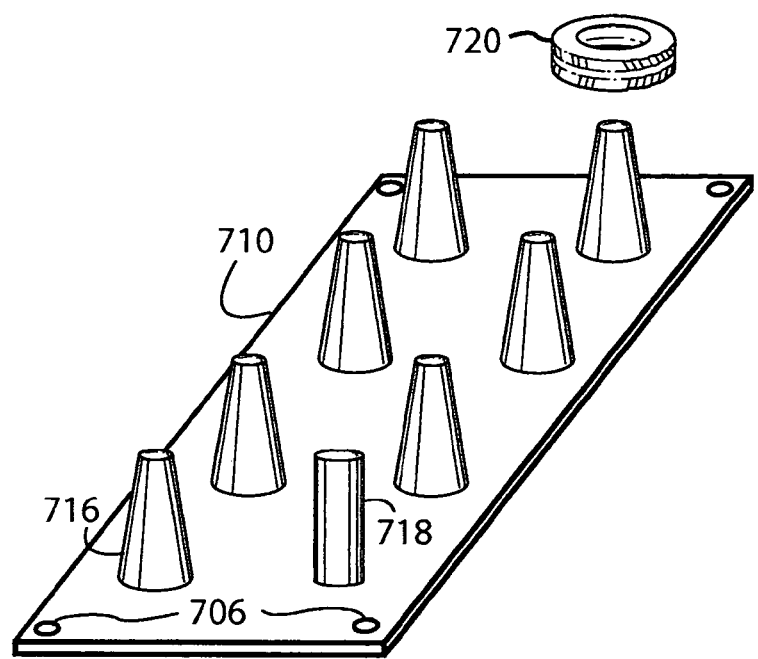
FIGS. 53 and 53A are perspective views illustrating another version of shellfish habitat with removable top, including means for hoisting the assembly from underwater.
Figure 53:
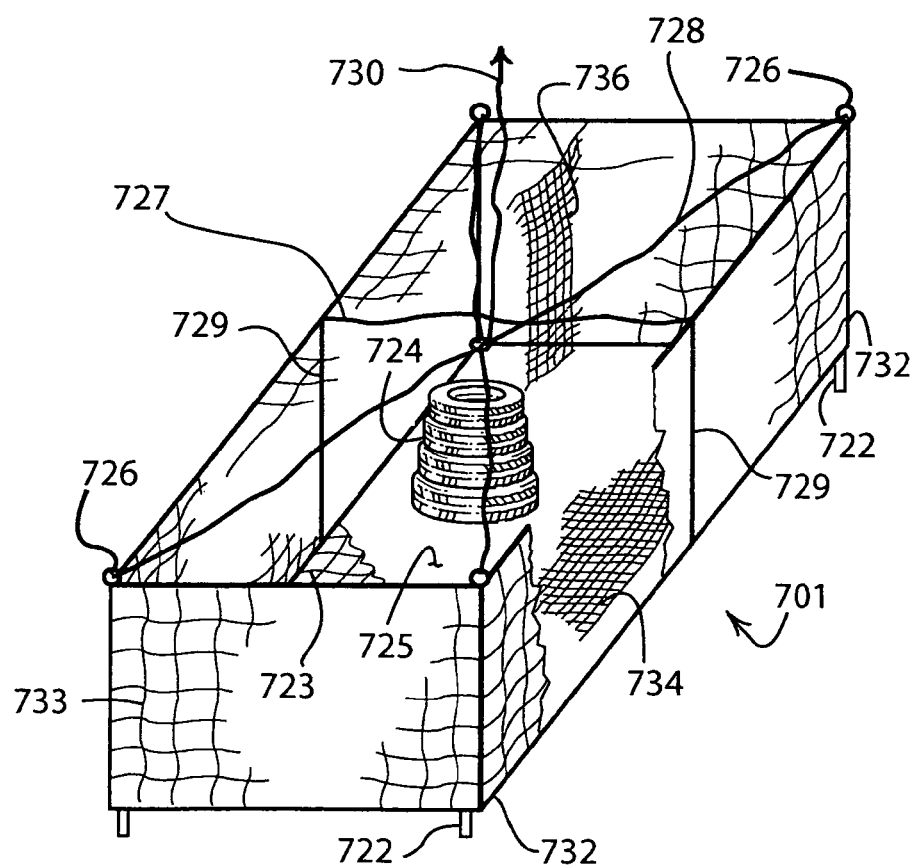

FIGS. 53 and 53A illustrate another type of shellfish habitat, with FIG. 53 schematically illustrating a meshwork container (701) with attachment points (726) at the upper corners for attaching bridle cables (728) and hoisting cable (730). Pins (722) are fitted to the lower corners so that the container can be mounted atop a precast concrete box such as box (700) of FIG. 51, or any suitable container or platform which will elevate the habitat to the proper level above the bottom. Any suitable mesh or openwork material (733) can be used to construct containers (701) about a suitable framework including rigid components (732), including expanded metal, heavy wire mesh and the like. The vertical sides of the container should be mesh as shown, but the bottom can be solid (725) and/or mesh (723). For durability, meshwork of stainless steel or synthetic polymeric materials may be preferred. Container (701) is to be filled with suitable objects for the adherence of shellfish spat, such as used tires (724), optionally filled with broken shells, stainless steel wire mesh structures, plastic pipe reinforced with steel, fragments of concrete, and the like, any of which can contain bivalve shells or mature oysters.

Two ways of providing inner mesh structures are to install vertical sections of mesh (736) extending from a narrow end of the container (where they attach to frames (732) and/or side mesh (733) to at least the center, where they can be attached to wire or rod supports (727). Such vertical mesh sections could extend from one end of the container to the other. In addition, or alternatively, horizontal layers of mesh (734) can be attached to a narrow end of the container, extending parallel to the bottom at least to the center of the container, where they can be attached to wire or rod supports (729). Such horizontal layers of mesh can also extend the entire length of the container.

A precast concrete top (710), much like that shown in FIG. 52, is provided. Various types of projections, including those shown in FIGS. 51 and 52, can be used. FIG. 53A illustrates projections (716) and (718), which are cylindrical and conical, respectively. Conical projections are preferred, as they are easier to remove from the molds used to cast the assembly. Additional components can be mounted on these projections, such as used tires (720), optionally filled with bivalve shells, stainless steel wire mesh structures, etc.

Since container (701) is much lighter than a concrete box, even when filled with structures for shellfish culture, hoisting and bridle cables (730) and (728) can be used to lift the entire container, cover and all, or alternatively, similar cables can be connected to lift cover (710) independently. Also, if the container (701) is mounted upon a solid concrete box such as illustrated in FIG. 15 having apparatus for introducing air to expel the water, the box itself can be blown and raised to the surface, carrying the container on top. Once either component (the container or cover) is hoisted clear of the water, the contents can be hosed off to remove any silt or sand and the assembly shaken or vibrated over a vessel's deck or hold to dislodge oysters or other shellfish (e.g., mussels) for harvest.

Various changes and modifications to the presently preferred embodiments will be apparent to those skilled in the art. Such changes and modifications may be made without departing from the spirit and scope of the present invention and without diminishing its attendant advantages. Therefore, the appended claims are intended to cover such changes and modifications, and are the sole limits on the scope of the invention.

I claim:

1. A self-propelled vessel for transporting floating objects, comprising separate bow and stern sections adapted to be removably fastened together using mechanical means to form the vessel alone and also to be separated and fastened mechanically to a floating object to form a vessel incorporating said floating object as a midship section to transport same, with said bow section comprising at least one anchor, propulsion means, at least one power supply and control means to operate same and a crane unit, and said stern section comprising a propulsion system, at least one anchor, a pilot house and controls for said vessel, which vessel is adapted to incorporate as said midship section an assemblage of floating boxes which are mechanically secured together to form said floating object, wherein said boxes are rectangular parallelepipeds comprising at least one material selected from the group consisting of concrete, metal, wood, plastic and polymeric composites and wherein said boxes comprise a plurality of boxes having at least two different sizes and sets of proportions which permit said boxes to be conveniently shipped together by intermodal means and assembled together to form said midship section of said vessel and to form shoreline structures when removed from said vessel.

2. A self-propelled vessel for transporting floating objects, comprising separate bow and stern sections adapted to be removably fastened together using mechanical means to form the vessel alone and also to be separated and fastened mechanically to a floating object to form a vessel incorporating said floating object as a midship section to transport same, with said bow section comprising at least one anchor, propulsion means, at least one power supply and control means to operate same and a crane unit, and said stern section comprising a propulsion system, at least one anchor, a pilot house and controls for said vessel, which vessel is adapted to incorporate as said midship section an assemblage of floating boxes which are mechanically secured together to form said floating object, wherein at least a portion of said boxes have a hexagonal cross section.

3. The vessel of claim 2 wherein said boxes having a hexagonal cross section comprise at least one material selected from the group consisting of concrete, metal, wood, plastics and polymeric composites.

4. The vessel of claim 3 wherein said boxes having a hexagonal cross section are formed of precast concrete comprising at least one of metallic and fibrous reinforcements.

5. The vessel of claim 4 wherein the metallic reinforcement for said precast concrete boxes comprises supports cast into at least a portion of the outer edges of said boxes.

6. The vessel of claim 5 wherein said supports comprise angle iron stock.

7. The vessel of claim 4 wherein said boxes having hexagonal cross sections contain metallic reinforcement in at least a portion of the top, bottom and side surfaces thereof.

8. The vessel of claim 7 wherein said metallic reinforcement comprises materials selected from the group consisting of cables, reinforcing bars and steel beams having various cross sections.

9. A self-propelled vessel for transporting floating objects, comprising separate bow and stern sections adapted to be removably fastened together using mechanical means to form the vessel alone and also to be separated and fastened mechanically to a floating object to form a vessel incorporating said floating object as a midship section to transport same, with said bow section comprising at least one anchor, propulsion means, at least one power supply and control means to operate same and a crane unit, and said stern section comprising a propulsion system, at least one anchor, a pilot house and controls for said vessel, which vessel is adapted to incorporate as said midship section an assemblage of floating boxes which are mechanically secured together to form said floating object, wherein said midship section comprises a plurality of precast concrete boxes having a hexagonal cross section, the majority of which are oriented vertically and interconnected by mechanical means to form a honeycomb structure.

10. The vessel of claim 9 wherein said mechanical means comprise connectors to interconnect said boxes to each other and tensioning cables to maintain the structure of said midship section.

11. The vessel of claim 9 wherein said midship section further comprises precast concrete boxes having a half hexagonal cross section which are interconnected to the outer portions of said midship section to form flush surfaces for said section.

12. A self-propelled vessel for transporting floating objects, comprising separate bow and stern sections adapted to be removably fastened together using mechanical means to form the vessel alone and also to be separated and fastened mechanically to a floating object to form a vessel incorporating said floating object as a midship section to transport same, with said bow section comprising at least one anchor, propulsion means, at least one power supply and control means to operate same and a crane unit, and said stern section comprising a propulsion system, at least one anchor, a pilot house and controls for said vessel, wherein at least a portion of said bow section, said stern section and said midship section comprise pluralities of precast concrete boxes having a hexagonal or half-hexagonal cross section which are assembled in a vertical orientation and interconnected in honeycomb arrays to form the structure of said bow, stern and midship sections.

13. A vessel comprising separable bow, stern and midship sections, each of said sections being constructed primarily of a plurality of precast concrete boxes having hexagonal or half-hexagonal cross-sections, said boxes being oriented vertically and interconnected by mechanical means to form said bow, stern and midship sections into an integrated hull structure of said vessel, which vessel is self-propelled, said bow section having at least one anchor, propulsion means, at least one power supply and control means to handle same and at least one crane unit for handling cargo, with said stern section comprising a pilot house, at least one anchor, at least one propulsion unit and control means for said vessel.

14. The vessel of claim 13 wherein a portion of said boxes forming said midship section are adapted to serve as tanks for fuel, water and ballast.

15. The vessel of claim 13 wherein said midship section comprises cargo-carrying sections and at least one crane to handle said cargo.

16. The vessel of claim 13 wherein a plurality of said boxes in said bow, midship and stern sections are adapted for special purposes comprising operations, habitability and weapons.

17. The vessel of claim 13 wherein at least said midship section is large enough and is adapted to serve as a mobile base for at least one type of vehicle selected from the group consisting of large ships, smaller vessels, small craft, submarines, submersibles, hovercraft and aircraft.

18. The vessel of claim 1 which incorporates as its midship section said assemblages of floating boxes.

19. The vessel of claim 2 which incorporates as its midship section said assemblage of floating boxes.

* * * * *